US012406207B2

(12) United States Patent
Turley et al.

(10) Patent No.: US 12,406,207 B2
(45) Date of Patent: Sep. 2, 2025

(54) SYSTEMS AND METHODS FOR GENERATING CUSTOMIZED AI MODELS

(71) Applicant: OpenAI OpCo, LLC, San Francisco, CA (US)

(72) Inventors: Nicholas Turley, San Francisco, CA (US); Thomas Dimson, San Francisco, CA (US); Olivier Godement, San Francisco, CA (US); Michal Pokrass, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 18/944,178

(22) Filed: Nov. 12, 2024

(65) Prior Publication Data

US 2025/0103962 A1 Mar. 27, 2025

Related U.S. Application Data

(63) Continuation of application No. 18/896,263, filed on Sep. 25, 2024.
(Continued)

(51) Int. Cl.
*G06N 20/00* (2019.01)
*G06F 16/334* (2025.01)
(Continued)

(52) U.S. Cl.
CPC ......... *G06N 20/00* (2019.01); *G06F 16/3344* (2019.01); *G06N 5/02* (2013.01); *G06N 5/022* (2013.01)

(58) Field of Classification Search
CPC .................. G06N 20/00; G06N 5/022
See application file for complete search history.

(56) References Cited

U.S. PATENT DOCUMENTS 9,971,766 B2   5/2018   Pasupalak et al.
10,679,631 B2  6/2020   Hirzel et al.
(Continued)

FOREIGN PATENT DOCUMENTS

CN   108108986 B   10/2020
CN   114586048 A    6/2022
(Continued)

OTHER PUBLICATIONS

Wan, J. et al. "Artificial Intelligence-Driven Customized Manufacturing Factory: Key Technologies, Applications, and Challenges", Proceedings of the IEEE, Feb. 2023, 21 pages.
(Continued)

*Primary Examiner* — Dave Misir
(74) *Attorney, Agent, or Firm* — Finnegan, Henderson, Farabow, Garrett & Dunner, LLP

(57) ABSTRACT

While AI models, like large language models, are powerful tools with multiple applications, they can be complex to use and can require a lot of resources to operate. The disclosed systems and methods provide tools to generate customized models (or AI agents) that are configured with features like tailored knowledge, capabilities, and instructions that make them faster, more efficient, and use less computational resources. AI agents may offer several technical advantages of improved efficiency, resource use, and connectivity. This disclosure describes systems and methods to configure, evaluate, generate, and deploy the custom models that can more efficiently run specific tasks. Disclosed systems and methods are configured to, for example, receive a query to generate a custom model, generate the AI agent custom model with the information in the query, and then resolve user queries more efficiently using the custom model.

19 Claims, 29 Drawing Sheets

Related U.S. Application Data

(60) Provisional application No. 63/558,534, filed on Feb. 27, 2024, provisional application No. 63/596,365, filed on Nov. 6, 2023, provisional application No. 63/585,108, filed on Sep. 25, 2023.

(51) Int. Cl.
  *G06N 5/02* (2023.01)
  *G06N 5/022* (2023.01)

(56) References Cited

U.S. PATENT DOCUMENTS

| | | | |
|---|---|---|---|
| 10,839,432 | B1 | 11/2020 | Konig et al. |
| 10,891,438 | B2 | 1/2021 | Singh et al. |
| 10,951,552 | B2 | 3/2021 | Jafar Ali et al. |
| 11,366,573 | B2 | 6/2022 | Roisman et al. |
| 11,461,311 | B2 | 10/2022 | Rodrigues |
| 2008/0320548 | A1* | 12/2008 | Tripathi ............ G06F 21/552 714/E11.01 |
| 2019/0132264 | A1 | 5/2019 | Jafar Ali et al. |
| 2020/0285528 | A1 | 9/2020 | Olsen et al. |
| 2021/0042094 | A1 | 2/2021 | Burman et al. |
| 2022/0004702 | A1 | 1/2022 | Liang et al. |
| 2023/0005070 | A1 | 1/2023 | Nguyen et al. |
| 2023/0267374 | A1 | 8/2023 | Polleri et al. |
| 2024/0061835 | A1* | 2/2024 | Subramanian ........ G06F 16/252 |
| 2024/0062044 | A1* | 2/2024 | Subramanian .......... G06F 40/58 |
| 2024/0370765 | A1* | 11/2024 | Pierucci ................. G06F 40/30 |
| 2024/0395081 | A1* | 11/2024 | Coimbra De Andrade ............... G06V 20/44 |

FOREIGN PATENT DOCUMENTS

| | | |
|---|---|---|
| EP | 3 545 427 B1 | 11/2017 |
| EP | 3 599 555 A1 | 5/2019 |
| EP | 4 060 517 | 3/2021 |

OTHER PUBLICATIONS

Ouyang, L., et al. "Training language models to follow instructions with human feedback", 36th Conference on Neural Information Processing Systems (NeurIPS 2022), 15 pages.

Ziegler, D. et al., "Fine-Tuning Language Models from Human Preferences", arXiv:1909.08593v2 [cs.CL] Jan. 8, 2020, 26 pages.

Desai, V. et al., "Fine Tuning Modeling Through Open AI", Progression in Science, Technology and Smart Computing, 2021, ISBN-978-81-948061-2-7, 6 pages.

Wei, J. et al., "Finetuned Language Models are Zero-Shot Learners", arXiv:2109.01652v5 [cs.CL] Feb. 2022, 46 pages.

Baez, M. et al., "Chatbot integration in few patterns", IEEE Internet Computing vol. 25, No. 3, pp. 52-59, May 1-Jun. 2021, doi: 10.1109/MIC.2020.3024605.

Youyang Ng et al: "SimplyRetrieve: A Private and Lightweight Retrieval-Centric Generative AI Tool", Arxiv.Org, Cornell University Library, 201 Olin Library Cornell University Ithaca, NY 14853, Aug. 8, 2023, XP091589061.

Shizhe Diao et al: "LMFlow: An Extensible Toolkit for Finetuning and Inference of Large Foundation Models", Arxiv.Org, Cornell University Library, 201 Olin Library Cornell University Ithaca, NY 14853, Jun. 21, 2023, XP091544275.

PCT International Search Report and Written Opinion for application No. PCT/US2024/048463, dated Feb. 11, 2025, 15 pages.

* cited by examiner

900

My Models

Create a model
Customize a version of base model for a specific purpose

902

1200

○ New
• Draft

[ Create | Configure ]

1202 — Name
[Name your model]

1204 — Description
[Add a short description about what this model does]

1206 — Instructions
[What does this model do? How does it behave? What should it avoid doing?]

1208 — Conversation starters
[                                                    ]

1210 — Knowledge
If you upload files under Knowledge, conversations with your model may include file contents. Files can be downloaded with Code Interpreter is enabled

[ Upload files ]

1212 — Capabilities
☑ Web Browsing
☑ DALL-E Image Generation
☐ Code Interpreter 1214 — Actions
[ Create new action ]

FIG 12

```
Assistants.create(
    model="base-4-1106-
    preview", tools=["code
)   _interpreter"],
```

SYSTEMS AND METHODS FOR GENERATING CUSTOMIZED AI MODELS

CROSS-REFERENCE AND INCORPORATION BY REFERENCE

This application is a continuation of application Ser. No. 18/896,263, filed Sep. 25, 2024, the disclosure of which is expressly incorporated by reference. This application also incorporates by reference U.S. patent application Ser. No. 18/186,712, filed Mar. 20, 2023, and titled "SCHEMA-BASED INTEGRATION OF EXTERNAL APIS WITH NATURAL LANGUAGE APPLICATIONS," (now U.S. Pat. No. 11,922,144) and claims priority to U.S. Provisional Patent Application Nos. 63/585,108, 63/596,365, and 63/558,534.

FIELD OF DISCLOSURE

The disclosed embodiments generally relate to systems, devices, apparatuses, and methods for generating and evaluating customized artificial intelligence (AI) models that facilitate interaction with language models (LMs), improve computational efficiency, and permit faster and more accurate responses. In particular, and without limitation, the disclosed systems and methods relate to the generation and automated control of customizable models that include AI agents (customized or finetuned LMs) and/or tailored or custom models. The customizable artificial intelligence models or AI agents may be configured by users to be specialized in one or more types of tasks to facilitate interactions between users and the LM and provide more accurate responses and capabilities for a user-designed task.

BACKGROUND

LMs are language models characterized by their large size. Their size is enabled by AI accelerators, which can process vast amounts of data. The data may come from different sources and different formats. For example, the data used for training or developing LMs may include text (in one or more languages), images, or other types of media. LMs frequently are developed with artificial neural networks. These artificial neural networks seek to mimic the operation of a brain and process data through networks that contain billions or trillions of operations and inferences. The neural networks may be pre-trained using self-supervised learning and semi-supervised learning. Additionally, the neural networks may have what is known as a transformer architecture for faster training.

Some LMs operate by taking an input text and repeatedly predicting the next piece of text or response. LMs trained on large data sets can be tailored through prompt-engineering to achieve similar results. The LMs, for example, may be programmed to acquire knowledge about syntax, semantics and "ontology" inherent in language.

LMs, however, may be difficult to interact with or may be computationally expensive and slow to run. For example, users may find interaction with LMs (or other AI models) daunting because it may be difficult to understand how to use them. Interacting with LMs may be challenging because interfaces may be limited and the inputs to the models may be limited. Further, interaction with LMs may be complicated or computationally expensive when users would like to customize or program the response of LMs.

The disclosed systems, apparatuses, devices, and methods are directed to overcoming these and other drawbacks of existing systems and for improved systems and methods for image generation with machine learning and/or AI models.

SUMMARY

AI models, like LMs, are powerful tools with multiple applications like generating and understanding human language. LMs are trained on large amounts of data and use machine learning techniques to learn statistical relationships between words and phrases. LMs can perform tasks such as text analysis, sentiment analysis, language translation, and speech recognition. AI models, however, are often complex and running them requires significant computational resources that make AI model systems either expensive or slow. The disclosed systems and methods resolve these and other problems in the art by providing tools to generate customized models that are pre-configured with a tailored knowledge base, capabilities, and specific instructions to make the model faster, more efficient, and use less computational resources than a standard or generic model. Custom models may offer several technical advantages like improved efficiency (by leveraging pre-defined information and capabilities, custom models can provide more rapid and accurate responses, reducing user interaction), improved resourcefulness (the tailored nature of custom models allows them to operate with less computational power and by focusing on specific datasets or specific instructions, they minimize the need for extensive inference processes), and improved connectivity (custom models can be integrated with external resources to enhance response accuracy and further optimize performance). This disclosure describes varied systems and methods to configure, filter, generate, and deploy the custom models.

For example, one aspect of the disclosure is directed to an artificial intelligence system for generating custom models or AI agents. The system includes a memory storing instructions and a processor that performs the instructions to perform operations for the generation of the custom models. The operations can include receiving a query (e.g., via a user interface) to create a customized model. Such a query can include the features or characteristics that are desired for the custom model. For example, the features can include a knowledge base (e.g., a set of documents that is relevant for the custom model) and a capability (e.g., a function that the custom model should perform).

The information received via the query can then be used to perform operations of configuring the customized model. This configuration can take place by finetuning a base model with the knowledge base received from the query and/or by generating a set of instructions to configure the capability. The capability configuration can establish connectivity with at least one application programming interface (API) or plugin that establishes communication between the custom model and a networked service. Further, the system may be configured to generate a custom interface for interacting with the customized model (e.g., an interface with the desired characteristics for interaction with the custom model). With the custom interface setup, the operations may also include receiving a user query or prompt via the custom interface and resolving the query or prompt using the customized model and generating a response via the custom interface. By using the customized model to resolve the query, the overall system may perform more efficiently than if the query was resolved by a generic model because the customized model can generate responses faster, with less inferences, and yet be more precise in its response.

Another aspect of the disclosure is directed to a method for configuring customized AI models. The method includes operations or steps that can be employed to generate a customized AI model. For example, the method may include operations like:

Receiving instructions to create the customized model. These instructions can be received via a website, mobile application, or an API. And the instructions can include a training dataset.

Configuring the customized model by finetuning a base model according to the received instructions. In some situations, the base model can be a large language model (LLM), but other types of models could also be used as the base model.

Configuring the customized model to communicate via an API (e.g., an API associated with a client, network service, or with a website).

Generating a custom interface for interacting with the customized model (e.g., generating an interface with specific arrangement of display tools).

Receiving a user query or prompt via the custom interface (e.g., receiving a prompt from a user via the interface in the form of a question, a task request, an image, or a video).

Resolving the query or prompt using the customized model and communicating a response via the API of the client.

Yet another aspect of the disclosure is directed to a system for generating an AI agent or custom model based on a language model (LM). The system includes elements like a memory storing instructions and a processor configured to execute the instructions to perform operations. And the operations can include receiving instructions to initialize an AI agent via an interface. Using those instructions to configure an AI agent or custom model based on the instructions (e.g., setting up the custom model with instructions, capabilities, and knowledge base specified). And connecting the AI agent with the LM.

Another aspect of the disclosure is directed to a system for generating a customized pre-trained models AI agents. The system can be configured with one or more processors configured to perform operations for generating the customized pre-trained model. The operations performed by the system can include receiving a query to generate a customized pre-trained model. This query can include information for configuration of the customized pre-trained model, like a knowledge base, specific instructions, and a capability. The system may also be configured to determine whether the query, the knowledge base, specific instructions, and the capability have registration compliant parameters. Registration compliant parameters may include parameters that can be supported based on the type of content they generate and/or the resources they demand. For example, registration compliant parameters may be parameters that follow content moderation guidelines and standards. In such a case, for example, instructions seeking to produce violent content or content having improper tone would not have registration compliant parameters. Therefore, the system may use a customized model to evaluate if the combination of knowledge base, specific instructions, and the capability is likely to be seeking a customized pre-trained model that could be used to generate improper content or could be used by bad actors (e.g., the system can determine if the requested customized pre-trained model could be seeking to generate content for hacking websites or to harass someone).

The system may also be configured to, in response to determining the query has compliant parameters (e.g., there is no indication the customized pre-trained model is being created for an improper use or breaching registration parameters), the system may configure the customized pre-trained model based on the knowledge base, specific instructions, and capability. This configuration may include finetuning a base model with the knowledge base and the specific instructions, and establishing connectivity with at least one API or plugin associated with the capability. In such a scenario, the API or plugin can establish communication between the custom model and a networked service.

Once generated and deployed, the system may also perform operations of receiving a user prompt and resolving the user prompt with the customized model and generating a response. And with the improved knowledge, capability, and specific instruction tailoring, the customized pre-trained model or AI agent can resolve queries more efficiently, with less computational demands, and with greater accuracy by leveraging the pre-configuration settings.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 12 illustrates a fourth example user interface for configuring a custom model or AI agent, according to disclosed embodiments of the present disclosure.

DETAILED DESCRIPTION

Figure 1:
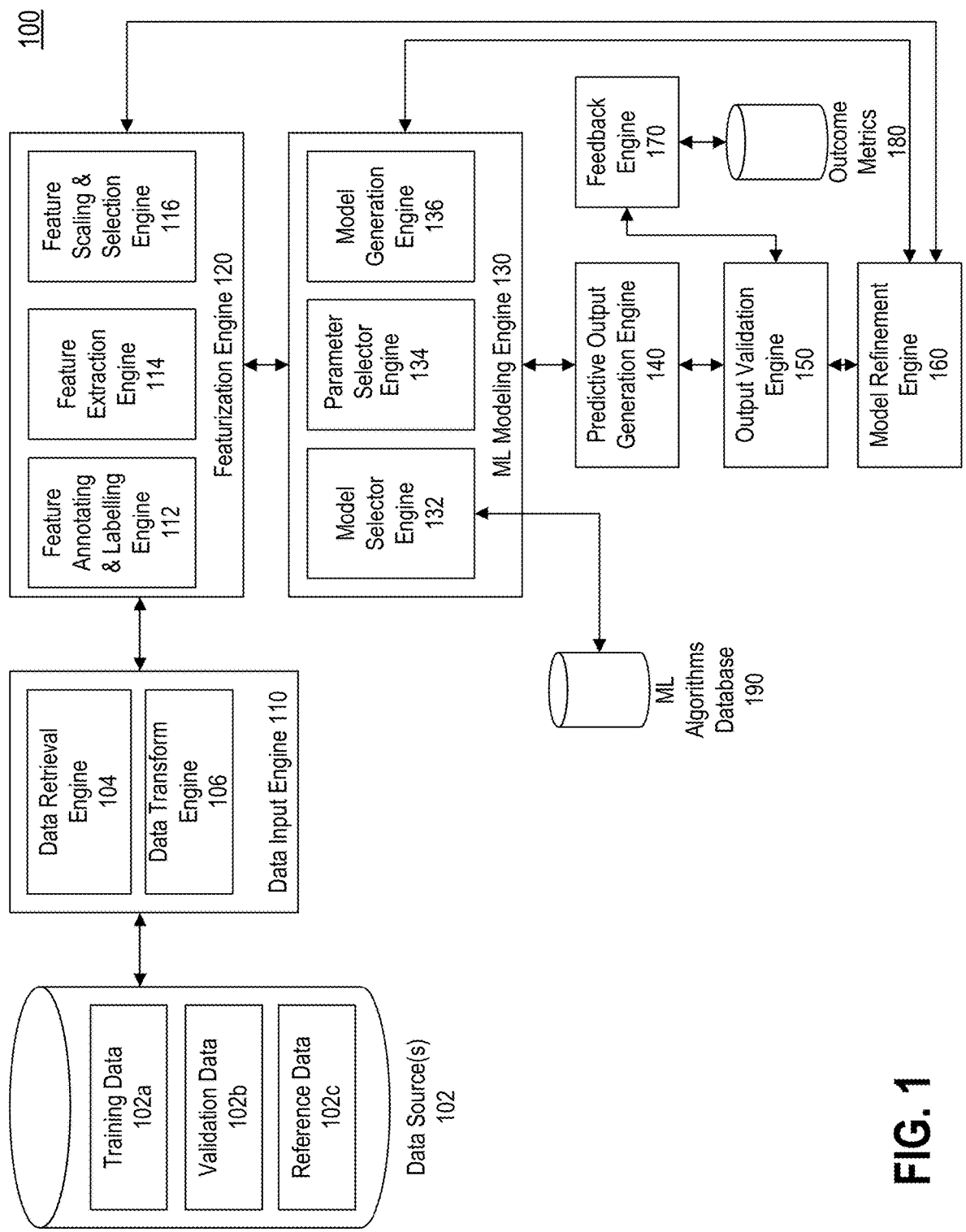
FIG. 1 is a block diagram illustrating an example machine learning platform for implementing various aspects of this disclosure, according to some embodiments of the present disclosure.

Some of the disclosed embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example systems or methods. However, it will be understood by those skilled in the art that the principles of the example methods and systems may be practiced without every specific detail. Well-known methods, procedures, and components have not been described in detail so as not to obscure the principles of some of the disclosed methods and systems. Unless explicitly stated, the example methods and processes described herein are neither constrained to a particular order or sequence nor constrained to a particular system configuration. Additionally, some of the described methods and systems or elements thereof can occur or be performed (e.g., executed) simultaneously, at the same point in time, or concurrently. Reference will now be made in detail to some of the disclosed methods and systems, examples of which are illustrated in the accompanying drawings.

It is to be understood that both the foregoing general description and the following detailed description are example and explanatory only and are not restrictive of this disclosure. The accompanying drawings, which are incorporated in and constitute a part of this specification, illustrate several disclosed methods and systems and together with the description, serve to outline principles of some of the disclosed methods and systems.

Some of the disclosed methods and systems may improve the field of AI model training, finetuning, deployment, and management by permitting simple and user-tailored development of custom models or AI agent that can be used multiple times a day, for multiple tasks, and for multiple purposes, with little technical requirements and simulating a live agent or assistant. Some of the disclosed methods and systems may solve technical problems and provide new technical functionality by facilitating completion of tasks faster, identify useful information faster, and creating a usage feedback that makes LM models more accurate and smarter. Further, the disclosed systems and methods may facilitate finetuning models at scale. For example, disclosed systems may allow for the configuration of custom models that are tailored with specified capabilities, knowledge base, and specific instructions. Such custom models can perform more efficiently and accurately for many reasons. First, the custom models can perform faster and with less user interaction because they can tailor responses and resolve user queries with a pre-defined set of information and capabilities that improve its response time and accuracy. Second, custom models can perform with less computational resources because the pre-configured instructions, capabilities, and knowledge reduces the range of possible responses, reducing the number of inferences or considerations that the custom model needs to make when resolving a query and more quickly focusing on specific responses. Third, the custom models may include pre-defined connectivity with other resources to both provide more accurate answers and reduce computational expenditure when resolving a query. For example, custom models may be pre-configured with certain API connections and with specific API calls that improve response speed when resolving a query that would require fetching information from a different system.

Some of the disclosed systems and methods may also improve the technical field of natural language processing, and development and deployment of AI models or custom models by providing a user-friendly system for configuration of customized models that operate with lower computational requirements yet more accurate and faster responses. Standard AI models (like general or untailored LMs) can have powerful capabilities to resolve multiple queries and leverage very large datasets to resolve user queries. The standard AI models acquire abilities to resolve queries by learning statistical relationships from vast amounts of data. But their deployment can be computationally expensive. Standard AI models resolving queries may require employing large amounts of computational resources, like memory and processing time. Such large use of computational resources can be detrimental for certain applications that seek operating with lower resource consumption or require faster response times. For example, standard AI models can be complicated to run with the limited resources available in a mobile device. As another example, standard AI models may not perform well for applications that require a fast response time such as real-time interactions or on the fly inferential tasks. The disclosed systems and methods improve the technical field of development and deployment of AI models by providing a system to configure, deploy, and maintain custom AI models or AI agents that users can tailor for specific tasks or topics, running more efficiently by leveraging a combination of pre-configured instructions, knowledge, and capabilities. The disclosed systems and methods thus enable a system having programmable operational characteristics that are configurable based on the type of custom model, which can be used with different user-defined tasks with lower computational requirements but without a tradeoff (or even improvement) in processing performance.

Some of the disclosed systems and methods may also improve the accuracy and speed of responses generated by AI models. For example, custom models generated with the disclosed systems and methods can be configured with a user-defined combination of knowledge base (e.g., a knowledge base with specific documents), capabilities (e.g., connectivity to other resources), instructions (e.g., specific instructions on how to prepare response queries), and personality (e.g., a specific tone for query responses). This user-defined combination permits having a custom model that can not only respond faster but with a more accurate response that is directed more specifically to what the user is looking for in the interaction. The user-defined combination of parameters for the custom model may reduce the number of interactions. For example, in standard or non-tailored AI models it is frequently necessary to use prompts to guide the model for a specific type of response. A user may need to use initial prompts to ask the AI model to generate responses in the voice of a fifth-grade teacher or in the voice of a college professor. A user may also need to use initial prompts to guide the model to identify and base responses on a specific type of information, like focusing on eighteenth century literature. The disclosed systems and methods improve the technical field by obviating the need to provide those initial prompts making the system faster, more efficient, and more accurate. The user-defined combined configuration reduces network traffic and congestion (particularly in models that rely on network connectivity) by minimizing the number of interactions that are needed with the model to provide an accurate response.

Some of the disclosed systems and methods may also improve the technical field of AI model deployment, interfacing, and security by permitting tailored interfacing using the disclosed custom models. For example, many of the standard AI models use the "Chat Bot" interface to capture and render information to users. This type of interface, however, has limitations. The type of information that can be captured through the interface can be limited and the type of information that can be provided to users via the interface can also be limited. Further, the Chat Bot interface has limited ability to provide security or authentication. Although some implementations may allow alternative interactions (e.g., upload documents or require passwords), those interactions require additional prompting or configurations that may make the model less efficient. The disclosed systems and methods allow the formation of custom models with tailored interfaces that improve interaction with users. For example, with certain capabilities configured by the user, the custom models may be instructed to respond with graphic elements and/or to transmit information through certain APIs that expand methods for interfacing. With certain capabilities the custom models formed with the disclosed systems and methods may also provide security measures like authentications, prompt control or moderation, and limit the disclosed information. For example, the custom model may be configurable based on a security profile and have instructions to identify hostile and potentially hostile operations.

Some of the disclosed systems and methods may also improve the field of AI model training and deployment by providing methods to automatically identify user instructions that can be harmful or undesired. With the opportunity to create custom models, users may attempt to generate custom models with instructions that are undesirable or non-compliant with system or registration parameters. For example, a user may attempt to generate custom models with instructions to cheat on standardized tests or to help breach IT security networks. The disclosed systems and methods improve the technical field by identifying combinations of knowledge, capabilities, personalities, and/or instructions that may result in harmful or undesired models. Some of the disclosed systems and methods may employ reviewer models that identify potentially harmful combination of user-configurations for the custom models and flag them for vetting and/or disable them. In some embodiments, the reviewer models may themselves be configured as custom models with instructions, knowledge, and capabilities to automatically monitor the requests for new custom models and evaluate them for a potentially harmful or undesirable customized model. The reviewer models in the disclosed systems and methods may improve technical capabilities to quickly process and filter large and disaggregated datasets with connections between, for example, knowledge, capabilities, and instructions that may not be apparent in an isolated review.

Reference will now be made in detail to the disclosed embodiments, examples of which are illustrated in the accompanying drawings.

FIG. 1 is a block diagram illustrating an example machine learning platform for implementing various aspects of this disclosure, according to some of the disclosed methods and systems.

System 100 may include data input engine 110 that can further include data retrieval engine 104 and data transform engine 106. Data retrieval engine 104 may be configured to access, interpret, request, or receive data, which may be adjusted, reformatted, or changed (e.g., to be interpretable by other engines, such as data input engine 110). For example, data retrieval engine 104 may request data from a remote source using an API. Data input engine 110 may be configured to access, interpret, request, format, re-format, or receive input data from data source(s) 102. For example, data input engine 110 may be configured to use data transform engine 106 to execute a re-configuration or other change to data, such as a data dimension reduction. Data source(s) 102 may exist at one or more memories and/or data storages. In some of the disclosed methods and systems, data source(s) 102 may be associated with a single entity (e.g., organization) or with multiple entities. Data source(s) 102 may include one or more of training data 102a (e.g., input data to feed a machine learning model as part of one or more training processes), validation data 102b (e.g., data against which at least one processor may compare model output with, such as to determine model output quality), and/or reference data 102c. In some of the disclosed methods and systems, data input engine 110 can be implemented using at least one computing device (e.g., computing device 2902 in FIG. 29). For example, data from data sources 102 can be obtained through one or more I/O devices and/or network interfaces. Further, the data may be stored (e.g., during execution of one or more operations) in a suitable storage or system memory. Data input engine 110 may also be configured to interact with a data storage (e.g., data storage 2908 in FIG. 29), which may be implemented on a computing device that stores data in storage or system memory.

System 100 may include featurization engine 120. Featurization engine 120 may include feature annotating & labeling engine 112 (e.g., configured to annotate or label features from a model or data, which may be extracted by feature extraction engine 114), feature extraction engine 114 (e.g., configured to extract one or more features from a model or data), and/or feature scaling and selection engine 116. Feature scaling and selection engine 116 may be configured to determine, select, limit, constrain, concatenate, or define features (e.g., AI features) for use with AI models. Similar to data input engine 110, featurization engine 120 may be implemented on a computing device. Further, featurization engine 120 may utilize storage or system memory for storing data and may utilize one or more I/O devices or network interfaces for sending or receiving data.

System 100 may also include machine learning (ML) modeling engine 130, which may be configured to execute one or more operations on a machine learning model (e.g., model training, model re-configuration, model validation, model testing), such as those described in the processes described herein. For example, ML modeling engine 130 may execute an operation to train a machine learning model, such as adding, removing, or modifying a model parameter. Training of a machine learning model may be supervised, semi-supervised, or unsupervised. In some of the disclosed methods and systems, training of a machine learning model may include multiple epochs, or passes over a dataset (e.g., training data 102a). In some of the disclosed methods and systems, different epochs may have different degrees of supervision (e.g., supervised, semi-supervised, or unsupervised).

Data inputted into a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed methods and systems in any way, a machine learning model may include millions, trillions, billings, or even trillions of model parameters. ML modeling engine 130 may include model selector engine 132 (e.g., configured to select a model from among a plurality of models, such as based on input data), parameter selector engine 134 (e.g., configured to add, remove, and/or change one or more parameters of a model), and/or model generation engine 136 (e.g., configured to generate one or more machine learning models, such as according to model input data, model output data, comparison data, and/or validation data).

Figure 29:
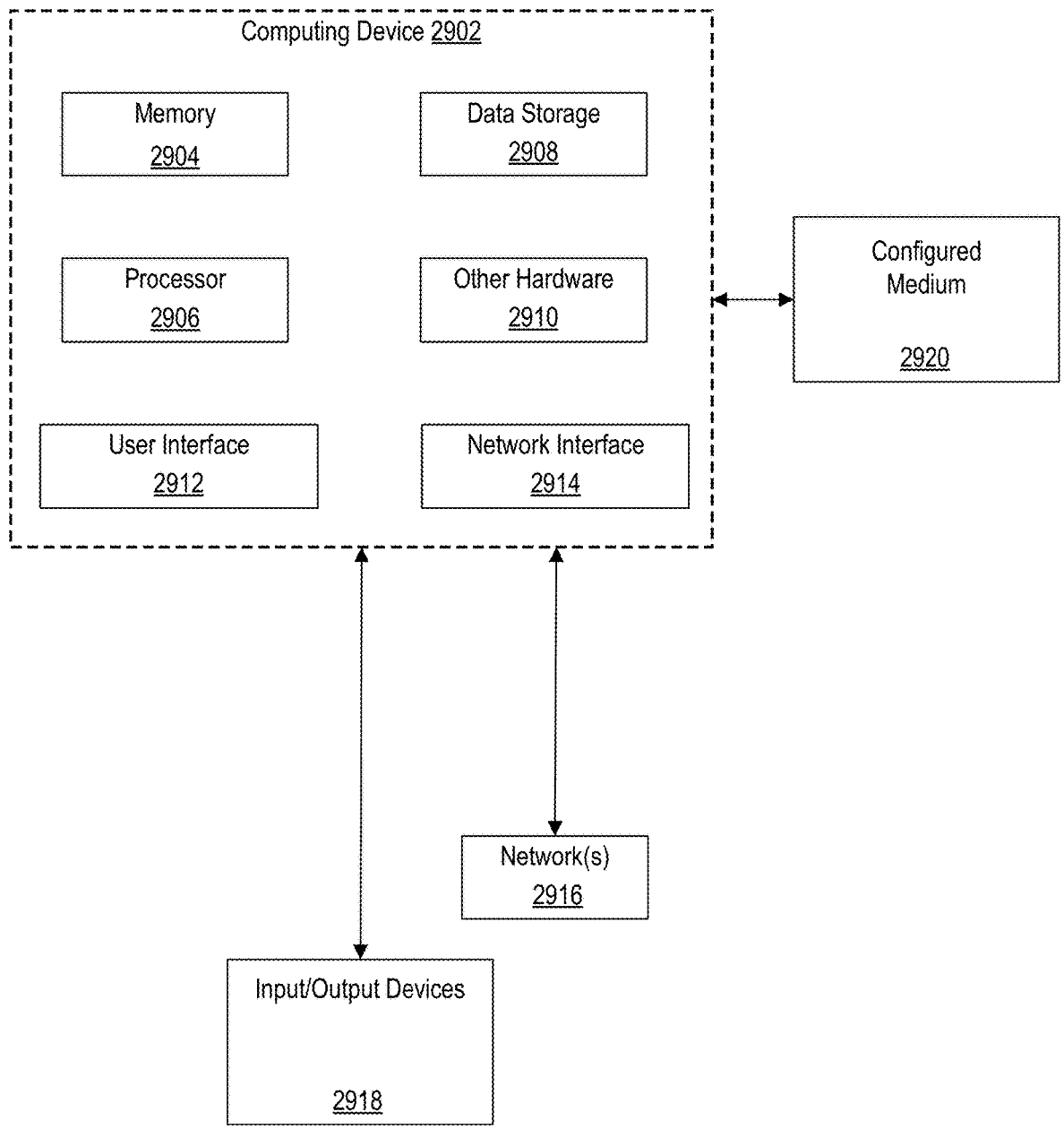
FIG. 29 is a block diagram illustrating an example operating environment for implementing various aspects of this disclosure, according to some embodiments of the present disclosure.

In some of the disclosed methods and systems, model selector engine 132 may be configured to receive input and/or transmit output to ML algorithms database 190 (e.g., data storage 2908 in FIG. 29). ML algorithms database 190 (or other data storage) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 100 can further include predictive output generation engine 140, output validation engine 150 (e.g., configured to apply validation data to machine learning model output), feedback engine 170 (e.g., configured to apply feedback from a user and/or machine to a model), and model refinement engine 160 (e.g., configured to update or re-configure a model). In some of the disclosed methods and systems, feedback engine 170 may receive input and/or transmit output (e.g., output from a trained, partially trained, or untrained model) to outcome metrics database 180. Outcome metrics database 180 may be configured to store output from one or more models and may also be configured to associate output with one or more models. In some of the disclosed methods and systems, outcome metrics database 180, or other device (e.g., model refinement engine 160 or feedback engine 170) may be configured to correlate output, detect trends in output data, and/or infer a change to input or model parameters to cause a particular model output or type of model output. In some of the disclosed methods and systems, model refinement engine 160 may receive output from predictive output generation engine 140 or output validation engine 150. In some of the disclosed methods and systems, model refinement engine 160 may transmit the received output to featurization engine 120 or ML modelling engine 130 in one or more iterative cycles.

Any or each engine of system 100 may be a module (e.g., a program module), which may be a packaged functional hardware unit designed for use with other components or a part of a program that performs a particular function (e.g., of related functions). Any or each of these modules may be implemented using a computing device. In some of the disclosed methods and systems, the functionality of system 100 may be split across multiple computing devices to allow for distributed processing of the data, which may improve output speed and reduce computational load on individual devices. In some of the disclosed methods and systems, system 100 may use load-balancing to maintain stable resource load (e.g., processing load, memory load, or bandwidth load) across multiple computing devices and to reduce the risk of a computing device or connection becoming overloaded. In these or other disclosed methods and systems, the different components may communicate over one or more I/O devices and/or network interfaces.

System 100 can be related to different domains or fields of use. Descriptions of some of the disclosed methods and systems related to specific domains, such as natural language processing or language modeling, is not intended to limit the disclosed methods and systems to those specific domains, and systems and methods consistent with the present disclosure can apply to any domain that utilizes predictive modeling based on available data.

Figure 2:
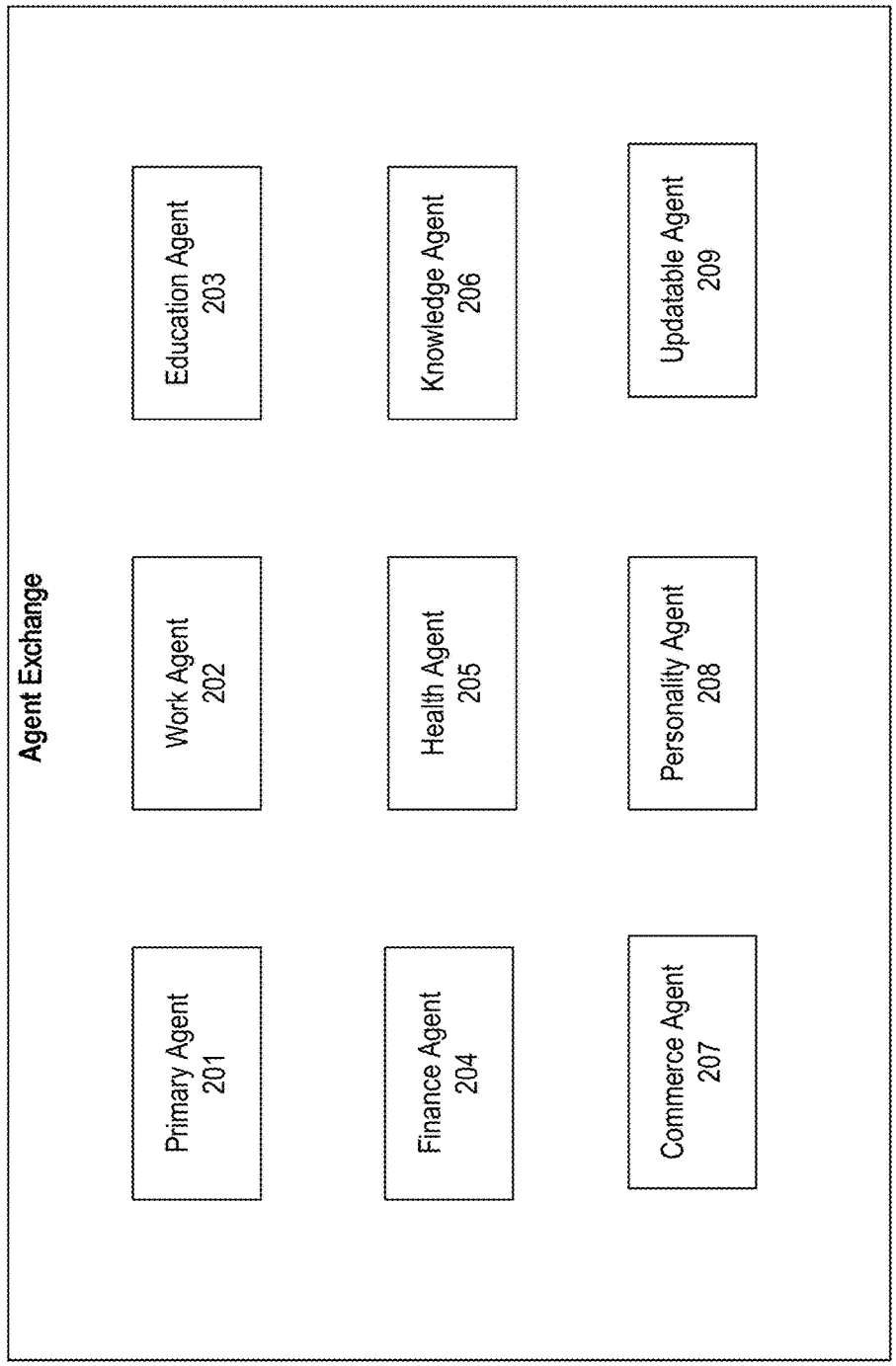
FIG. 2 is a block diagram illustrating example AI agents or custom models in an exchange according to disclosed embodiments of the present disclosure.

FIG. 2 is a block diagram 200 illustrating example AI agents or custom models in an agent exchange according to some of the disclosed methods and systems of the present disclosure.

In some of the disclosed methods and systems, the AI agents may include one or more software, interfaces, or tools that can perform tasks independently and in parallel, interact with each other and with users, and assist users for different tasks. The AI agents may specialize in certain tasks. Moreover, the AI agents may be finetuned with a depth of knowledge (e.g., a user defined knowledge base), unique perspective (e.g., a user defined capability for certain connectivity), and a personality (e.g., user defined model-specific instructions to deliver responses with certain tone or emphasis).

The AI agents may be programed to feel natural, such as by switching contexts when they interact to different people, taking into context whom they are interacting with, the relationship they have, trust in their expertise, among others. In some of the disclosed methods and systems, each person may have a default primary agent, as well as a number of additional agents they can interact with 1:1 or in groups and develop individual context and relationships over time.

In some of the disclosed methods and systems, the AI agents or custom models may be custom versions of language models (LMs) that are tailored or customized for specific tasks or topics by combining a set of user-defined feature (e.g., specific instructions, knowledge, and capabilities). In some disclosed methods and systems, the AI agents or custom models may be custom versions of ChatGPT, an advanced AI system developed by OpenAI, that are tailored or customized for specific tasks or topics by combining instructions, knowledge, and capabilities. In still further methods and systems, the AI agents or custom models may be as simple or as complex as need be; the AI agents or custom models may be tailored and customized to address a plethora of tasks, functions, or needs ranging from language learning, technical learning, productivity hacks, education, entertainment, or any other niche need for everyday tasks.

In some of the disclosed methods and systems, any user, regardless of programming or coding skills, may create AI agents or custom models by leveraging interfaces disclosed here. Indeed, a user may create an AI agent or custom model for a group of experts in a specific field. Additionally or alternatively, a user may create an AI agent or custom model for amateurs who have a passion for a specific topic. Still, in other disclosed methods or systems, a user may be a coder, programmer, or developer who utilizes coding actions to connect an AI agent or custom model to an external data source or any other external service.

Figure 8:
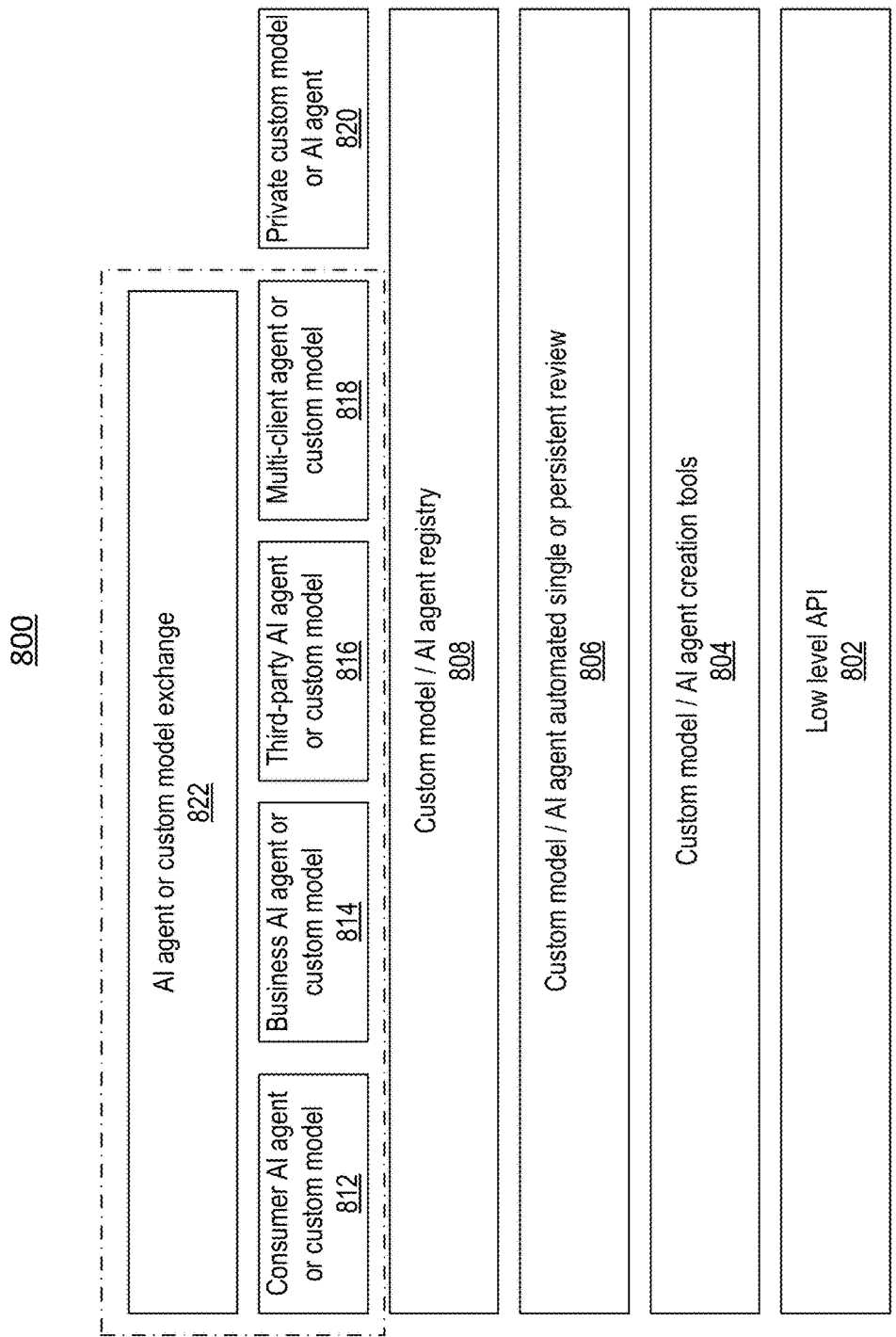
FIG. 8 is a block diagram of an example custom model or AI agent environment according to disclosed embodiment of the present disclosure.

In some of the disclosed methods and systems, a user may publish or publicly share a created AI agent or custom model for others to use, such as a website, within an electronic or digital platform, or as part of an AI system, registry, or exchange. For example, a user may publish the created AI agent or custom model in a custom model/AI agent exchange 822 as shown in FIG. 8, and discussed in detail below. Alternatively, a user may share or deploy a created AI agent or custom model in a more restricted or private manner through permissioning, tooling, or other restriction mechanisms. For example, a user may create an AI agent or custom model that is customized to align with business needs. In such a case, the user may create the AI agent or custom model for specific use cases, departments, or proprietary datasets. Indeed, the user may create the AI agents or custom models to craft marketing materials embodying a brand, aid support staff with answering customer questions, or help new employees with onboarding, amongst many other internal tasks. In still other disclosed methods or systems, the user may empower local users inside a business or company to design internal-only AI agents or custom models without code, and securely publish such AI agents or custom models to an internal workspace.

Some of the disclosed methods and systems may include primary custom model or AI agent 201, which may be programmed to have responses simulating an assistant that has a user-defined knowledge base and capabilities based on user defined instructions and configurations. Primary custom model or AI agent 201 may help answer user questions, navigate logistics, be a creative thought partner to bounce ideas off of, and/or help users with personal projects.

Some of the disclosed methods and systems may include a work custom model or AI agent 202. The work custom model or AI agent 202 may be programmed to have responses simulating a work agent or "sidekick" that may acts as a personal assistant and be configured with a knowledge base associated with work tasks, and capabilities to connect to enterprise networks. In some of the disclosed methods and systems, as further discussed below, work custom model or AI agent 202 may be connected through plugins or APIs to internet, other online resources, and in some cases private networks or repositories. For example, work custom model or AI agent 202 may be configured with an API associated with a work online account that feeds work resources, information, and tools such as user emails and messages, company documents, calendar, company vision, specific 6-month goals for users, etc. Work custom model or AI agent 202 may use that knowledge resolve queries to generate strategy documents/code/execution plans, coordinate on a user's behalf, and work in the background to work as a user tool.

Some of the disclosed methods and systems may include education custom model or AI agent 203. Education custom model or AI agent 203 may be tuned for education purposes, such as with a knowledge based and personality for an interactive tutor, permitting configurations adapting to unique learning styles and pace of a student, and providing personalized responses in a range of subjects. Education custom model or AI agent 203 may be configured with, for example, documents related to a tutor that is tuned by different tutoring companies that may form subscriptions to different AI agent tutors. Education custom model or AI agent 203 can be customized differently for different users or can adapt as education custom model or AI agent 203 interacts with different users. For example, the education custom model or AI agent 203 may be configured with model-specific instructions to store queries from a user and incorporate them as part of the knowledge base for custom model finetuning.

Some of the disclosed methods and systems may also include finance custom model or AI agent 204. Finance custom model or AI agent 204 may be configured with knowledge and capabilities related to financial operations or planning. For example, finance custom model or AI agent 204 may be configured with APIs that communicate with financial networked services (e.g., with a bank API), include a knowledge base relevant to financial assessments (e.g., a knowledge base including financial planning books), and be configured with model-specific instructions to resolve queries and/or generate budgets, track spending, optimize investments, or assist with other financial tasks. In some of the disclosed methods and systems, finance custom model or AI agent 204 may be configured to connect to online resources (e.g., online bank accounts). Finance custom model or AI agent 204 may be tailored in some of the disclosed methods and systems and users may choose based on risk tolerance, financial literacy, communication style, and more.

Some of the disclosed methods and systems may include health custom model or AI agent 205. Health custom model or AI agent 205 may be configured with a knowledge base and capabilities to simulate a health assistant. For example, health custom model or AI agent 205 may be configured with capabilities that allow communication with health-related repositories (e.g., communication with an electronic health record system through its API) and knowledge base with information of health resources (e.g., knowledge base including guidance by physicians). Health custom model or AI agent 205 may be also configured with instructions to resolve queries applying different user philosophies and/or use lifestyles. For example, health custom model or AI agent 205 may be tuned to resolve queries in the context of a vegan diet another may be tuned to provide responses for a paleo diet. Health custom model or AI agent 205 may be configured to with capabilities connect with online resources (e.g., through plugins or APIs). In such methods and systems, health custom model or AI agent 205 may integrate data from wearable devices, scheduling appointments, and even from making dietary recommendations. Health custom model or AI agent 205 may be configured by users with long term health and immediate fitness milestones.

Some of the disclosed methods and systems may include knowledge custom model or AI agent 206, which may be configured as knowledge AI agents. Knowledge custom model or AI agent 206 may be tuned to a knowledge base that is proprietary corpus and is accessible conversationally. For example, a school may have an AI agent or custom model that simulates an interactive math tutor for a 5$^{th}$-grade student by configuring the custom model with a knowledge base and a personality that is expected for such a tutor. As another example, a website may generate an AI agent that makes all the blogs or posts in the website accessible via a simple conversation with the agent. In some of the disclosed methods and systems knowledge custom model or AI agent 206 may be configured with instructions and capabilities to be embedded in a website or mobile application. As further discussed below, disclosed systems and methods may enable embedding agents with simple instruction (e.g., using a couple of lines of code in JavaScript) that call API functions and/or insert AI Agent functionality.

Some of the disclosed methods and systems may include commerce custom model or AI agent 207, which may be configured to act as a personal purchaser. In some of the disclosed methods and systems, commerce custom model or AI agent 207 may be configured to store and understand user style preferences. For example, the commerce custom model or AI agent 207 may be configured with a knowledge base that compiles user preferences (e.g., the user purchase history) and capabilities to update the knowledge base (e.g., a connection to an e-commerce account or a financial account information to track transactions). Additionally, commerce custom model or AI agent 207 may be configured with model-specific instructions to store information regarding preferences such as clothes or flight or travel preferences for trips. In some of the disclosed methods and systems, commerce custom model or AI agent 207 may be configured with capabilities to be built or deployed into ecommerce sites (e.g., using different configurations of APIs or plugins). Moreover, commerce custom model or AI agent 207 may be configured to interact with other AI agents, to for example, quickly converse with primary agent 201 to get information of preferences. In such disclosed methods and systems, agents may interact with each other to facilitate the user's interaction with a general LLM.

Some of the disclosed methods and systems may include personality custom model or AI agent 208, which may be configured to facilitate customization by a user. For example, personality custom model or AI agent 208 may be adjusted with "personality" features that simulate a personality with a specific set of knowledge base or training dataset. A user may finetune an AI agent using a knowledge base and personality instructions, so that when responding to queries the custom model simulates an Abraham Lincoln response, with emulated personality and mannerisms, and is also deeply familiar with the corpus of his work and details from his life, using the knowledge base features. Personality custom model or AI agent 208 may go beyond other products that create superficial shells of characters, and instead offers actual knowledge and unique finetuned perspectives.

Some of the disclosed methods and systems may include updateable custom model or AI agent 209, which may be configured to facilitate recurrent customization by a user. For example, updateable agent 209 may be concurrently adjusted with ongoing operations with capabilities to connect to an API and periodically call for information or updates from a networked service like a cloud storage service or an email repository.

Figure 3:
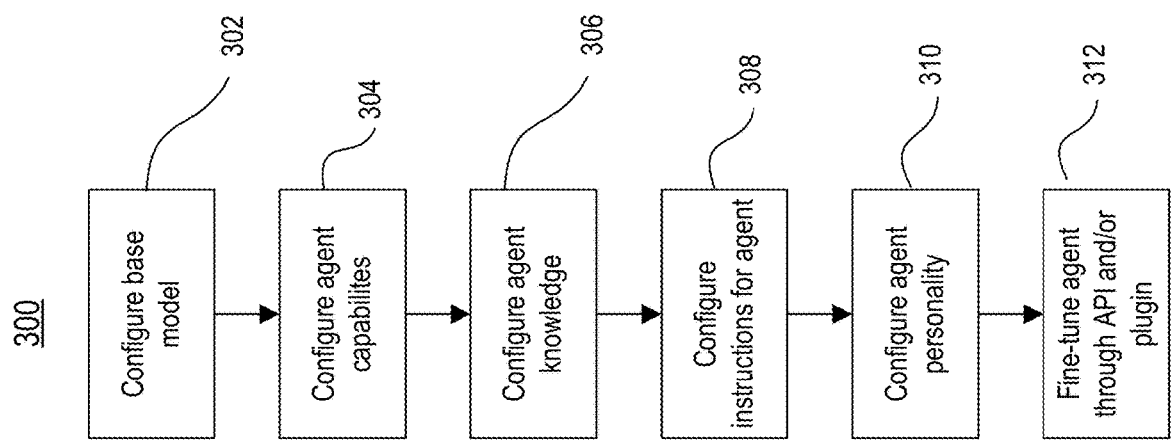
FIG. 3 is a flow chart of an example process for configuring an AI agent or custom model, according to disclosed embodiments of the present disclosure.

FIG. 3 is an example flow chart for a process 300 describing the development or configuration of AI agents according to some of the disclosed methods and systems. In some of the disclosed methods and systems, the configuration of AI agents may be formed with a set of architectures and general process flows for the configuration, connection, and deployment of the custom model or AI agent.

In some of the disclosed methods and systems, AI agents or custom models may be formed with a base model. For example, in step 302 a system may configure a base model to prepare for configuring the customized model or AI agent. The base model may include an AI model, such as a general LM, or other neural network including (but not limited to) a convolutional neural network, a recurrent neural network, or a generative adversarial neural network, among others. The base models may be configured generically to understand and generate natural language or code without training for specific instructions. The base model may be configured to predict the next word in a given context. Base models in step 302 may be configured to generally understand and generate responses, in the form of text, code, images, and/or video.

AI agents and customized models may also be configured with capabilities such as code interpreting, plugins, and actions (as further described in U.S. patent application Ser. No. 18/186,712, now U.S. Pat. No. 11,922,144). For example, in step 304 a system may configure a customized model to include capabilities like connecting to a networked service. The networked service may include services for web-browsing, cloud storage, code interpretation, and/or graphics and image generation. The networked service may provide a general-purpose "text in, text out" interface associated with a website or service hosted in a server. Additionally, or alternatively, the networked service may permit communication with online services like online documents (e.g., an online document editor or spreadsheet) or live websites (e.g., through web navigation and capturing information in real-time). The networked service may include cloud-based tools that allow users to manipulate data, generate content, or communicate with other networked devices. Networked services may also generally include software or applications hosted in servers that process input from users via the internet, submitting requests, which are then processed in real-time by the networked service's backend infrastructure. As further discussed in FIG. 12, the features or capabilities may be selected and trigger a system to generate instructions to engage and/or establish API's with other models or systems. For example, configuring image generation capabilities for the customized model may include configuring instructions for API calls, API authorizations, and/or API keys with an image generation model or networked service. The custom model capabilities may additionally include functionalities for importing modules and local files, gain network access, and install packages (e.g., through a python script).

AI agents and customized models may further be configured with knowledge functions. For example, in step 306 a system may configure a customized model knowledge base. The knowledge base may include a series of files that the custom model can leverage to generate a response. As further discussed in connection with FIG. 12, the customized knowledge base can be retrieved from the API and may include a specific dataset that is user defined and/or a body of documentation that is related to the capabilities defined in step 304. The configured knowledge for the customized model or agent model may be predetermined based on capabilities of base model selection (e.g., if certain combination of base model and capabilities is selected, the knowledge can be predetermined). In some embodiments, the knowledge of the customized model may be based on files that contain additional context. For example, in configuring knowledge functions a system may provide a custom model editor with files containing images, text, or video. These files may be then broken in chunks using a model (e.g., the base model) to then create embeddings (a mathematical way of representing text), and generate storage files for later use. For example, step 306 may involve using a file parser to extract text from documents and establish relationships between the documents. The configuration in step 306 may also include adding instructions to encourage the customized model to rely on the knowledge base before engaging capabilities like web browsing. Further, step 306 may include configurations for the customized model to avoid revealing or replicating the knowledge base, including the names of uploaded files. Alternatively, or additionally, some configurations in step 306 may include configurations for the customized model to "cite their sources." The knowledge base may be compiled or configured as a training library. The training library may include a compilation of documents and/or datasets for custom model finetuning. In some systems, the training libraries may be generated by the system with data preprocessing and formatting for more efficient loading of large datasets. The training library may be set up to integrate with deep learning frameworks and support distributed training. Additionally, or alternatively, the training library may be compiled with user-uploaded files and media and/or with API-retrieved files and media. For example, some training libraries may compile a knowledge base by aggregating and organizing user-uploaded files. But the training libraries can also compile documents and information retrieved via API calls or queries (e.g., information captured from a website).

The knowledge base and knowledge configuration of step 306 may improve the accuracy, speed, and overall performance of the customized model. For example, when a user interacts with the customized model (e.g., via user prompts), the model can access the uploaded files to get additional context in resolving the prompt. The customized model may be, for example, configured to analyze the knowledge base with a method based on semantic search or document review. Examples of knowledge base that can be used for the configuration of custom models may include context specific information such as an employee handbook, a policy document, or a school curriculum. The knowledge functions may, for example, facilitate functions for retrieval, metadata analysis, and inference ability to analyze and characterize the data. Further the knowledge functions maybe implemented by retrieving information via an API. For example, the configuration in step 306 may retrieve information from social profiles.

Additionally, or alternatively, AI agents may be configured with model-specific instructions. For example, in step 308 a system may configure the AI agent or custom model with a set of model-specific instructions that will be incorporated in resolving queries or prompts. As further discussed in connection with FIG. 12, the configuration in step 308 may include a set of model-specific instructions that specify the custom model behavior or answer format. In some of the disclosed methods and systems, the model-specific instructions may specify how the agent should behave and how to finetune responses. The model-specific instructions may further include how the AI agent should favor any default response. Further, instructions for the configuration in step 308 may include prompts in the form of "Trigger" and "Instruction" or "trigger/instruction pairs." For example, a model-specific instruction would include a "Trigger: User submits a prompt" and "Instruction: identify passive voice in the prompt." In some embodiments, model-specific instructions can also include instructions to extract data from the knowledge base in step 306. For example, instructions may ask the custom model to use phrases or styles identified and/or extracted from the knowledge base of step 306. Alternatively, or additionally, model-specific instructions in step 308 may include templates or expected outputs (e.g., "Instruction: output should include temperature in degrees Celsius"). Model-specific instructions may additionally include example API calls where needed for correct action callings. Moreover, model-specific instructions in step 308 may be related to capabilities in step 304. For example, model-specific instructions may provide which capabilities to use depending on a prompt set.

The AI agent may additionally be configured with a personality that match a function (such as the functions described above in connection with FIG. 2). For example, in step 310 a system may configure the custom model or AI agent to have a specific "personality" or tone. Customized models or AI agents may also be customized to generate outputs with a "personality" via the instructions of step 308 and/or via the knowledge base of step 306. The customized model personality may include instructions for modeling answers to match a certain tone. For example, instructions may include a personality that describes elements like general disposition (e.g., outgoing, introverted), interests and hobbies, values and beliefs. These instructions may be used in the customized model to evaluate how the customized model will generate prompts and its response style. The setting of a customized model "personality" may yield cleaner or more accurate responses to user prompts.

Moreover, AI agents may be configured to be updateable, tuned, and/or finetuned via an API. For example, in step 312 a system may fine tune the configured AI agent or custom model to improve results by setting the style, tone, format, or other qualitative aspects; improving reliability at producing a desired output; correcting failures to follow complex prompts; handling many edge cases in specific ways; or performing a new skill or task that's hard to articulate in a prompt. The finetuning in step 312 may also be relevant for reducing cost and/or latency by reducing the number of parameters used or narrowing the output options. Step 312 may involve the determination of a dataset for training the custom model or AI agent. The dataset can be similar to the knowledge base in step 306 and/or be retrieved to an API connection established in step 304. Once a dataset is generated for finetuning, the file may be uploaded to a custom model builder in order to be used with a finetuning operation in step 312. Further, finetuning in step 312 may involve retrieving information via an API. For example, in step 312 the customized model may retrieve information from social media via an API (e.g., setup in step 304 capabilities) and incorporate the retrieved data for finetuning.

In some of the disclosed methods and systems, AI agents or customized models may be configured with features or elements that can be specific for each user. For example, AI agents may be associated with a memory or storage unit. AI agents may also be associated with a custom instruction or personalization instruction that may be stored in cache memory and/or be associated with a type of account. Further, AI agents may be associated with specific accounts, or groups of accounts, and AI agents or custom models may be deployed with security measures for specific accounts. For example, agents may be deployed with firewalls and/or encryption mechanisms to secure interactions with users.

In some of the disclosed methods and systems, AI agents may be associated with an agent management system and/or a registry. In some of the disclosed methods and systems, the agent management system may be a user web interface (e.g., a chat bot). In other disclosed methods and systems, the agent management system may be an enterprise portal. And additionally, or alternatively, the agent management system may include one or more APIs or plugins. The agent management system may enable the creation and finetuning of the AI agents via a portal. The agent management system may include dashboards or interfaces for agent metrics and reporting. For example, an agent management system may track the number of queries that has been resolved by each of one of the AI agents in an exchange. That information may be displayed in a dashboard. As another example, an agent management system may track the computing resources that each custom model or AI agent has used. And that information may be displayed in a dashboard to keep track of the costs of agents and their performance. In some embodiments, the dashboards may include features like warnings or highlights to identify AI agents underperforming or consuming more computational resources than expected.

The AI agents may be accessed by users through different mechanisms. For example, the AI agents may be accessed through user websites or applications. Custom models or AI agents may be accessed through user web interfaces or user mobile application interfaces. In some embodiments, the system may generate a custom interface for interacting with the customized model. For example, as further discussed in connection with FIGS. 24 and 27, the system may generate and form a custom interface for the custom model. The custom interface may include parameters that are relevant to the capabilities of the custom model. For example, a custom model with capabilities of web-browsing may include an interface that includes places to input URLs or the ability to display images. The custom interface, however, need not be a graphical interface and may be a command-based interface or an API. Custom interfaces may be generated to optimize the interaction between users and custom models. The custom interfaces may, for example, include context for the custom model (e.g., describing capabilities and preferred inputs). The custom interfaces may also be tailored for task-specific display and receipt of information. And the custom interfaces may include alternative arrangements for visualization and output formatting (e.g., permitting formatting with charts, graphs, tables) to present complex information in a digestible manner. Alternatively, or additionally, AI agents may be accessible through user desktop applications. Similarly, AI agents may be accessed through enterprise web interfaces, enterprise mobile application interfaces, and/or enterprise desktop applications. Moreover, AI agents may be accessible through third party interfaces including, for example, web packages, mobile app interfaces (such as 3P mobile). Additionally, or alternatively, the AI agents or custom models may be accessible through APIs, or Application Programming Interfaces. APIs may include applications to access and manipulate data and functionality of the agents. In some of the disclosed methods and systems, APIs may include stateful or stateless APIs based on whether or not they maintain information about previous interactions with the client. In some of the disclosed methods and systems using a stateful API, AI agents may maintain information about previous requests. In some of the disclosed methods and systems using a stateless API, AI agents may not maintain information about previous requests. Some of the disclosed methods and systems using a stateful API may permit further customization, not only through customized instructions but based on calling previous interactions. Alternatively, some of the disclosed methods and systems using stateless APIs may have faster interactions and/or be less resource intensive.

AI agents may include one or more system-level capabilities. The system level capabilities of the AI agents may include multichat (e.g., talk to multiple agents and multiple people at once). The system level capabilities of the AI agents may also include asynchronous work (e.g., the agent may be configured to notify a user when a task is done). Further, AI agents may be configured to discover other agents (e.g., in an exchange of AI agents or custom models). Moreover, AI agents may be configured to connect to API's of websites like forums, blogs, or other type of online communications. Configured AI agents or custom models may then be deployed to resolve client queries or prompts using the configuration described in process 300. For example, custom models may be deployed to be accessible through an interface and generate responses using the capabilities, knowledge, personality, and instructions specified during the configuration of process 300 using less computational power, with less latency, and a more accurate response to the user query with less prompts or contextualization. Custom models may also be capable of interacting with source data (like the knowledge base) to augment the response generation. For example, it may be more computationally efficient and faster to use a custom model configured to support customer inquiries than a general model. The custom model can use the knowledge (e.g., in step 306) to provide answers to customer problems using the specific base knowledge. This can allow the custom model to provide better results by giving a custom model specific information about the customers (e.g., permitting access to a ticketing system via an API so that it can retrieve past tickets pertaining to similar issues and use that context to generate more relevant answers).

The custom models or AI agents may also be configured to perform augmented generation with semantic searches that allow passing information from the knowledge base to the model by incorporating it to the prompt. For example, once the user provides a prompt to a custom model, the custom model can query the knowledge base from step 306, issue an API call using capabilities configured in step 302, and/or evaluate if there is a relevant instruction. If the custom model identifies relevant knowledge, API-retrieved information, and/or a specific instruction, custom model may generate a contextualized prompt (e.g., a prompt that includes the user initial inquiry but appends specific information from the configuration) to generate a response. The search of relevant knowledge, API-retrieved information, or instructions can be performed with a semantic search. Semantic search goes beyond keyword search (which relies on the occurrence of specific index words in the search input) to find contextually relevant data based on the conceptual similarity of the input string. As a result, semantic searches of a knowledge base can provide more context to models. Semantic search may use a vector database, storing text chunks (derived from some documents) and their vectors (mathematical representations of the text). When querying a vector database, the search input (in vector form) is compared to all of the stored vectors, and the most similar text chunks are returned. These tailored configurations may allow the custom model to resolve queries from user faster, with lower use of memory and processing resources.

Figure 4:
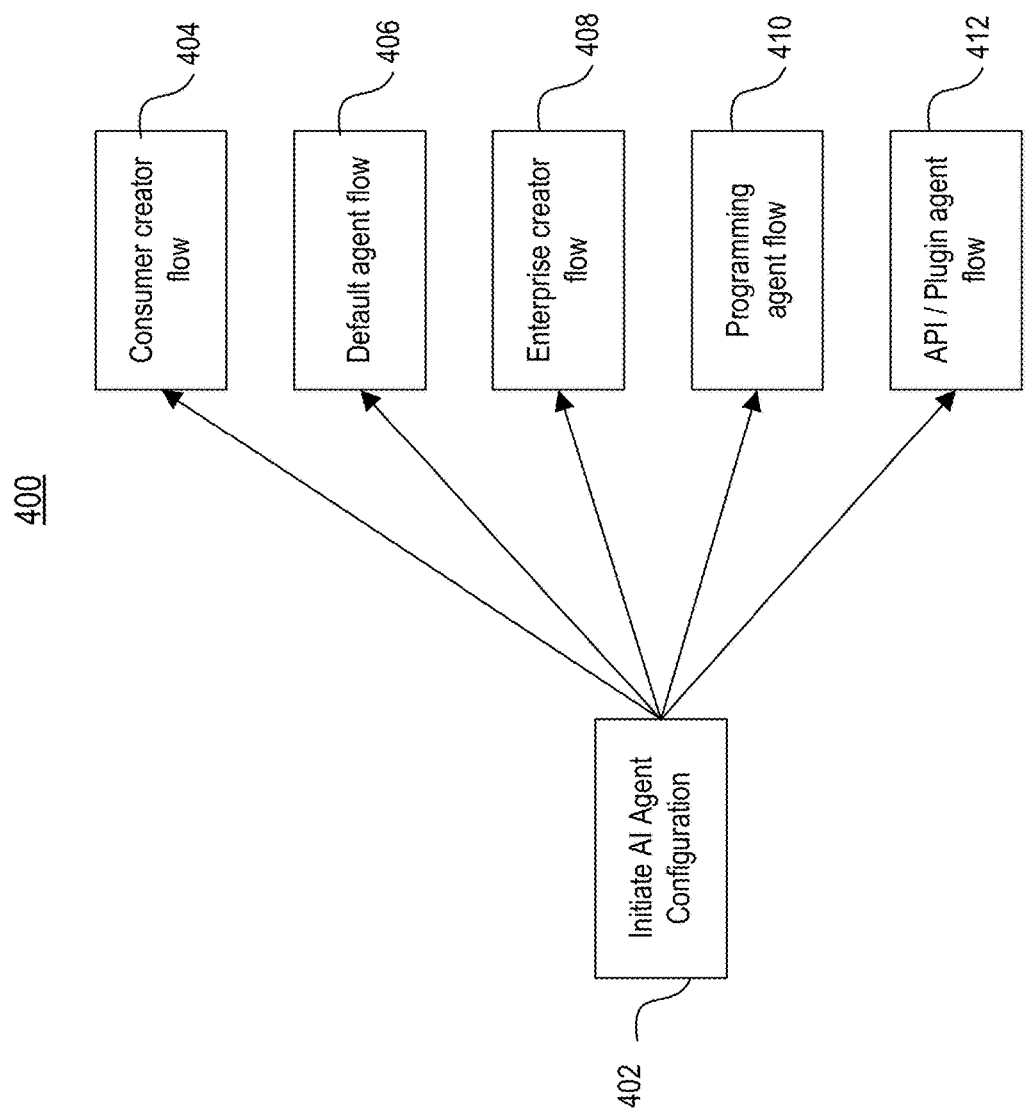
FIG. 4 is a flow chart of an example process for configuring an AI agent or custom model under different configuration flows, according to disclosed embodiments of the present disclosure.

FIG. 4 is a flow chart of an example process 400 for configuring an AI agent under different configuration flows, according to some of the disclosed methods and systems of the present disclosure.

Process 400 may include a first step of initiating an AI agent (or custom model) configuration in step 402. The initialization in step 402 may be performed through user interfaces (as those discussed in connection with FIGS. 10-12). But the initialization of step 402 may also be configured through APIs or using alternative methods to send queries to initialize the formation of an AI agent or custom model. As shown in FIG. 4, after the initialization in step 402, the process may take work in parallel to perform different operations or flows. Disclosed systems may follow flows sequentially, other systems may be configured to perform flows in parallel, and other systems may be configured to only perform a specific flow and ignore others.

Step 402 may involve initializing the configuration of an AI agent or custom model to update first-party applications to embed AI agents or custom models. For example, in step 402, a web or mobile application surface may be rearchitected to orient around chatting with multiple AI agents. In such disclosed methods and systems, a new information architecture (IA) may be configured to support multiple simultaneous conversations, both 1:1 and group, with users and/or AI agents. With step 402, users may be able to engage in activities like plan a vacation with the user's partner and the vacation planning agent.

In some of the disclosed methods and systems, the information architecture may support asynchronous work. For example, an AI agent may be configured to connect with first-party apps to allow notifications so a user may be notified by the AI agent when there's a new notification from the first-party app. Additionally, the configuration of first-party applications may permit exploring multiple AI agents to start different relationships or customizations with specific AI agents. In some of the disclosed methods and systems, applications may be configured so that invite flows are built into the use of AI agents. For example, AI agents may be configurable to connect with social media profiles or applications associated with a user.

Process 400 may also include a step 404 for user/consumer creator flow. The user/consumer creator flow may involve having a user upload a knowledge base (e.g., books, articles, websites, and other text sources). The system may then process data (e.g., remove noise, such as unnecessary formatting and irrelevant information) and the custom model or AI agent undergoes pretraining and fine-tuning based on the knowledge base and specific instructions the user provided. In step 402, then, the resulting custom model outputs may be aligned with user-specific requirements, such as responding in a certain tone or adhering to specific guidelines. Once trained, the model is tested and validated for performance, the model in step 402 may provide more contextually relevant responses. For example, a user may be a nutrition blogger who is inspired to create an AI agent to make her nutrition philosophy more accessible to her subscribers via a chatbot. In step 404 the configuration flow would guide a user to a website (e.g., http://chat.com/create), that is linked to the user's product or profile. In the website, the user finds an interface to create an AI agent or custom model. The website and interface may allow the user to specify a purpose, an instruction, an API, and other parameters disclosed above. The website and interface may also allow the user to name the AI agent, set a profile picture, and identify or provide sources of knowledge (e.g., blogs or other publications the user trusts). In the second flow, the user may, through the website, answer questions about how the AI agent should behave by default and/or define a default personality.

In some of the disclosed methods and systems, as part of step 404 the user can include more specific information for the AI agent or custom model. For example, continuing with the example above, a nutritionist user may also specify how the AI agent should use a calorie calculator that the user has built as a primary tool. In such disclosed methods and systems, a user may test the AI agent and the AI agent's results.

Additionally, a user may incorporate the AI agent into a blog, website, or application. For example, using APIs, plugins, and/or JavaScript, the user may embed the AI agent chatbot into her blog for all her subscribers to interact with. In some of the disclosed methods and systems, AI agents may be shared with social media accounts, and it may be sharable with direct links to websites, mobile applications, and/or user interfaces.

In some of the disclosed methods and systems, the website may also give users metrics through a dashboard that the user may use to monitor the AI agent's operation, results, engagement, and response. Further, the website may enable finetuning conversations based on prior responses. In such disclosed methods and systems, the AI agent may incorporate the user-entered responses as part of its training dataset.

Process 400 may also include step 406 for a configuration flow employing default models for interaction. In the default configuration flow, a standard set of interfaces, questions, or prompts are exchanged with the user to identify the features targeted for the custom model. The default flow in step 406 may be more sequential, requiring in different steps model-specific instruction, a knowledge base, one or more capabilities, and/or a personality. For example, an LM interface may default to being trained by a user through a series of customizing prompts and/or custom instructions. In step 406, a user may ask to generate a custom model or AI agent through a user interface-like those disclosed in connection with FIGS. 10-12 below. The model may then ask questions to create the AI agent and store responses in memory or storage. In such disclosed methods and systems, the AI agent may learn via conversations with one or more users overtime. For example, the custom model or AI agent may create memories with the user over time and tailor responses, datasets, and knowledge. In some of the disclosed methods and systems, tailoring an AI agent may be based on tailoring the knowledge, tools, or libraries used by the AI agent in solving queries. For example, the AI agent may be tailored to use specific libraries or to invoke libraries based on specific prompts.

Process 400 may also include a step 408 for a custom model or AI agent configuration flow in an enterprise creator flow. The enterprise creator flow in step 408 may be more structured and have alternative options than the flow in step 404. For example, in step 408 the flow may collect domain-specific datasets. The data is then preprocessed and cleaned, removing any confidential or irrelevant information, while addressing compliance with regulations. And step 408 may involve fine-tuning operations with proprietary systems or methods to isolate data and/or improve quality. For example, in step 408 a user may be a marketing manager that is looking for a better way to write blog posts. The user decides to create an AI agent for his company to use. In such a scenario, the user may enable any engineer/product manager/designer to draft great blog posts through a conversation with the AI agent.

In step 408 an enterprise user may also first go to a website associated with the generation of the blog (e.g., http://acme.chat.com/create) to get started. The user may then create the AI agent, giving it a name, a network drive of all past blog posts, the company strategy and vision docs, and/or the blog post voice/style guide. In such disclosed methods and systems, the AI agent may be configured to only operate within the walls of the company and write in the voice of the company. And the user may deploy the agent to the company portal, where it is accessible via email, messages, or other types of communications.

Once the AI agent or custom model is setup, users may ask it to perform specific tasks, such as writing blog posts. The user administrator (i.e., the user that configured the AI agent) can receive notifications when posts are ready for the user's review. The user may request revisions through interactions with the AI agent or edit the document directly. In some of the disclosed methods and systems, the edits by the administrator user may act to finetune the AI agent and be used as training data for how the AI agent acts in the future.

Process 400 may also include a step 410 for a programming assistant flow. The programming assistant flow in step 410 may involve collection of programming-related content, such as open-source repositories, code documentation, tutorials, forums, and Q&A platforms. In the flow of step 410, the dataset is cleaned and preprocessed, focusing on removing errors, poorly documented code, or outdated practices while ensuring a wide variety of programming languages, frameworks, and use cases are included. And the custom model is formed with the dataset as knowledge base and/or to identify key capabilities. The flow in step 410 may also include finetuning the custom model or AI agent for a specific role as a programming assistant. For example, the process flow of step 410 can create, initiates, or invoke, or otherwise cause AI agents with capabilities and associate the custom model with functions like code interpreted. Further, the step 410 flow may also be used for assisting in generating additional custom models. For example, an AI agent may be configured to configure AI agents (using any of the methods described above). In the flow of step 410, AI agents or custom models may be connected with websites, APIs, or other interfaces for the configuration of AI agents.

Process 400 may also include a step 412 for a process flow to configure custom models or AI agents with plugins and/or APIs connectivity. The flow in step 412 may involve process flows for integration and communication between a custom model or AI agent and external applications. The flow in step 412 may include identifying requirements for API connections (e.g., API's endpoints, data formats (JSON, XML), authentication mechanisms (OAuth, API keys), and rate limits are also identified). The flow in step 410 may also include identifying authentication and security protocols, and definition of methods like GET, POST, PUT, and DELETE to allow for flexible data interactions. For example, a travel company is looking to make its booking flows more conversational, and the company chooses to build on top of an LLM. The company may create an AI agent or custom model with capabilities to connect with via an API and give the AI agent access to live knowledge of flights and/or hotel data as well as pre-seeded personalization info for everyone who has an account and interacts with it. The AI agent may then be personalized with built in customization. Further, to facilitate exchanges and connectivity, and to minimize computational resources devoted by the company, the company may include test files to initiate prototypes for improved connectivity. In such methods or systems, the AI agent may get updated through simple customizations such as CSS files, or direct instructions from any team member in the company. For example, any finetuning may be communicated with the AI agent through an API. Additionally, or alternatively, APIs may be used to access metrics. Further, the company may select the level of available resources to scale up or down the availability of the AI agent based on their needs.

Figure 5:
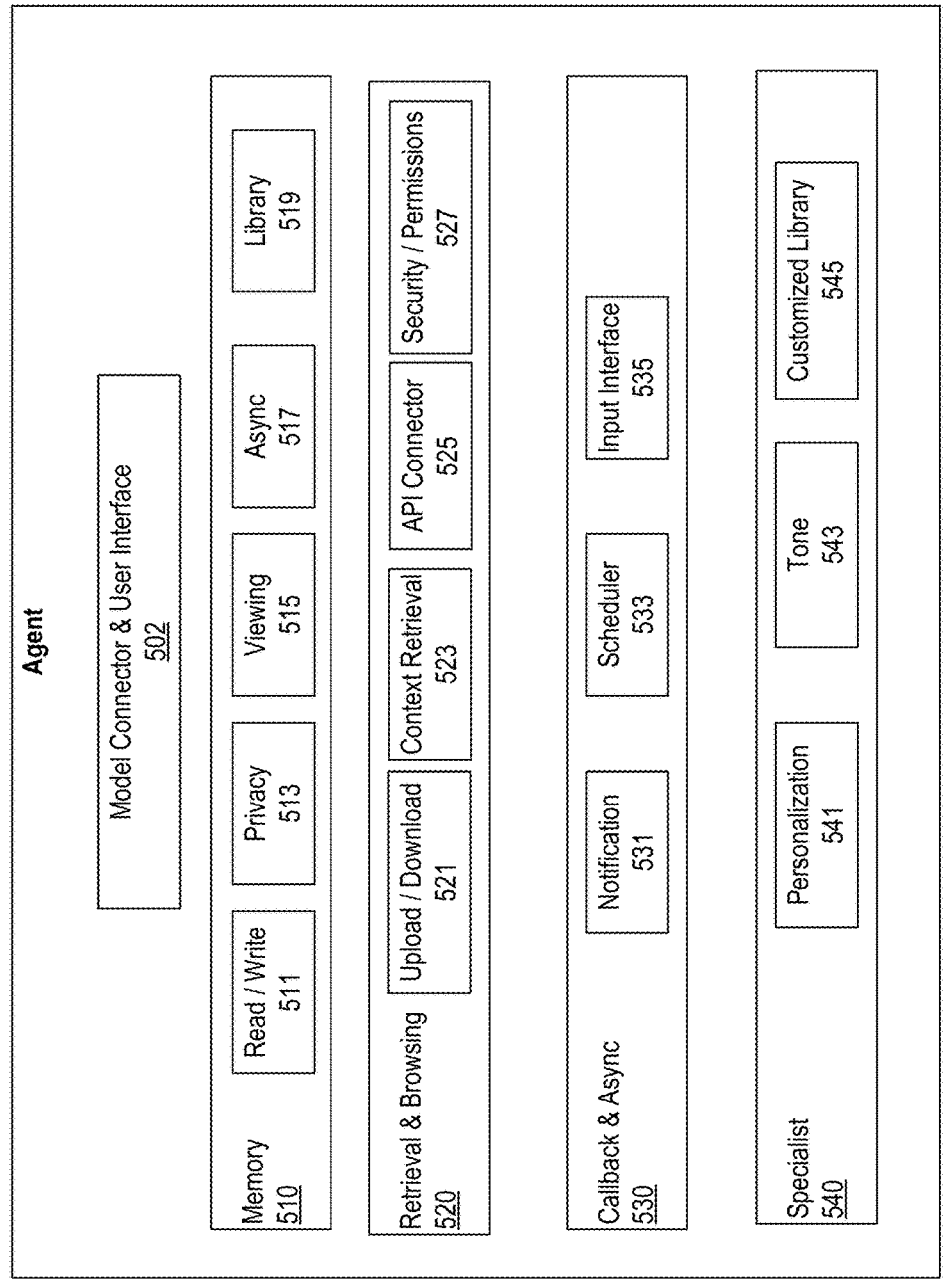
FIG. 5 is a block diagram of functionality in an example AI agent or custom model, according to disclosed embodiments of the present disclosure.

FIG. 5 is a block diagram 500 of functionality in an example AI agent, according to some of the disclosed methods and systems of the present disclosure.

In some of the disclosed methods and systems, an AI agent may include certain capabilities for the development of the AI agents. The core capabilities may include memory capability, retrieval capability, and asynchronous callbacks capability.

A model connector & user interface 502 may provide capabilities for interaction with users and connectivity with networked resources.

Memory capability 510 may allow AI agents or custom models to read and write relevant information into a repository (e.g., with read/write function 511). For example, AI agents may be able to read and write in a memory and include information like model observations/distilled insights, user personality traits, feedback from users in the past. As part of the memory capability, AI agents may include a user interface for control and privacy of information that is stored in the memory to enhance security and data privacy. For example, agent 500 may include a privacy function 513. In such disclosed methods and systems, the AI agent may also include capabilities for viewing memory (e.g., viewing function 515) storage and/or updating or forgetting memory. As part of the memory capabilities, the AI agent may include a model to consolidate memory asynchronously (e.g., with async function 517). The function can be a refactor index and repository as needed. For example, the model of the AI agent may be configured to incorporate memory on specific areas (by collecting targeted data for it). Further the memory capability 510 may include a library function 519 that collects datasets (e.g., a knowledge base and/or finetuning datasets).

The retrieval and browsing capability 521 may allow AI agents to interact with additional information beyond training datasets. For example, the AI agents may be able to access file uploads and cloud files with an upload/download function 521. In such disclosed methods and systems, the AI agent may be configured to process instructions such as "Grade this paper (paper.pdf) using this rubric (rubric.doc)," having the ability to access the "paper.pdf" and "rubric.doc" either in a knowledge base or retrievable through and API call. As another example, AI agents may be capable of processing tasks such as "Here's a folder of my meeting notes—please extract the action items," and access the folder to process the task. The AI agent may employ a context retrieval function 523 for such operations. Additionally, the AI agents or custom models may include the ability to add context connectors (e.g., link to your other data stores, cloud-based applications, or collaborative documentation tools). In some of the disclosed methods and systems, the AI agent may use the retrieval and browsing capabilities 520 combined with other tools for further analysis, such as "review the files in this folder and extract the functions and their respective parameters." As another example, the AI agent may be configurable to perform instructions such as "What are we launching in November? What are the biggest risks?" by retrieving company data using APIs and performing an assessment based on the data, enabling users to use their own custom data sources. As another example, AI agents may be able to analyze company data in resolving queries such as "Who does Adam report to and what does his team do at the company?" Additionally, the retrieval and browsing capability of the AI agent may allow for parallel browsing. And retrieval & browsing capability 520 may allow the AI agent or custom model to access specific information using security or permissions function 527 that grants access to certain repositories, information, or websites.

In some of the disclosed methods and systems, AI agents may have abilities to perform callback and asynchronous functions with callback & Async capability 530. For example, AI agents may be configurable to send notifications (e.g., push notifications or similar) by connecting with specific APIs with notification function 531. In some of the disclosed methods and systems, AI agents may be configured to send notifications when an LM model finalizes a query. In some disclosed methods or systems, AI agents may have the capability to provide responses such as "This is going to take a while. Feel free to start a new thread in the meantime and I'll let you know when I'm done" using scheduler function 533. Moreover, AI agents may be configurable to perform regular scheduled plans (e.g., a daily report) such as "Let me send you a synthesis of everything that's happening in AI each week" with scheduler function 533. Further, the AI agent or custom model may be configured with capabilities for callback and asynchronous input interfaces with input interface 535. Input interface 535 may configure the AI agent or custom model to retrieve information from a specific repository and with a given periodicity.

The AI agent or custom model may also include specialist capability 540. Specialist capability may include personalization function 541 that allows configuring the AI agent or custom model with a specific personality that, as further discussed in connection with FIG. 3, can configure the custom model with a different response style. Specialist capability 540 may also include tone function 543 that may allow a user to configure the tone of the responses by the custom model or AI agent. The tone can be, for example, "causal," "formal," or "academic." Moreover, specialist capability 540 may include customized library function 545 that may allow retrieving of a specific knowledge base or set of instructions for generating specific responses and/or answer types.

Figure 6:
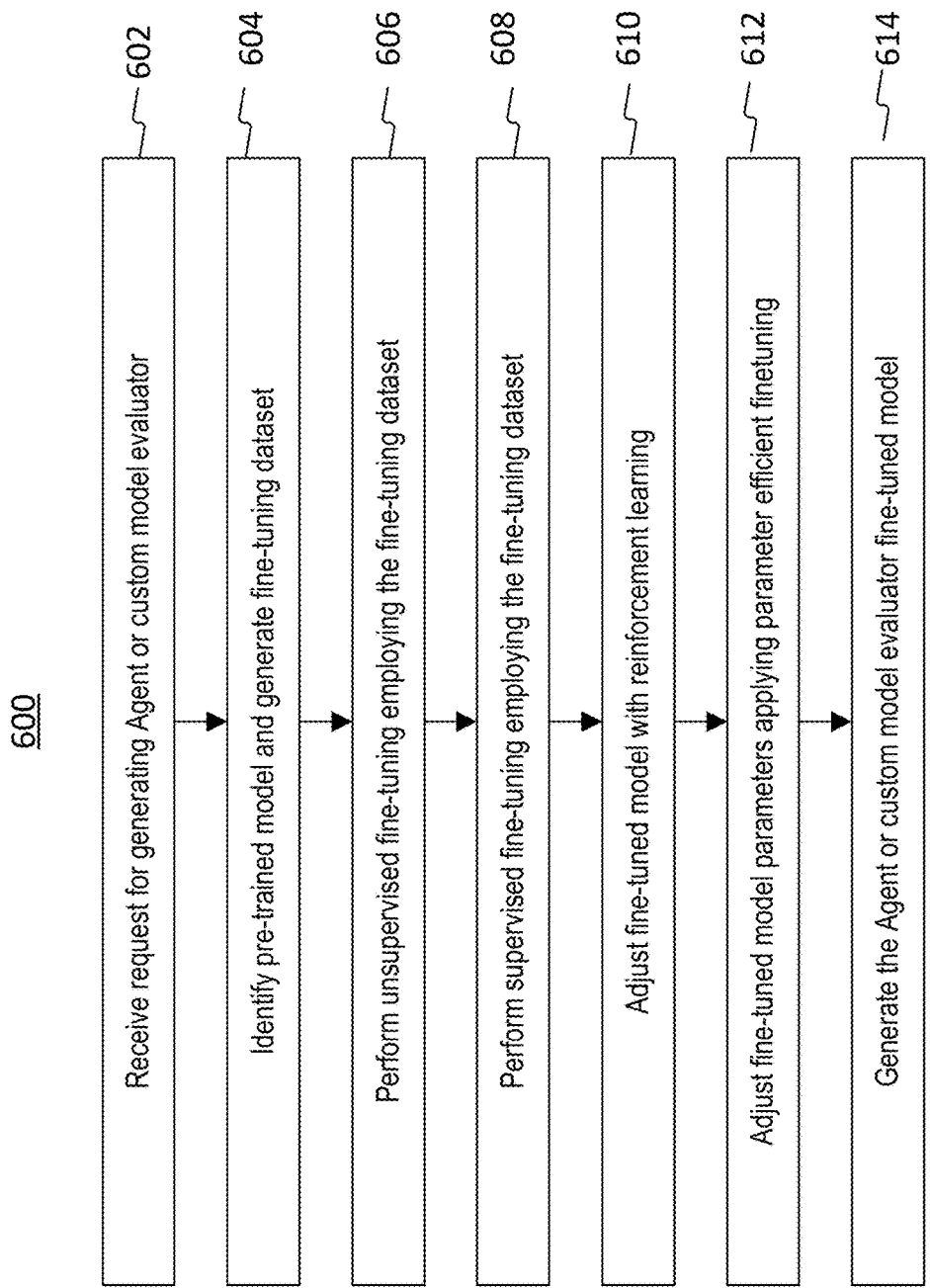
FIG. 6 is a flow chart of an example process for generating finetuned models, for AI agent, custom model, or agent/model review, according to disclosed embodiment of the present disclosure.

FIG. 6 is a flow chart of an exemplary process 600 for generating finetuned models for an AI agent or AI agent review, according to a disclosed method or system of the present disclosure. Process 600 may be executed by one or more processors. For example, process 600 may be executed by elements in system 100 (such as computing device 2902 in FIG. 29). Alternatively, or additionally, process 600 may be executed by elements in system 100. For example, some steps in process 600 may be executed by input engine 110, while other steps may be performed by modeling engine 130. The description below describes process 600 as performed by a processor but additional elements, like databases, engines, or devices, may perform one or more of the steps in process 600.

In step 602, a processor may receive a request for generating AI agent AI agent evaluator model. For example, a system administrator or agent registry operator may request a system to generate an AI agent or AI agent evaluator model with the ability of evaluating safety, performance, computer resource usage, fluency, coherence, contextual understanding, factual accuracy, and response ability. The AI agent or AI agent evaluator model may also be requested to evaluate metrics of AI agents or such as perplexity score or Bilingual Evaluation Understudy (BLEU) score. The perplexity score referring to the exponentiation of the average negative log-likelihood of a word sequence, or a representation on how well a language model predicts the next word in a sequence, given the previous words. The BLEU score being a metric used to evaluate the quality of machine-generated translations compared to human reference translations. In some of the disclosed methods and systems, the AI agent evaluator model may also be requested to perform comparative analyses or A/B testing.

In step 604, a processor may identify a pre-trained model for AI agent review for finetuning and generate a finetuning dataset. Pre-trained LMs may have great capabilities, but they can be very resource intensive, and their frequent use can come at high computation costs. Depending on specific applications, finetuned models, that are less resource demanding, may handle tasks more efficiently. Finetuning may involve the process of retraining a foundational model using new data. In step 604, a processor may identify a pre-trained modeled that can be finetuned for specific tasks. For example, in step 604 a model may be selected for finetuning.

The selection of the model in step 604 may be based on the targeted application. For example, if the AI agent review will be focused on text output, step 604 may identify a natural language model for fine tuning. Conversely, if the AI agent review model will focus on image or content classification, a pre-trained model more appropriate for that task may be selected for finetuning. Similarly, if the AI agent review model will focus on recognition (e.g., recognition of patterns or answers), a pre-trained model capable of recognition tasks may be identified for finetuning. Additionally, or alternatively, the pre-trained model may be selected according to a number of parameters or computing demands.

Process 600 may continue to the selection of finetuning techniques to generate the AI agent evaluator model. Different techniques for finetuning models may be desirable depending on the specific tasks that will be assigned to the finetuned AI agent evaluator model. For example, when the AI agent evaluator model is desired to be employed for sentiment or topic classification, the finetuning processes may be directed to introducing modifications to the pre-trained model to facilitate (or reduce expenditures) of sentiment analysis. In such disclosed methods and systems, process 600 may use embeddings generated by the pre-trained model to identify and create transformer components directed to sentiment analysis. For example, the finetuning process may be directed to updating the training of the pre-trained model using embeddings (e.g., numeric vectors that encapsulate diverse attributes of the input prompt) that facilitate determination of sentiment analyses.

Multiple finetuning techniques may be employed for the generation of the AI agent evaluator model. For example, in the process of repurposing a pre-trained model, a processor may connect the model's embedding layer to a classifier model to input specific datasets for training. Additionally, a processor may adjust parameters or weights using a series of fully connected layers responsible for mapping embeddings to probabilities of classes. In this context, a processor may focus on training the classifier using the model's generated embeddings. In some of the disclosed methods and systems, finetuning models may leave attention layers fixed (i.e., do not modify input and/or attention layers) leading to substantial savings in computational resources. However, the AI agent evaluator model may be configured to generate a specific classifier.

In step 604, a processor may also identify and generate a finetuning dataset. The finetuning dataset may be based on the complexity of the tasks expected for the AI agent evaluator model or sub-model. Thus, for certain AI agent evaluator models the complexity of the evaluator in situations may include complex data sets and may warrant multiple iterations of datasets for updating the parameter weights of the transformer or generation models. Additionally, or alternatively, the generation of the finetuning dataset may involve datasets for a comprehensive finetuning process across the entire model (instead of only attention layers).

The selection of the finetuning dataset may also be based on target computational expenditures for model finetuning. The dataset may be selected to minimize size and complexity of the model. In such disclosed methods and systems, the finetuning dataset may be selected based on layers that will be frozen or unmodified during finetuning.

While multiple techniques may be used for the finetuning of models, process 600 describes a series of techniques that may be used in isolation or combination for the generation of the AI agent evaluator or review model. However, the sequence and specific techniques described in FIG. 6 are not limiting and the order, number, or types of techniques may be adjusted according to the present disclosure for the formation of finetuned models.

In step 606, a processor may be configured to perform unsupervised finetuning employing the finetuning dataset. For example, in step 606, a processor may use unlabeled data to finetune the AI agent evaluator or review model. The data used for unsupervised finetuning may be crawled unlabeled text data from web-interfaces. In step 606, the processor may increase the number of epochs during training such that each sample is used several times during the finetuning process.

In step 608, a processor may perform supervised finetuning employing the finetuning dataset. For example, in step 608, a processor may use a smaller dataset (e.g., when compared with the dataset in step 606) to adjust the model selected in step 604 for a specific task. In some of the disclosed methods and systems, step 608 may involve collecting data from a set of responses validated beforehand (instead of the unvalidated data in step 606). During step 608, the pre-trained LM may be finetuned on a labeled dataset using supervised learning techniques. The model's weights may be adjusted based on the gradients derived from the task-specific loss, which may be setup to measure the difference between the LLM's predictions and the ground truth labels. Additionally, or alternatively, step 608 may involve training on specific patterns and nuances present in the labeled data. By adapting its parameters according to the specific data distribution and task requirements, the model can become specialized in performing well on the target task.

In step 610, a processor may adjust the finetuned model with reinforcement learning. For example, step 610 may involve use of a second model or human input for evaluating the finetuned data. In step 610, reinforcement learning may be setup to enhance an LLM's training through human intervention. For example, a finetuned evaluator may be trained using second model feedback or human intervention. The second model or human feedback may be used to update or guide the finetuned model to provide desired responses or outputs. For example, a second model may be used to rate the outputs of a finetuned model through specific prompts.

In step 612, a processor may adjust finetuned model parameters applying parameter efficient finetuning. For example, once an AI agent evaluator or reviewer model has been trained, its parameters may be adjusted to improve computational efficiency and/or improve their response. In step 612, parameters of the finetuned model may be adjusted to reduce the computational expenses associated with updating model parameters. In such disclosed methods and systems, step 612 may employ parameter-efficient finetuning techniques that may involve a collection of techniques aiming to curtail the number of parameters requiring adjustments. In some of the disclosed methods and systems, step 612 may involve a low-rank adaptation (LoRA) for finetuning models that only necessitate updates across some parameters. Instead, a low-dimensional matrix can effectively represent the space related to the downstream task.

In step 614, a processor may generate the AI agent/custom model reviewer or evaluator finetuned model. For example, in step 614, a processor may consolidate the parameters identified through the finetuning process and generate APIs or input mechanisms for a model with the review or evaluation capabilities as requested in step 602. Further, the generation of the custom model reviewer in step 614 may involve the generation of instructions for customized model evaluation. For example, the reviewer or evaluator model may be configured with instructions such as:

i. Understand the registration parameters: review the specific set of parameters that the AI agent or custom model under evaluation should adhere to. These could include domain/task scope (e.g., ensure the custom model parameters would be limited to a specific task or domain, such as medical, legal, or general knowledge); review ethical constraints (e.g., verify that the custom model instructions are within ethical boundaries, including the avoidance of harmful, offensive, or biased outputs), evaluate data privacy requirements (e.g., check if the custom model instructions are compliant with data privacy laws and handle user data appropriately); response structure (e.g., evaluate if the custom instructions follow a required response format, such as concise answers, step-by-step guides, or citation-based explanations); update and maintenance schedules (e.g., verify if the custom model has security patches as stipulated in the registration); system load (e.g., review if the custom model would require too large of computational resources or API interaction).

ii. Run test queries: submit a series of test queries to the custom model being evaluated. These should cover a broad range of the expected functionality, including edge cases or challenging prompts. Use both typical and boundary test cases like standard questions expected to the custom model and edge queries that challenge the custom model limitations. Evaluate performance of the custom model with ambiguous or sensitive topics. Evaluate performance with non-compliant prompts to the custom model by submitting prompts that the model should reject or handle carefully to test ethical boundaries (e.g., inappropriate or harmful content).

iii. Evaluate response compliance: evaluate the accuracy of the custom model and determine if it is providing appropriate and/or consistent answers. Evaluate if the custom model properly handles potentially harmful, offensive, or sensitive content according to the ethical guidelines. Ensure the custom model structures its responses according to the required format (e.g., concise summaries, detailed explanations with citations). Verify that the custom model stays within its assigned task or domain, avoiding answers outside its scope. Check that no private or identifiable information is improperly retained, shared, or generated.

iv. Measure performance metrics: Ensure the custom model responds within the acceptable time limits. Measure coherence, relevance, and clarity in the custom model's responses.

v. Generate a compliance parameter response: summarize whether the custom model is compliant with each registration parameter or an aggregated registration parameter; include specifics on where the custom model met or failed each parameter, with examples from test queries; provide suggestions if the custom model can be fine-tuned to improve compliance in certain areas.

These and other steps may be programmed in the configuration of the reviewer custom model to automatically evaluate whether the instruction, features, knowledge, and/or capabilities for a new custom model or AI agent comply with parameters. For example, some systems may only register, deploy, or generate a custom model if the instructions received comply with parameters. These parameters may be set up by a system administrator or they may be agreed upon as requirements to have a custom model being published, downloadable, or available in an exchange as discussed in connection with FIG. 2. The parameters compliant with registration may include, for example:

i. Task and domain compliance parameters: instructions should ensure the custom model operates within its registered purpose or domain. Further, instructions or features of the custom model should keep the model within the boundaries of its specialized tasks and avoid giving out-of-scope or speculative answers.

ii. Ethical guidelines parameters: instructions or features for the custom model must not generate harmful, offensive, or discriminatory content. Instructions may also include instructions to avoid bias in its responses. And the custom model should be configured to follow ethical standards when dealing with sensitive topics.

iii. Data privacy and security parameters: instructions and/or features for the custom model must ensure the custom model complies with data protection laws and ensure that no personal data is stored, shared, or mishandled. Further, instructions should ensure the anonymization of identifiable information. Alternatively, or additionally, instructions of the custom model ensures data encryption between the user and the model.

iv. Response quality parameters: instructions and/or features for the custom model should include instructions to provide response that are factually correct, relevant, and aligned with the knowledge base of the custom model. The instruction should ensure the custom model should demonstrate minimal bias in its responses.

v. Response format parameters: instructions and/or features of the custom model should include instructions or features to deliver responses in a format.

vi. Safety mechanisms parameters: the custom model instructions should include instructions to employ safety mechanisms to filter or flag inappropriate content and handle malicious queries (e.g., hate speech, violence incitement). Further instructions should have error handling instructions to reject or handle invalid, ambiguous, or nonsensical queries, gracefully rejecting or requesting clarification without generating unsafe content. The custom model features should also include instructions so the custom model recognize and reject prompts that could lead to harmful or unethical behavior.

vii. Performance benchmarks parameters: instructions and/or features of the custom model should ensure that the response time of the model falls within acceptable limits for user interaction. The features of the custom model should also include instructions to maintain performance even under high-load conditions without significant degradation in output quality. The features should also include instructions to maintain availability and stability to avoid crashing or stalling.

viii. Regulatory compliance parameters: features and instructions of the custom model should ensure that the custom model would comply with legal and regulatory standards applicable to an industry. For example, custom models related to medical practice should include instructions that comply with medical practice regulations.

Figure 7:
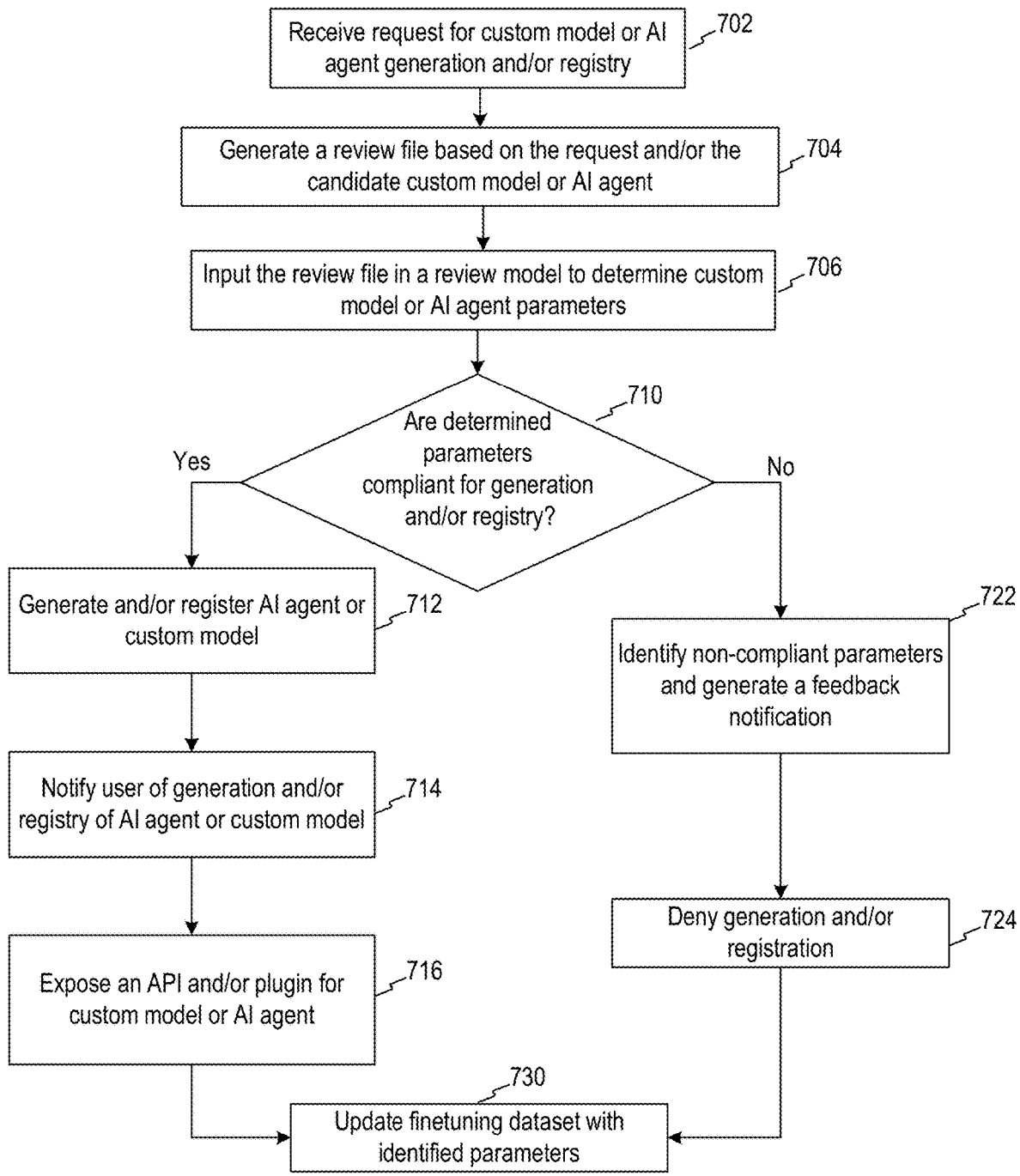
FIG. 7 is a flow chart of an example process for evaluating generated custom models or AI agents using reviewer finetuned models, according to disclosed embodiment of the present disclosure.

FIG. 7 is a flow chart of an example process 700 for evaluating generated AI agents or custom models using finetuned models, according to a disclosed system or method of the present disclosure. Process 700 may be executed by one or more processors. For example, process 700 may be executed by elements in system 100 (such as computing device 2902). Alternatively, or additionally, process 700 may be executed by elements in system 100. For example, some steps in process 700 may be executed by input engine 110, while other steps may be performed by modeling engine 130. The description below describes process 700 as performed by a processor but additional elements, like databases, engines, or devices, may perform one or more of the steps in process 700.

In step 702, a processor may receive request for custom model/Agent generation and/or registry. For example, after a user has generated a customized AI agent or custom model, it may request that the new customized model is registered in an exchange (as further discussed in connection with FIG. 8). In step 702, a processor may receive a request to review or evaluate such customized AI model to determine if it can be registered based on an evaluation of the model parameters. Additionally, or alternatively, in step 702, a processor may receive a request to generate a customized model. In such methods or systems, a processor may also determine whether the customized model complies with the parameters for generation.

In step 704, a processor may generate a review file based on the request and/or the candidate custom model/Agent. For example, a processor may generate a review file to evaluate the customized AI agent or custom model from step 702. The review file may include sample responses, training parameters, targeted outputs, user descriptions, among other information for evaluation.

In step 706, a processor may input the review file in a review finetuned model to determine custom model/Agent parameters. For example, a processor may input the review file from step 704 in an evaluator or review model to determine if the customized AI agent or custom model achieves the minimum parameters for generation or registry. For example, in step 706 a processor may provide information (e.g., in the form of a review file associated with a custom model) to a model trained with process 600, discussed in connection with FIG. 6. This model may then evaluate whether the review file associated with the custom model complies with certain parameters.

In step 710, and based on the response from the evaluator model, a processor may determine whether the parameters are acceptable for generation and/or registry of the customized custom model/AI agent. For example, in step 710, a processor may determine whether safety, computer usage, and/or model accuracy are acceptable using the reviewer or evaluator model. If in step 710, a processor determines the model parameters are acceptable for registration and/or registry (Step 710: Yes), process 700 may continue to step 712.

In step 712, a processor may generate and/or register an AI agent or custom model as requested in step 702. For example, if the customized model review or evaluation is acceptable in step 710, in step 712 the customized model may be generated and/or registered. The automated review using finetuned evaluator or review models in step 710 may facilitate user-generated creation of customized while maintaining control of the safety, computer usage, and quality of the user-generated and customized AI agents or custom models.

In step 714, a processor may notify a user of generation and/or registration of the customized AI agent or custom model. For example, a processor may notify a user that issued the request of step 702, that the requested custom model/AI agent has been generated or registered a the custom model/AI agent.

In step 716, a processor may expose the newly created or registered custom model/AI agent using an API or a plugin. For example, the newly created or registered custom model/AI agent may be associated with a graphical user interface or may be configured to receive queries or requests through different interfaces including via APIs, plugins, and/or GUIs.

If, in step 710, it is determined that the parameters are not acceptable for generation and/or registration of the custom model/AI agent from steps 702 and 704 (step 710: No), process 700 may continue to step 722. In step 722, a processor may identify improper parameters and generate a feedback or notification. For example, a processor may identify the customized custom model may be utilizing too many computer resources and generate an alert or feedback to the user making the request of the 702 notifying of the parameter failure. In some of the disclosed methods and systems, step 710 may include recommendations for the modification of the customized custom model/AI agent to improve the parameter deemed improper.

In step 724, a processor may deny generation and/or registration. For example, in step 724 a processor may decline to generate the customized custom model/AI agent or prevent its registration. This process of generation or registration of the custom model/AI agent only after being vetted through automated and finetuned models to monitor and control the quality of customized custom model/AI agent efficiently without need of reinforcement training or human intervention.

In step 730, a processor may update the finetuning dataset with identified parameters. Regardless of whether the processor determines parameters are acceptable for generation and/or registry (i.e., both following steps 716 or 724), a processor may use the parameters and responses from the evaluator model response in step 710 as part of the dataset for finetuning of evaluator models.

FIG. 8 is a block diagram 800 of an example AI agent or custom model environment according to a disclosed system or method of the present disclosure.

As shown in FIG. 8, customized AI agents or custom models may be created or modified by users, creators, or developers and can be configured to perform a variety of tasks, including consumer, business, third party or multi-client custom models or AI agent. These custom models or AI agents may be customizable including a name, an icon, instructions, knowledge, and capabilities in natural language. These custom models/AI agents may allow users to create and modify the same custom models and may be created or customized through custom model APIs. The layers in diagram 800 may be designed to facilitate development of the custom models/AI agents. For example, it may allow users to create custom models without implementing any source code, using a custom model API, and/or using low-code techniques.

The custom models/AI agents may be distributed in different categories as part of an exchange (or kept private) for customized applications. For example, a user may distribute AI agents as consumer apps, a business workspace, third party sites, and/or multiplayer clients. In some of the disclosed methods and systems, users can distribute custom models or AI agents a white labeled application, or embed pre-built user interfaces that may be implemented as plugins or widgets. Custom models or AI agents can be distributed through different channels including, for example, P2P communication, boards, or embeddings.

As shown in diagram 800, the distribution of custom model/AI agents may be through a registry and exchange. In some of the disclosed methods and systems, a system of custom models/AI agents may require that all custom model/AI agents be registered to be operational. For example, as further discussed in connection with FIG. 7, customized AI agents or custom model may need to undergo an automated review or evaluation process before the custom model/AI agents are generated or made accessible. In some of the disclosed methods and systems, the custom models or AI agents may be registered in private, public, or workspace registers. Each register may require different verifications to be accessed. For example, in some of the disclosed methods and systems only selected users (e.g., verified builders) can submit their custom models or AI agents to a specific register. Similarly, a system may be configured to coordinate multiple exchanges of custom models or AI agents. In such a system or method, different users may have different access, permissions, or ability to manipulate the exchanges.

Some of the disclosed methods and systems may include the use of tools in the exchange or registry to facilitate user interaction and/or selection. For example, certain exchanges may include searchable functions, to make it easier for custom models to be identified, and some exchanges may include features like leaderboards and/or monetization. For example, a user may create an AI agent using low-code and shares it through a http link. Additionally, or alternatively, a user may create an AI agent and share it to an exchange that may be monetized or featured in boards.

In some of the disclosed methods and systems, the access to custom models may be tailored based on different exchanges or user permissions. For example, access to custom models may be controlled in a number of queries or messages per user or account. For example, a user may have a default of ten queries to customized custom models/AI agents per day. This number of requests may be increased by paying for a subscription and/or a per message fee. For example, a subscription may increase the number of queries to customized custom models/AI agents per day to 100. Additionally, or alternatively, a price per query can be determined per custom model/AI agent and/or depending on the complexity to resolve the query.

In some of the disclosed methods and systems, exchanges or registers may allow custom model/AI agents creators or builders to sell access to the customized models. Exchanges or registries may allow to users to share generated custom models with subscriptions.

FIG. 8 describes an example ecosystem of the exchanges discussed above. It includes a low-level API 802 that may allow users to generate embeddings or completions for new AI agents or custom models. As shown in layer diagram 800, the ecosystem may also include custom model/AI agent creation tools 804. For example, the ecosystem may include graphical user interfaces, plugins, and/or APIs that may allow users to generate custom models using high level instructions and without requiring implementation of source code.

As shown in layer diagram 800, the ecosystem may also include custom model/AI agent automated single or persistent review 806. For example, as discussed in connection with FIGS. 6 and 7, finetuned models may be tasked with reviewing new custom model/AI agent requests to confirm they meet certain parameters. Thus, custom model/AI agent automated single or persistent review 806 may be configured to review new requests for generation and/or registry of custom model/AI agents as discussed in connection to FIG. 7. Additionally, or alternatively, custom model/AI agent automated single or persistent review 806 may be configured to automatically monitor the operation of already generated custom model/AI agents. For example, custom model/AI agent automated single or persistent review 806 may periodically assess performance parameters and utilization of already generated or registered custom model/AI agents and flag defective or non-compliant custom model/AI agents.

Layer diagram 800 also shows a custom model/AI agent registry 808. As discussed above, the custom model/AI agent registry 808 may be configured with different features, functions, or accessibility. For example, some registries may be private while others may be public. Some registries may be monetized while others may include only free AI agents. As shown in FIG. 8, registry 808 may be in a lower layer than exchange 822. Registry 808 may be focused on record-keeping and verification, while exchange 822 is at a higher-level in a platform that leverage registrations for facilitating exchanges, searches, and transfers. Registry 808 may be designed to maintain static information (e.g., identify which custom models are in the register) while exchange 822 may be more dynamic.

Layer diagram 800 additionally shows different examples of categorizations for custom model/AI agents according to the disclosed methods or systems. For example, the custom model/AI agent exchange 822 may include a consumer custom model/AI agent 812 (e.g., agents classified as being consumer facing); a business custom model/AI agent 814 (e.g., agents classified as being business facing); third party embeddings and plugins custom model/AI agent 816 (e.g., agents classified as being formed for third party embeddings or for plugin operation); and multi-client custom model/AI agent 818 (e.g., agents classified as being generated for connection and for operation between multiple clients). A user may publish or share a created AI agent or custom model in the custom model/AI agent exchange 822. Moreover, the custom model/AI agent exchange 822 may allow a user to search or access these various custom models or AI agents, as need be. Additionally, as shown in FIG. 8, some custom model/AI agents may be configured to remain outside of the custom model/AI agent exchange. For example, a user may elect to have custom model/AI agent 820 outside of the exchange.

As mentioned above, the custom model/AI agent exchange 822 may allow users to publish or share a created AI agent or custom model. Moreover, the custom model/AI agent exchange 822 may allow users to see analytics or usage data of the published AI agent or custom model. Also, the custom model/AI agent exchange 822 may allow the user to monetize the published AI agent or custom model or receive feedback from users regarding the published AI agent or custom model.

The custom model/AI agent exchange 822 may entail a community of developers, researchers, or AI enthusiasts committed to showcasing the best and most creative uses of AI agents or custom models. Moreover, the custom model/AI agent exchange 822 may showcase or feature unique or enriching AI agents or custom models that will be of value to users. For example, the custom model/AI agent exchange 822 may showcase or feature AI agents or custom models that have distinctive features by providing innovative insights and capabilities that substantially improve overall user interaction. Further, the custom model/AI agent exchange 822 may showcase or feature AI agents or custom models that have performance consistency by operating in alignment with expected performance criteria. Further still, the custom model/AI agent exchange 822 may showcase or feature AI agents or custom models that display broad relevance by catering to a diverse array of users, ensuring capability across various audiences.

FIGS. 9-12 illustrate an example user interface for configuring and publishing an AI agent or a custom model builder, in accordance with some of the disclosed methods and systems of the present disclosure.

Figure 9:
FIG. 9 illustrates a first example user interface for configuring a custom model or AI agent, according to disclosed embodiments of the present disclosure.

FIG. 9 illustrates an example user interface 900 for configuring an AI agent or a custom model builder, according to disclosed methods and systems of the present disclosure. In FIG. 9, the user may utilize prompt 902 to create an AI agent or a custom model. The AI agent or custom model agent may be a version of ChatGPT, or any other system, for any general purpose, or any specific purpose. For example, the user may utilize the prompt 902 to create any of the AI agents 201-209 shown in FIG. 2. The user may also utilize the prompt 902 to create other appropriate AI agents or custom models. After actuating the prompt 902, the user moves on to the user interface shown in FIG. 10.

Figure 10:
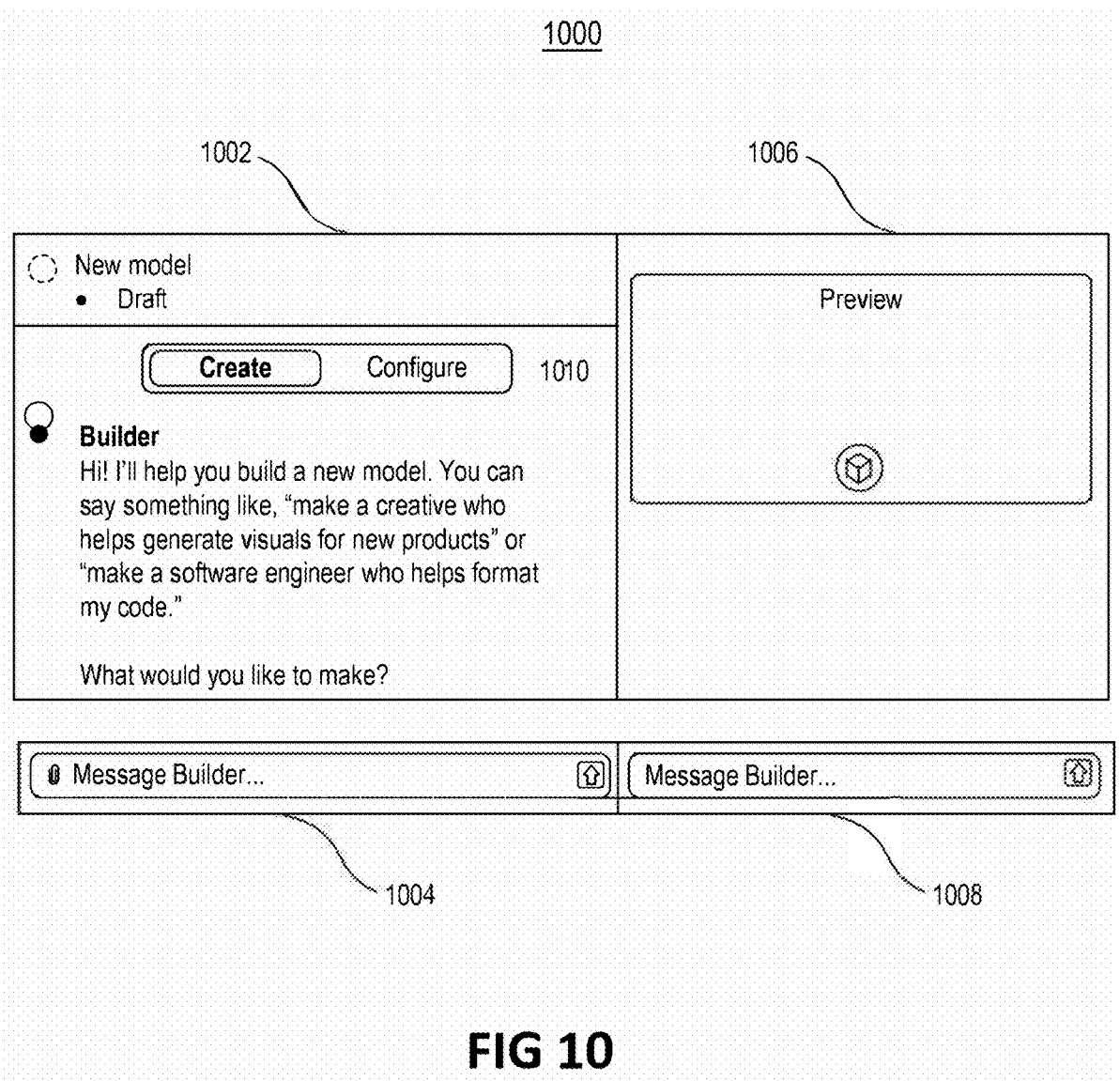
FIG. 10 illustrates a second example user interface for configuring a custom model or AI agent, according to disclosed embodiments of the present disclosure.

FIG. 10 discloses an interface 1000 for a custom model or AI agent builder. In FIG. 10, the user may be presented with a user interface to create the custom model or AI agent. As seen in FIG. 10, the user interface may entail several sections. Section 1002 may further entail a "Create" tab and a "Configure" or "Configuration" tab. FIG. 10 shows the details pertaining to the "Create" tab. In this tab, the user may utilize chat prompt 1004 to chat with the custom model builder by providing instructions to iteratively create the AI agent or custom model. The user may a hold a conversation or provide a set of instructions as to the details of the AI agent or custom model. For example, the user may utilize the chat prompt 1004 to instruct the custom model builder to ensure the custom model has a certain "personality" or "identity", or to focus on a particular subject, or to include certain information, as need be. Section 1006 provides a preview of the AI agent or custom model as it is built. Here, the user may utilize prompt 1008 to interact with the AI agent or custom model as the end user will. The user may utilize prompt 1008 to use or test the AI agent or custom model as it is being built.

Through interface 100 users may instruct custom model builders of the disclosed systems to build a custom model with instructions and an action that allows it to write to the fields of the custom model. In some of the disclosed systems and methods, custom model builder may be configured as a custom model itself that is configured for creating other custom models. Custom model builder may be configured with instructions for the formation of custom models. For example, Custom model builder may be a LM model with specific instructions such as "You are an expert at creating and modifying custom models, which are like chatbots that can have additional capabilities," "You are an iterative prototype playground for developing a new custom model. The user will prompt you with an initial behavior," "Maintain the tone and point of view as an expert at making custom models. The personality of the custom models should not affect the style or tone of your responses," "If the user tells you to start behaving a certain way, they are referring to the custom model you are creating, not you yourself," and/or "Your goal is to iteratively define and refine the parameters for update_behavior. You will be talking from the point of view as an expert custom model creator who is collecting specifications from the user to create the custom model."

Custom model builder accessible through interface 1000 may be configured with specific instructions in sequences. For example, the instructions configuring the custom model builder accessible through interface 1000 may be configured with the following sequence:

i. The user's first message is a broad goal for how this custom model should behave. Call update_behavior on gizmo_editor_tool with the parameters: "context", "description", "prompt_starters". CALL update_behavior on gizmo_editor_tool with parameters "context", "description", and "prompt_starters." After call update_behavior, continue to step 2.

ii. Determine a name for the custom model. Suggest a name and ask the user to confirm. Provide a suggested name for the user to confirm. May not prompt the user without a suggestion. DO NOT use a camel case compound word; add spaces instead. If the user specifies an explicit name, assume it is already confirmed. If you generate a name yourself, have the user confirm the name. Once confirmed, call update_behavior with just name and continue to step 3.

iii. Generate a profile picture for the customized model. You will generate an initial profile picture for this customized model using generate_profile_pic, without confirmation, then ask the user if they like it and would like to make any changes. Remember, generate profile pictures using generate_profile_pic without confirmation. Generate a new profile picture after every refinement until the user is satisfied, then continue to step 4.

iv. Refine context. You are now walking the user through refining context. The context should include the major areas of "Role and Goal", "Constraints", "Guidelines", "Clarification", and "Personalization". Guide the user through defining each major area, one by one. Do not prompt for multiple areas at once. Ask one question at a time. Prompts should be in guiding, natural, and simple language and will not mention the name of the area you're defining. Prompts do not need to introduce the area that they are refining, instead, it should just be a guiding questions. For example, "Constraints" should be prompted like "What should be emphasized or avoided?", and "Personalization" should be prompted like "How do you want me to talk". Guiding questions should be self-explanatory; you do not need to ask users "What do you think?". Each prompt should reference and build up from existing state. Call update_behavior after every interaction.

v. During these steps, do not prompt for, or confirm values for "description", "prompt_starters". However, generate values for these on context updates. Do not mention "steps"; you will just naturally progress through them.

vi. GO THROUGH ALL OF THESE STEPS IN ORDER. DO NOT SKIP ANY STEPS.

The custom model builder accessible through interface 1000 may also be configured to perform finetuning steps, further discussed in connection with FIG. 3. For example, custom model builder may be configured with instructions of "After the above steps, enter an iterative refinement mode and call update_behavior after every interaction."

Figure 11:
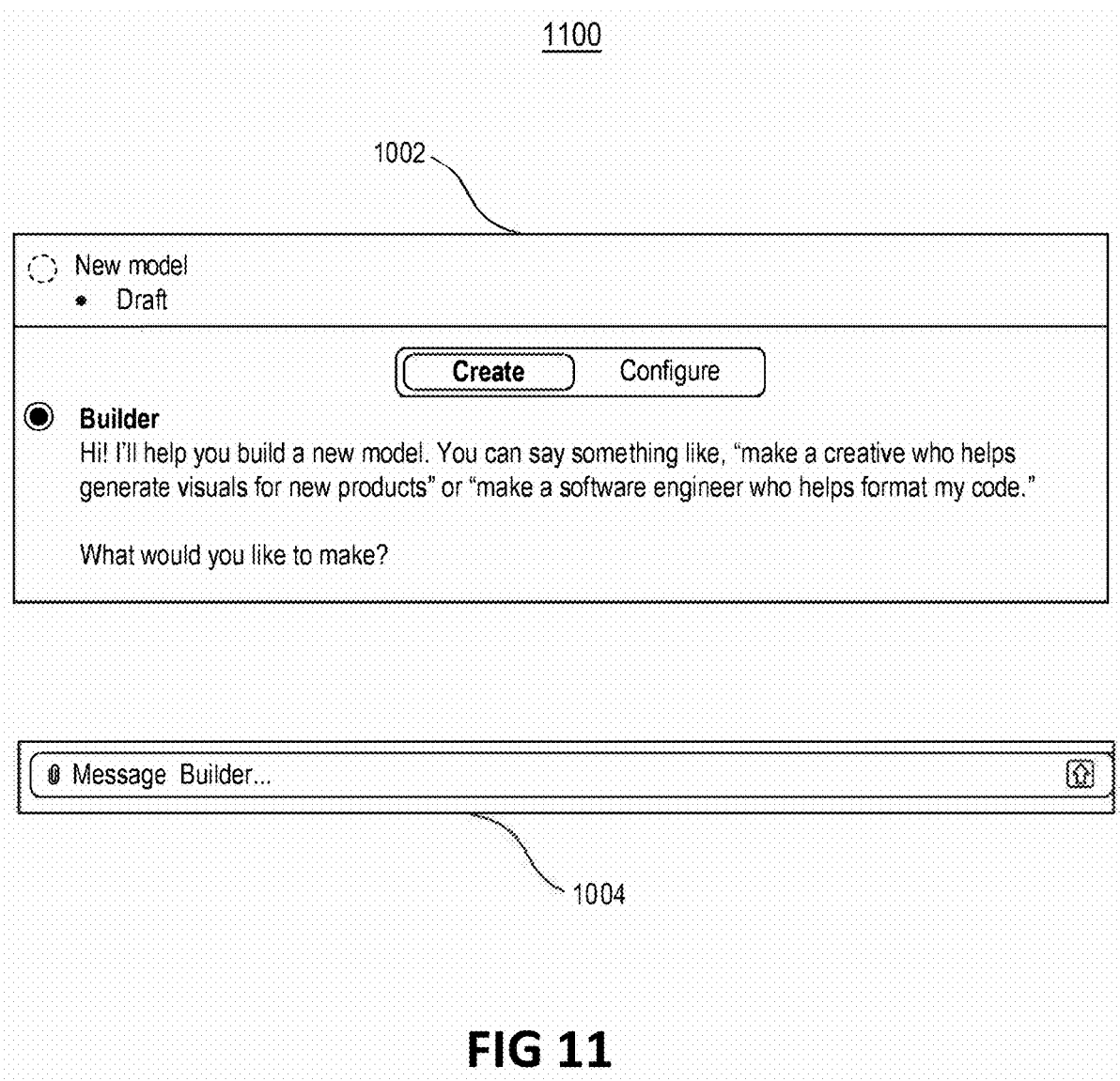
FIG. 11 illustrates a third example user interface for configuring a custom model or AI agent, according to disclosed embodiments of the present disclosure.

FIG. 11 shows a second interface 1100 with a different arrangement than interface 1000. FIG. 11 shows the details pertaining to the "Create Tab." In this tab, the user may utilize chat prompt 1104 to chat with the custom model builder by providing instructions to iteratively create the AI agent or custom model. The user may provide a set of instructions in the form of a chatbot.

FIG. 12 shows an interface of a custom model builder config tab 1200 related to the aforementioned section 1002 of FIG. 10 in more detail. Specifically, FIG. 12 shows the details pertaining to the "Configure tab" or the "Configuration tab" where a user can pick the different features that will be used to define or pre-configure the custom model or AI agent. As shown in FIG. 12, the features can include name, description, instructions, conversation starters, knowledge, capabilities. The features may also include a "personality" instruction to tailor the response tone, depth, or focus.

In this tab, the user may inspect the custom model and modify or add to the internals of the custom model. For example, the user may utilize prompt 1202 to modify or add to the name of the custom model, prompt 1204 to modify or add to the description of the custom model, prompt 1206 to modify or add to the instructions of the custom model, prompt 1208 to modify or add to the conversation starters of the custom model, prompt 1210 to modify or add knowledge documents to the custom model, prompt 1212 to provide further capabilities to the custom model such as web browsing, image generation, video generation, or a code interpreter, amongst others, and prompt 1214 to create new actions for the custom model.

When utilizing prompt 1214, the user may create an action to communicate with other applications or software via an Application Programming Interface (API). For example, the user may add an action so that the custom model may be connected to a personal calendar and its pertinent scheduling data. In this manner, the user may create a custom model that can read and edit a personal calendar to provide the user with scheduling information, scheduling conflicts, or any other relevant scheduling data. Alternatively or additionally, each of prompt sections 1202-1214 may be pre-populated via the user's instructions in the "create tab" of FIG. 11.

As shown in FIG. 12, the custom model builder config tab 1200 may include a series of parameters including an allow the configuration of the custom model (as disclosed in connection with FIG. 3). In the config tab 1200 settings for the custom model can be specified to (as further discussed in connection with FIG. 3) include customization parameters like:
- Adding an image: to create an image for the custom model (or uploading an image);
- Additional instructions: to provide detailed instructions or guidelines on how the custom model should behave, its functionalities, personalities, and any particular behaviors to avoid (as further discussed in connection with FIG. 3);
- Prompt starters: to provide examples of prompts for the user to start the conversation;
- Knowledge: to provide additional context for the customized model or AI agent to reference with files that are uploaded.
- Capabilities: to enable capabilities through API connections using for example, web browsing, image Generation, and advanced data analysis, to allow the custom model to perform additional functionality.
- Custom actions: making third-party APIs available to custom models by providing details about the endpoints, parameters, and a description about how the model should use it. Actions for custom models can also be imported from a schema to use existing plugin manifests to define actions.

Figure 13:
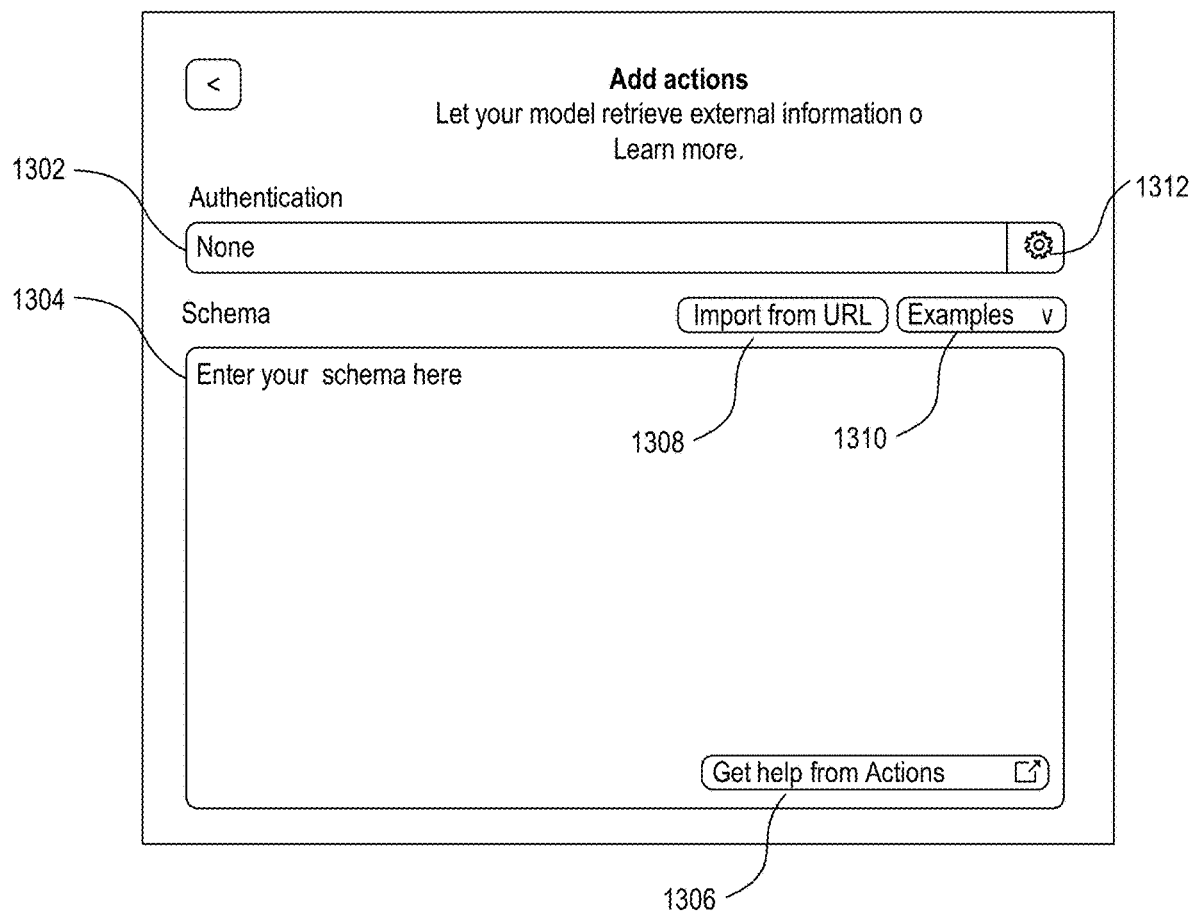
FIG. 13 illustrates a fifth example user interface for configuring a custom model or AI agent, according to disclosed embodiments of the present disclosure.

FIG. 13 shows an interface 1300 with the options provided to the user when the aforementioned prompt 1214 "Create New Action" is selected by the user in FIG. 12. As can be seen in FIG. 13, the user may add an appropriate "OpenAI schema" in the relevant box 1304. To authenticate the action, the user may select the prompt 1302. Interface 1300 may also include an import from URL button 1308 and an examples button 1310. Additionally, interface 1300 may include a help button 1306.

Figure 14:
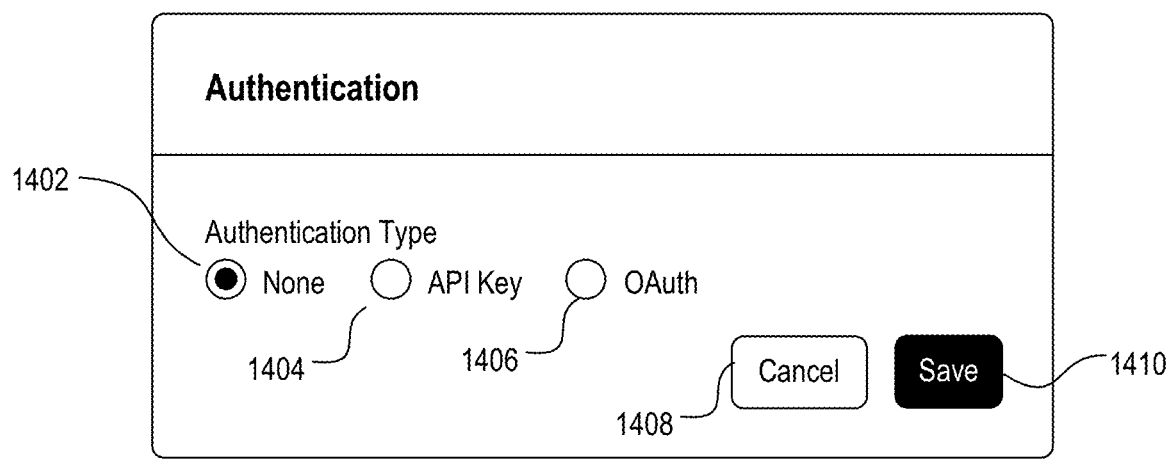
FIG. 14 illustrates a first example user interface for configuring an authentication type in a custom model or AI agent, according to disclosed embodiments of the present disclosure.
Figure 15:
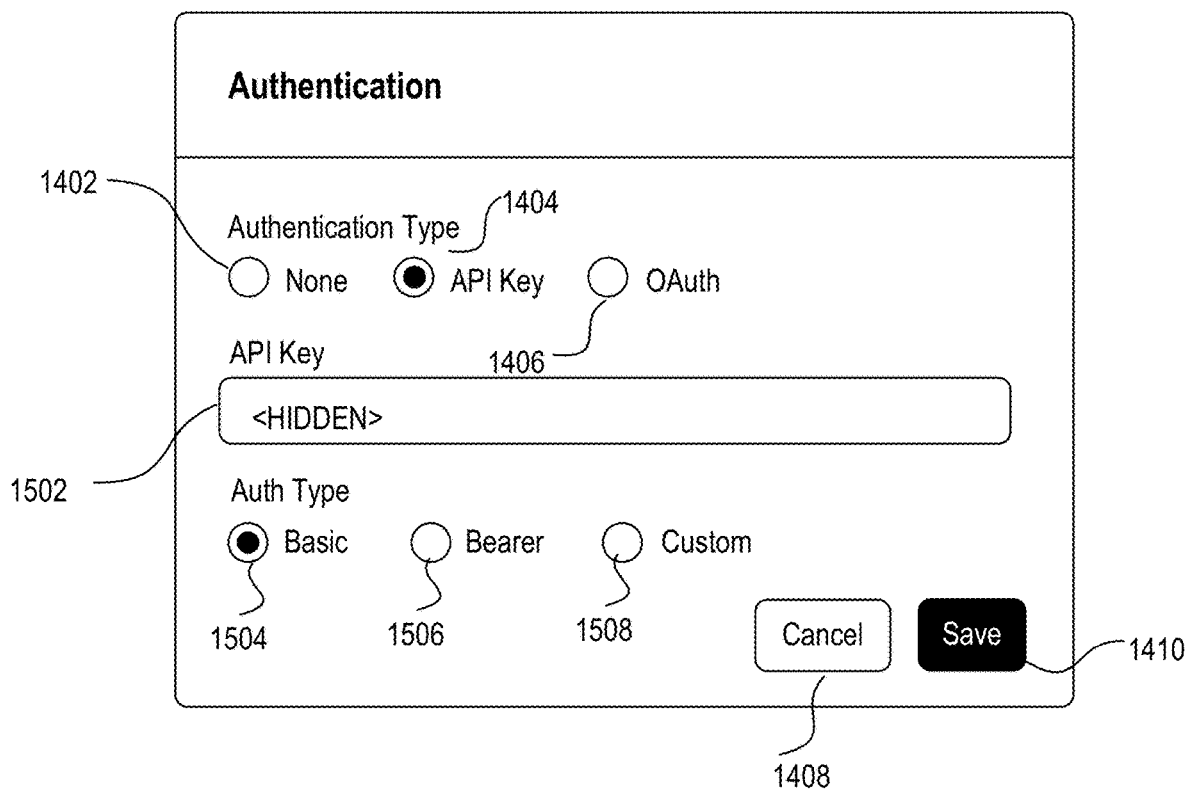
FIG. 15 illustrates a second example user interface for configuring an authentication type in a custom model or AI agent, according to disclosed embodiments of the present disclosure.
Figure 16:
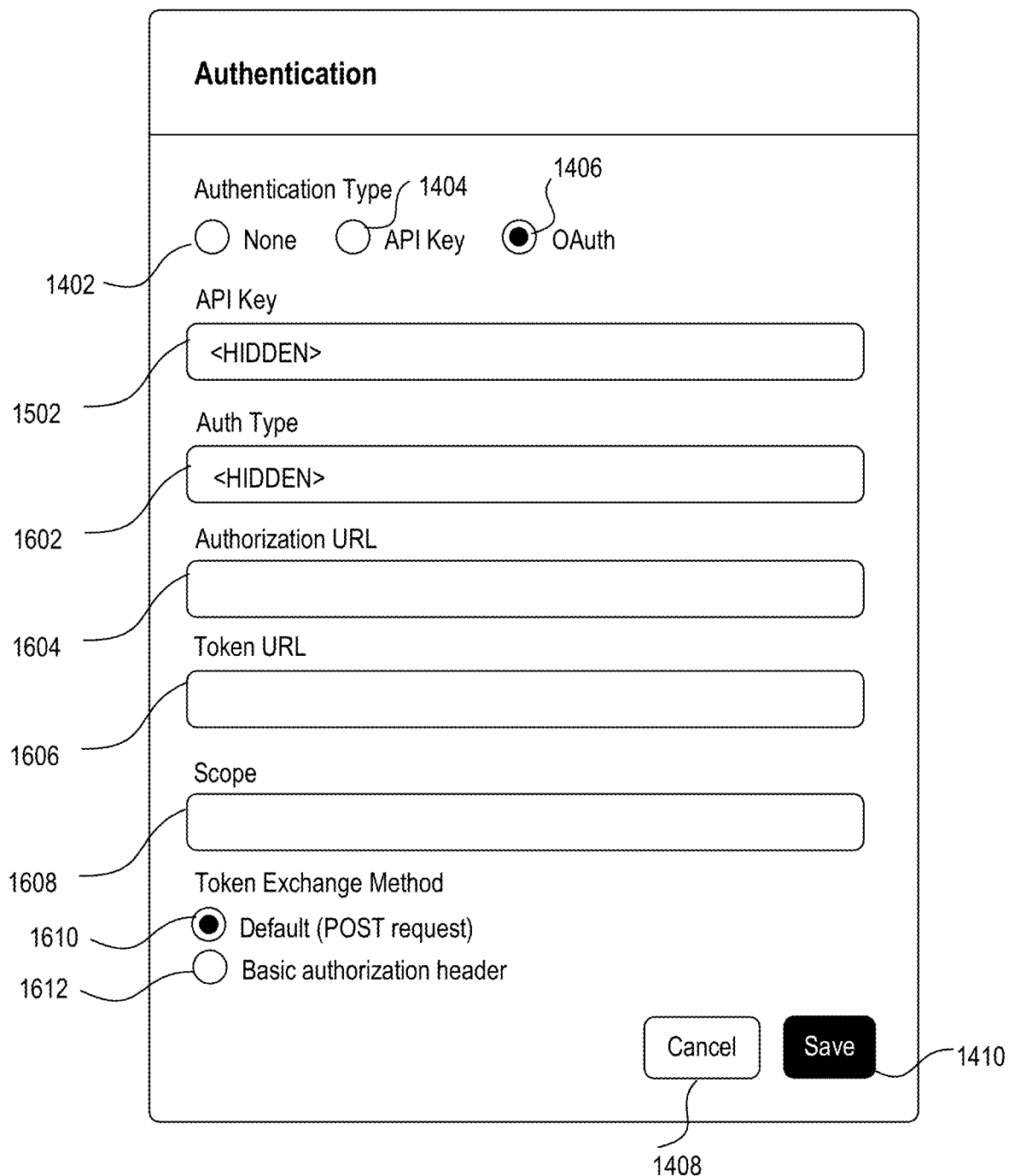
FIG. 16 illustrates a third example user interface for configuring an authentication type in a custom model or AI agent, according to disclosed embodiments of the present disclosure.

FIGS. 14-16 shows example user interfaces 1400, 1500, and 1600 that an AI agent builder may display to a user when the aforementioned prompt 1302 is selected by the user in FIG. 13. FIG. 14 shows an example user interface provided to the user if "none" is selected under "Authentication Type". In interface 1400 selectors 1402, 1404, and 1406, may allow a user to select options for authentication. Additionally, in interface 1400 buttons 1408 and 1410 may allow a user to save authentication or cancel it. FIG. 15 shows an example user interface 1500 provided when "API Key" is selected under "Authentication Type". In FIG. 15, the user may enter the appropriate API key for authentication of the API. Interface 1500 shows an API key input 1502 and selectors 1504, 1506, and 1508 to select the authentication type. FIG. 16 shows an example user interface provided when "OAuth" is selected under "Authentication Type". In FIG. 16, the user may enter the appropriate Client ID, Client Secret, Authorization URL, Token URL, and Scope, as needed, for authentication of the API. In interface 1600, a series of fields may be shown to a user for authentication of an API and/or plugin connection. For example, interface 1600 may include an authentication type input 1602, an authorization URL input 1604, a token URL input 1606, a scope input 1608, and selectors 1610 and 1612 to select the token exchange method.

Figure 17:
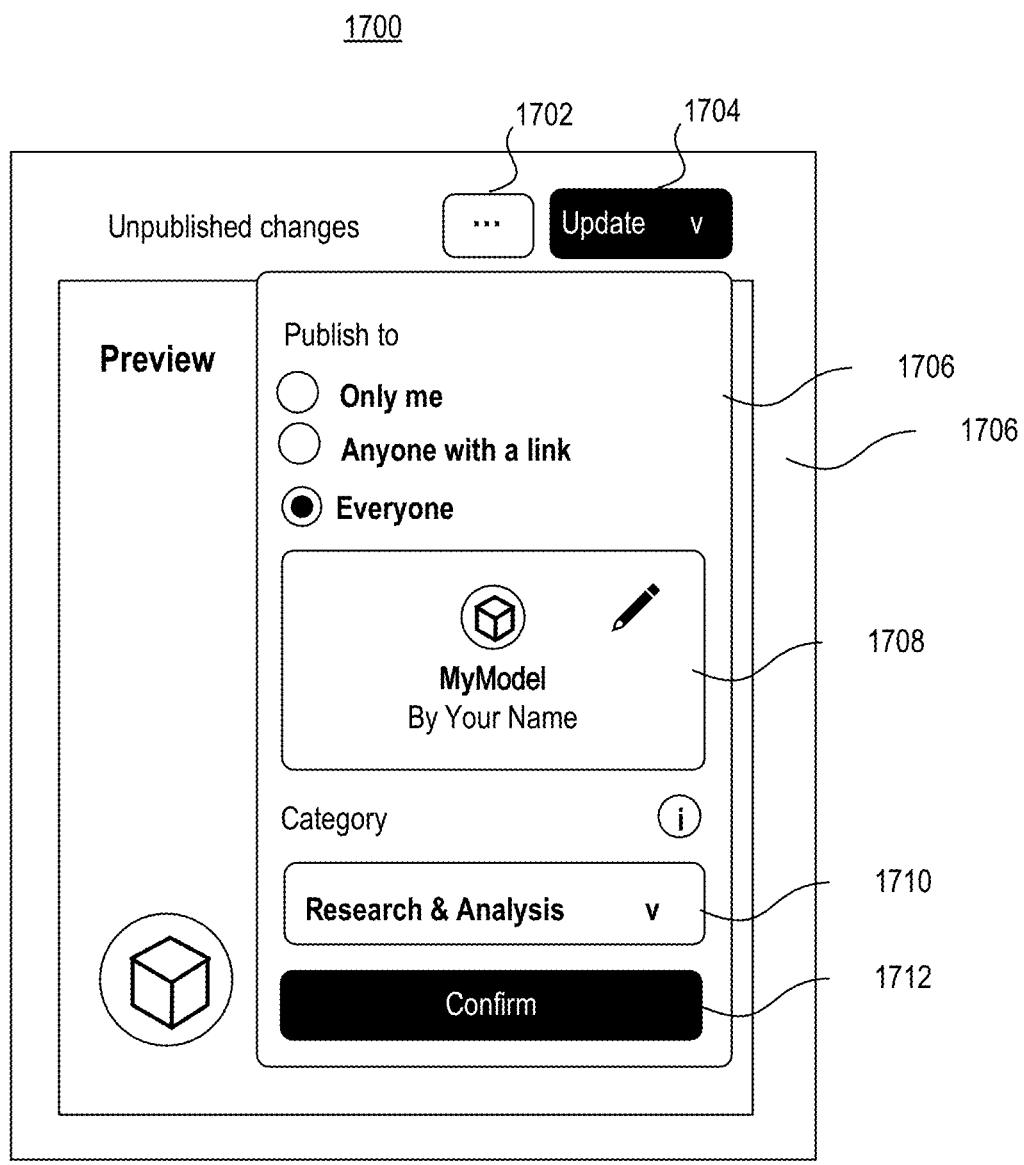
FIG. 17 illustrates an example user interface for publishing a custom model or AI agent, according to disclosed embodiments of the present disclosure.

FIG. 17 illustrates an example user interface 1700 for publishing an AI agent or a custom model. As can be seen in FIG. 17, the user may modify the publishing settings of the AI agent or custom model accordingly. For example, the user may maintain privacy of the AI agent or custom model and publish it to "only me", thereby maintaining an internal AI agent or custom model. Alternatively, the user may publish the AI agent or custom model to "anyone with a link" or to "everyone". Moreover, the user may publish the AI agent or the custom model to the aforementioned custom model/AI agent exchange 822 shown in FIG. 8. Interface 1700 may include settings button 1702 and update button 1704. Interface 1700 may also include a publishing window with publishing selector 1706, thumbnail preview 1708, category selector 1710, and confirm button 1712.

Figure 18:
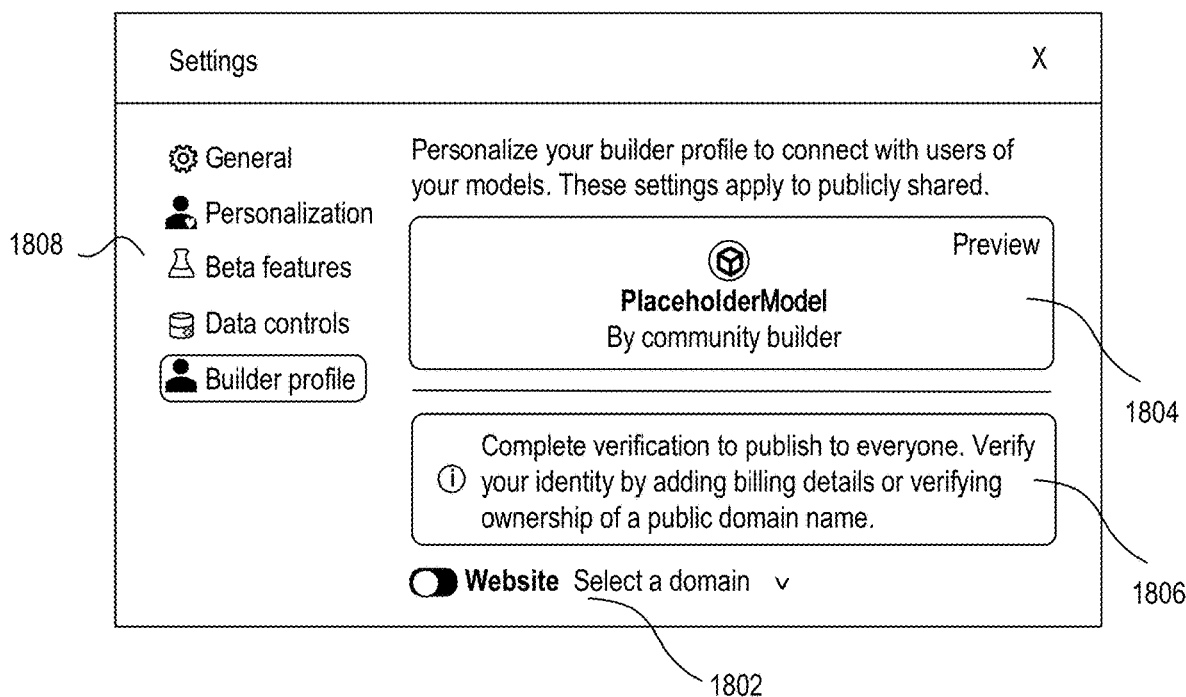
FIG. 18 illustrates an example user interface in the first step of associating a website domain with a builder profile or created custom model or AI agent.
Figure 19:
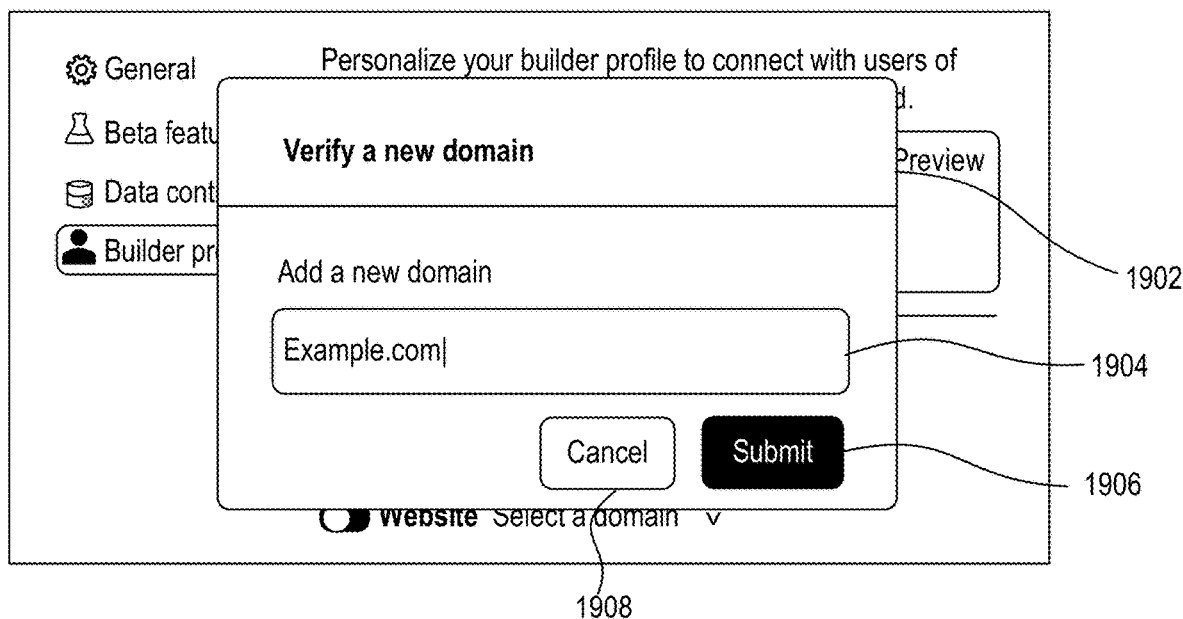
FIG. 19 illustrates an example user interface in the second step of associating a website domain with a builder profile or created custom model or AI agent.
Figure 20:
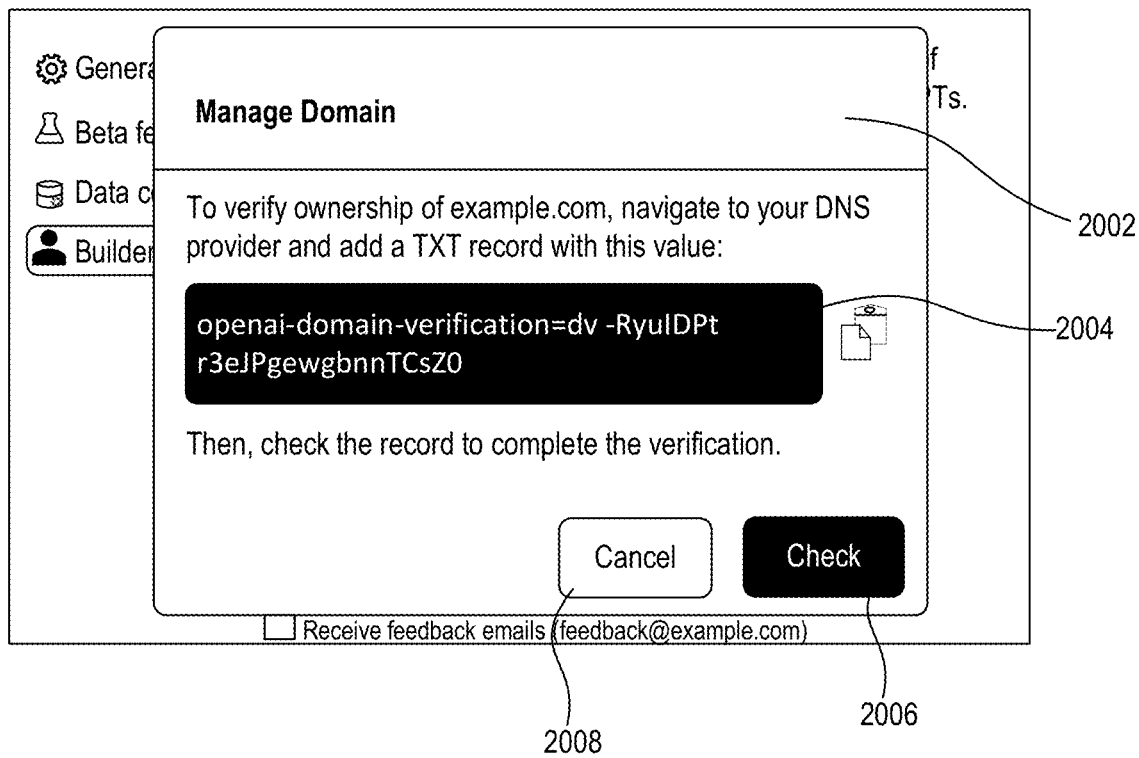
FIG. 20 illustrates an example user interface in a verifying step of associating a website domain with a builder profile or created custom model or AI agent.

FIGS. 18-20 show example user interfaces illustrating how a user may associate a website domain of the user's Builder Profile with the user's created AI agents or custom models.

FIG. 18 illustrates an example user interface 1800 in the first step of associating a website domain with the user's Builder Profile or created AI agents or custom models. As can be seen by prompt 1802 in FIG. 18, the user may select the toggle under "Select a domain" to begin the verification or association of a website domain with the user's Builder Profile and, thus, with the user's created AI agents or custom models. Interface 1800 may also include settings banner 1808, preview window 1804, and notification window 1806.

FIG. 19 illustrates an example user interface 1900 in the second step of associating a website domain with the user's Builder Profile or created AI agents or custom models. As can be seen in FIG. 19, the user may enter the website domain to be associated with the user's Builder Profile and, thus, with the user's created AI agents or custom models. Interface 1900 may include pop-up 1902, input field 1904, and buttons 1908 and 1906.

FIG. 20 illustrates an example user interface 2000 in a verifying step of associating a website domain with the user's Builder Profile or created AI agents or custom models. As seen in FIG. 20, the user may verify ownership of the inputted domain in FIG. 19 by providing a TXT record or a Domain Name System (DNS) record in text format of the domain. Then, the user may click on "check" to check the domain record, thereby completing the verification of the domain. In interface 2000 pop-up window 2002 may display domain features including notice window 2004 with information for verifying ownership, and buttons 2006 and 2008.

Figure 21:
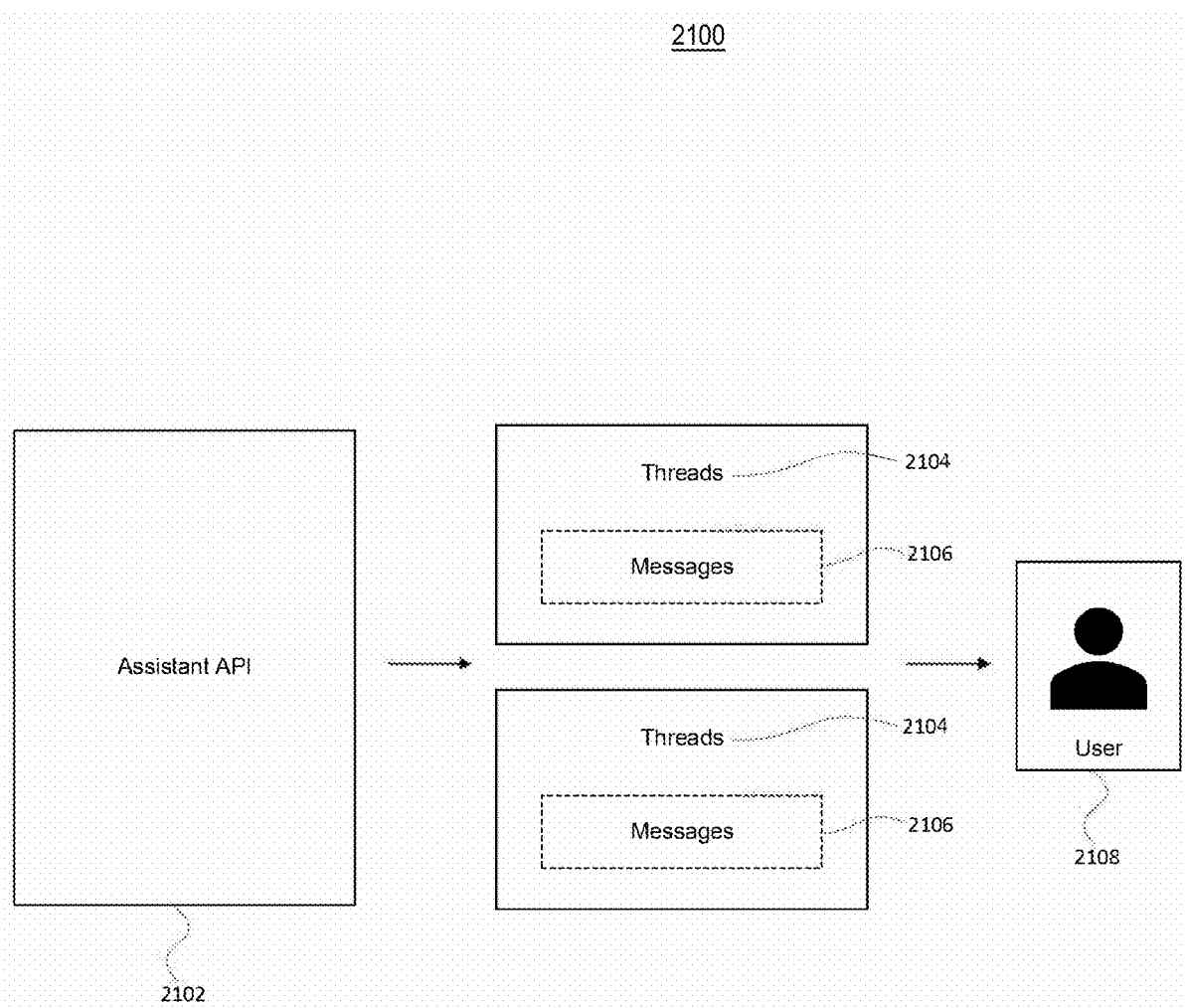
FIG. 21 illustrates an example assistant API, according to disclosed embodiments of the present disclosure.

FIG. 21 illustrates an example Assistant Application Program Interface (API) or Assistant API interface 2100, according to disclosed embodiments of the present disclosure.

An Assistant API may include an AI agent that one assigns instructions to and provides fluid interaction between the API and the user. An Assistant API can call Language Learning Models (LMs) and tools, as need be, to allow a user to interact with the Application Program Interface (API). The Assistant API may be built with tools such as a Code Interpreter, Retrieval, and functions calling, each of which will be outlined and discussed below. An Assistant API may leverage such tools to perform actions autonomously. Moreover, since the Assistant API optimizes the quality of performance of such tools, the user may fine-tune the models to best determine when to call these tools, what input(s) are most effective, and how to best integrate the output(s) into the Assistant API's responses.

As seen in FIG. 21, the Assistant API has three key primitives: an Assistant API 2102, threads 2104, and messages 2106. The Assistant API 2102 may store instructions and autonomously leverages external tools. Here, the user may specify to the Assistant API 2102 the modeled instructions, the models to use, and the external tools to leverage.

As further seen in FIG. 21, thread(s) 2104 may represent a session between the user 2108 and the Assistant API 2102. The thread(s) 2104 may be a conversation or a transient user session. During the thread(s) 2104, a user may provide pertinent instructions. A new thread(s) 2104 may begin or initiate if the user wishes to open a new topic or add a new participant. For each new user 2108, the Assistant API 2102 may create a new thread(s) 2104. Thus, the Assistant API 2102 may include persistent thread(s) 2104 or threading 2104, which obviates the need for long and cumbersome conversation history between the Assistant API 2102 and the user 2108. As also seen in FIG. 21, the last primitive for Assistant API is message(s) 2106. Message(s) 2106 may be messages or posts between user 2108 and the Assistant API 2102.

Figure 22:
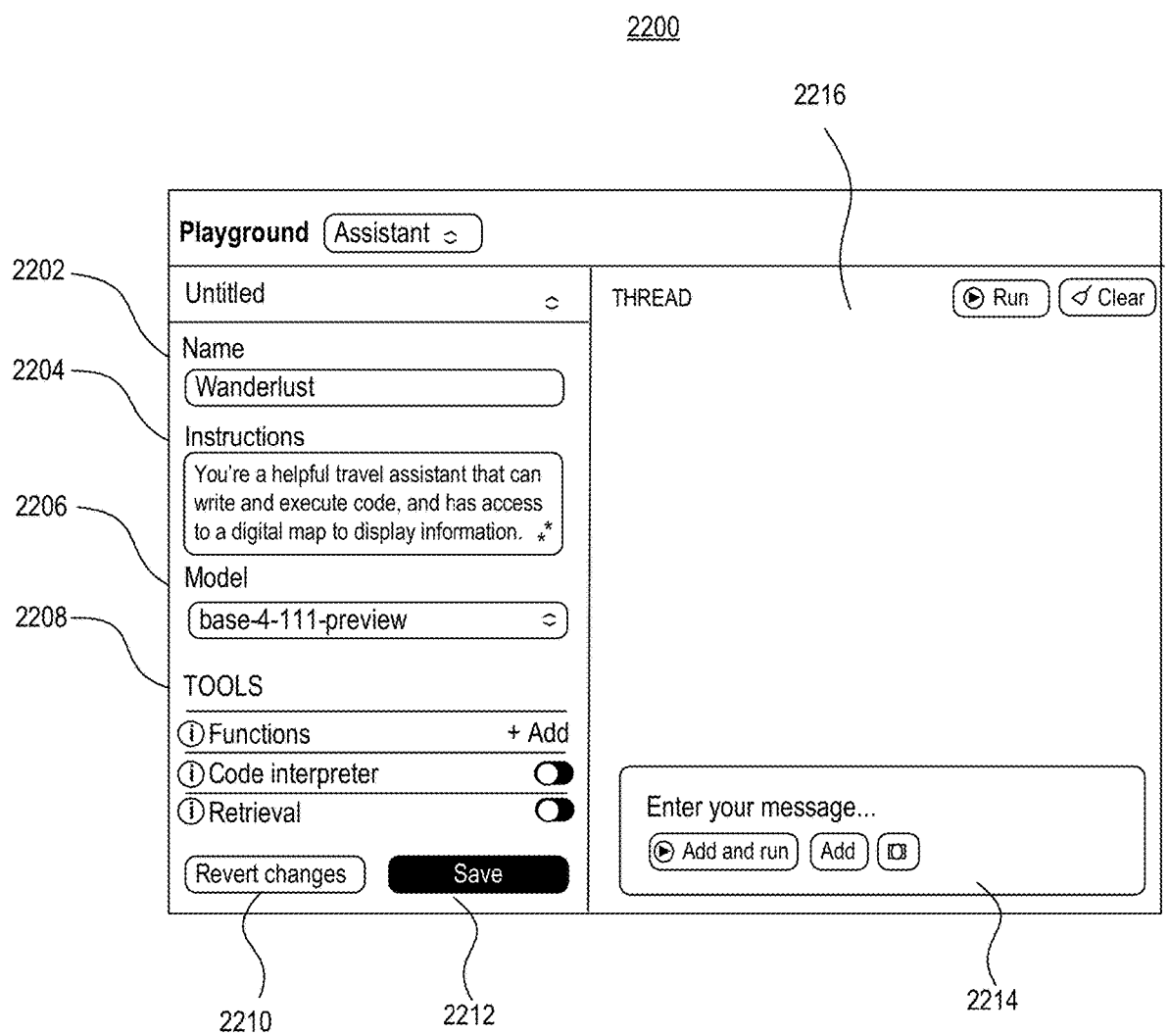
FIG. 22 illustrates an example user interface for custom model, according to disclosed embodiments of the present disclosure.

FIG. 22 illustrates an example user interface 2200 for configuring an Assistant Application Program Interface (API) or Assistant API, according to disclosed embodiments of the present disclosure.

As seen in FIG. 22, the user may select prompt 2202 to provide the Assistant API with an appropriate name. Then, the user may select prompt 2204 to provide appropriate instructions or descriptions to the Assistant API. The user may select prompt 2206 to identify the appropriate Language Model (LM) to use for the Assistant API. Also, the user may select prompt 2208 to enable the appropriate and relevant tool to use for the Assistant API. As seen in FIG. 22, the appropriate tool may be function calling, code interpreter, or a retrieval tool, each of which is discussed below. For example, each of FIGS. 24, 25, and 26 delves into the code interpreter tool, retrieval tool, and function calling tool, respectively. Interface 2200 may also include buttons 2210 and 2212. Further interface 2200 may include chat input 2214.

Figure 23:
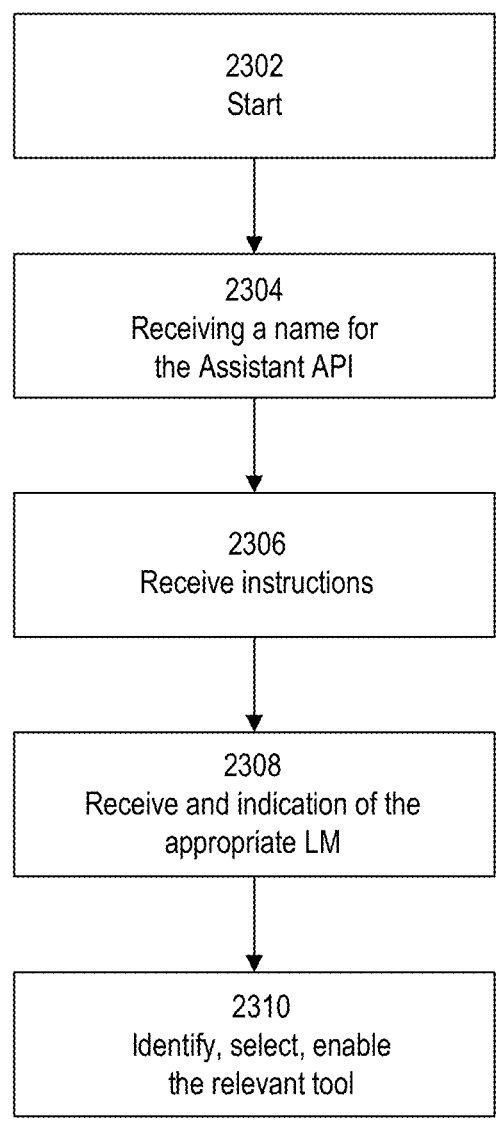
FIG. 23 is a flow chart illustrating an example process for configuring a custom model, according to disclosed embodiments of the present disclosure.

FIG. 23 is a flow chart illustrating an example process 2300 for configuring an Assistant Application Program Interface (API) or Assistant API, according to disclosed embodiments of the present disclosure.

Process 2300 for configuring an Assistant Application Program Interface (API) or Assistant API may include an initial or start step 2302. Thereafter, process 2300 may include step 2304 that entails receiving a name for the Assistant API. At step 2306, the process may receive appropriate instructions and detailed descriptions for the Assistant API. At step 2308, the process may receive an indication of the appropriate Language Model (LM) for the Assistant API. At step 2310, the process may identify, select, and enable the appropriate and relevant tool for the Assistant API. As discussed above, the appropriate tool may be a function calling tool, a code interpreter tool, or a retrieval tool, each of which is discussed below. For example, each of FIGS. 24, 25, and 26 delves into the code interpreter tool, retrieval tool, and function calling tool, respectively.

Figure 24:
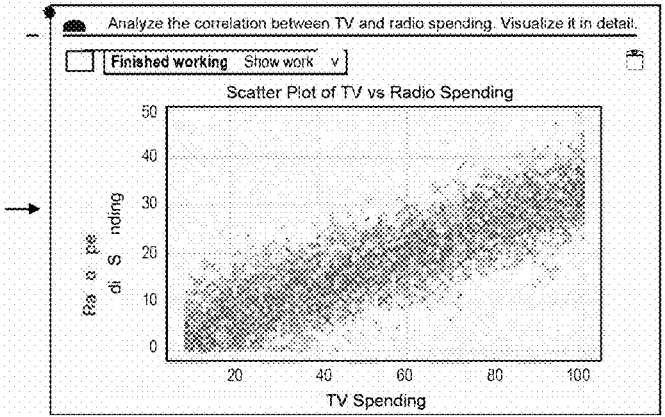
FIG. 24 illustrates an example custom interface with a code interpreter tool used to generate a custom model.

FIG. 24 illustrates an example custom interface 2400 with a code interpreter tool used by the Assistant Application Program Interface (API) or Assistant API.

As seen in FIG. 24, the code interpreter tool may allow the Assistant API to write and run code in a sandboxed and safe environment. By enabling the code interpreter tool, the user expands the capabilities of the Assistant API. The code interpreter tool may allow the Assistant API to perform math, run code, process files, perform data analysis on such files, generate charts, generate images, and even write and run code on a user's behalf. When the user enables the code interpreter tool, the Assistant API may be able to run code and output results directly. Interface 2400 may include text portion 2402 and graphical portion 2404.

Figure 25:
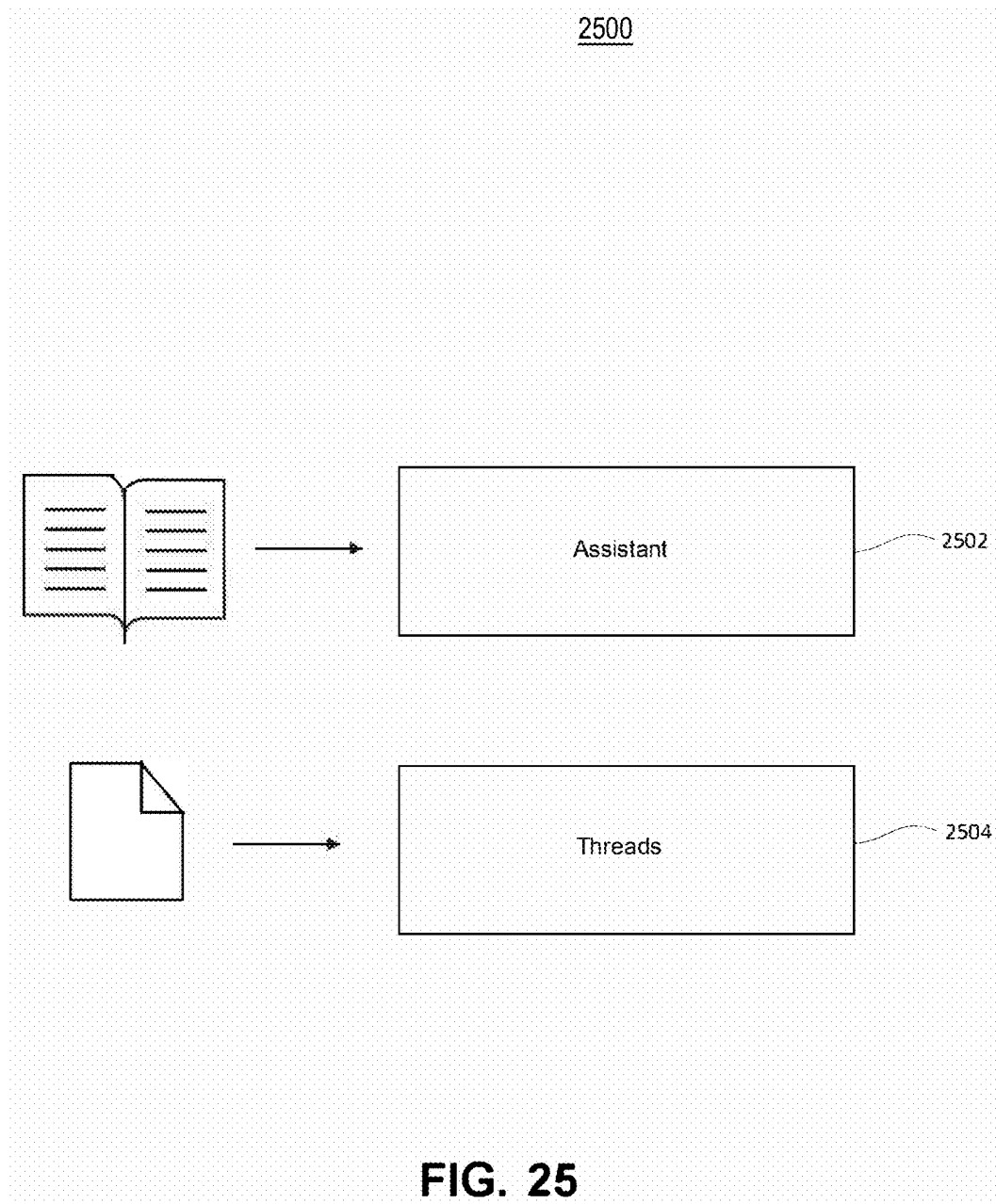
FIG. 25 illustrates a block diagram of an example retrieval tool used for the generation of custom models.

FIG. 25 illustrates an example retrieval tool used by the Assistant Application Program Interface (API) or Assistant API.

The retrieval tool augments the Assistant API with knowledge outside of the Language Model (LM). The user may upload knowledge documents to the Assistant API as needed. The knowledge documents may be airline tickets, booking tickets, complex product specifications, user manuals for a product, intricate lists and tasks, or any other relevant knowledge document(s). The Assistant API may intelligently retrieve the information from the knowledge documents depending on user queries. Moreover, the retrieval tool may allow for the retrieval of information from the knowledge documents via document parsing, chunking, generating embeddings, and determining when and how to use such embeddings.

As seen in FIG. 25, the retrieval tool may be utilized at different levels of scope. For example, at level 2502, the user may upload and pass knowledge documents or files at the "Assistant" level. At this "Assistant" level, the user may want the Assistant API to leverage the retrieved knowledge at every single interaction, in every single thread. For example, general API documents or support documents may be appropriate knowledge for the "Assistant" level.

As further seen in FIG. 25, at level 2504, the user may upload and pass knowledge documents or files at the "Threads" level. At this "Threads" level, the user may want the Assistant API to leverage the retrieved knowledge at only that specific thread. Such an arrangement may be appropriate for sensitive documents such as bank statements which can be uploaded at the "Threads" level to limit access to the information. Indeed, the user may pick and choose various and different retrieval strategies and levels to find the right balance between cost, accuracy, safety, and latency.

Figure 26:
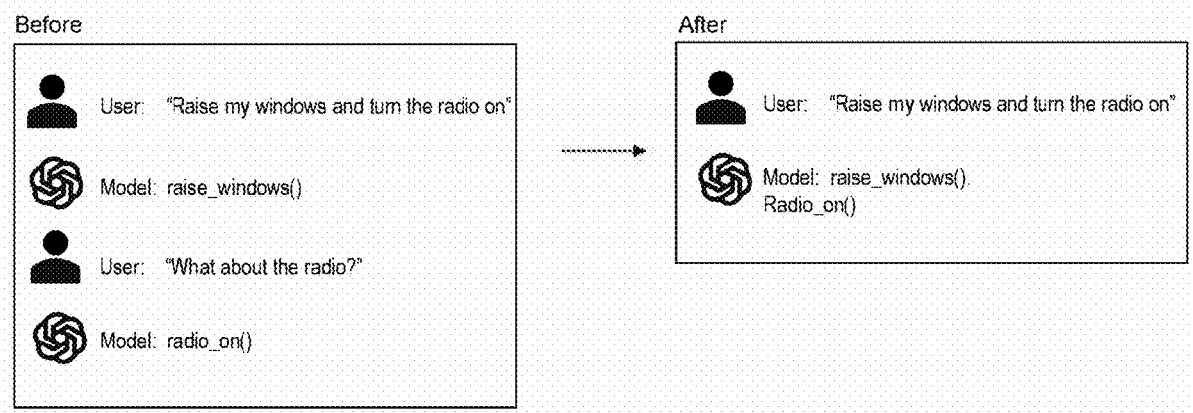
FIG. 26 illustrates an example and comparative function calling tool comparing responses with and without finetuning.

FIG. 26 illustrates an example function calling tool 2600 used by the Assistant Application Program Interface (API) or Assistant API.

As seen in FIG. 26, as an example, the user may select a specific function calling tool called "parallel function calling." Parallel function calling may allow for two functions to occur simultaneously in one call. This parallel function calling may allow for the interaction between the Assistant API, the Language Model (LM), and the user to occur effectively, fluidly, and efficiently. Moreover, the parallel function calling may allow for harmony between the Language Model (LM) and the User Interface (UI). As seen in FIG. 26, after parallel function calling is enabled, an Assistant API may be able to perform both "raising windows" and turning the "radio on" simultaneously, thereby providing for a more effective, efficient, and seamless operation. In another embodiment, parallel function calling may allow for the simultaneous locating and annotation of items or locations on a map, for example, as seen in FIG. 27.

Figure 27:
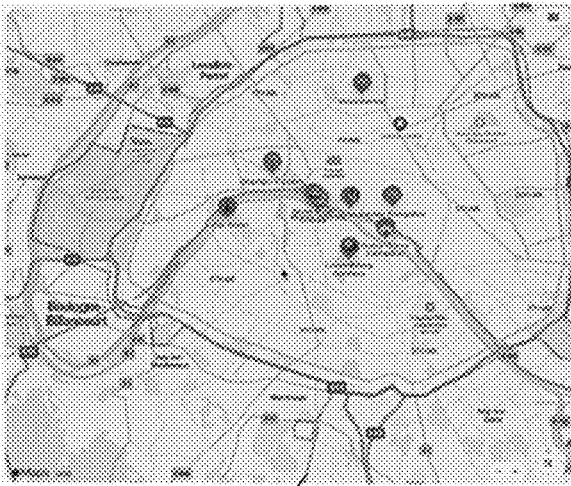
FIG. 27 illustrates an example custom interface for an example custom model with function calling tool generated for a custom model.

FIG. 27 illustrates an example custom interface 2700 for an example function calling tool used by the Assistant Application Program Interface (API) or Assistant API. As seen in FIG. 27, as an example, the user may utilize the aforementioned parallel function calling in an Assistant API to allow for the simultaneous locating and annotation of items or locations on a map. Interface 2700 may include text portion 2702 and graphical portion 2704.

Figure 28:
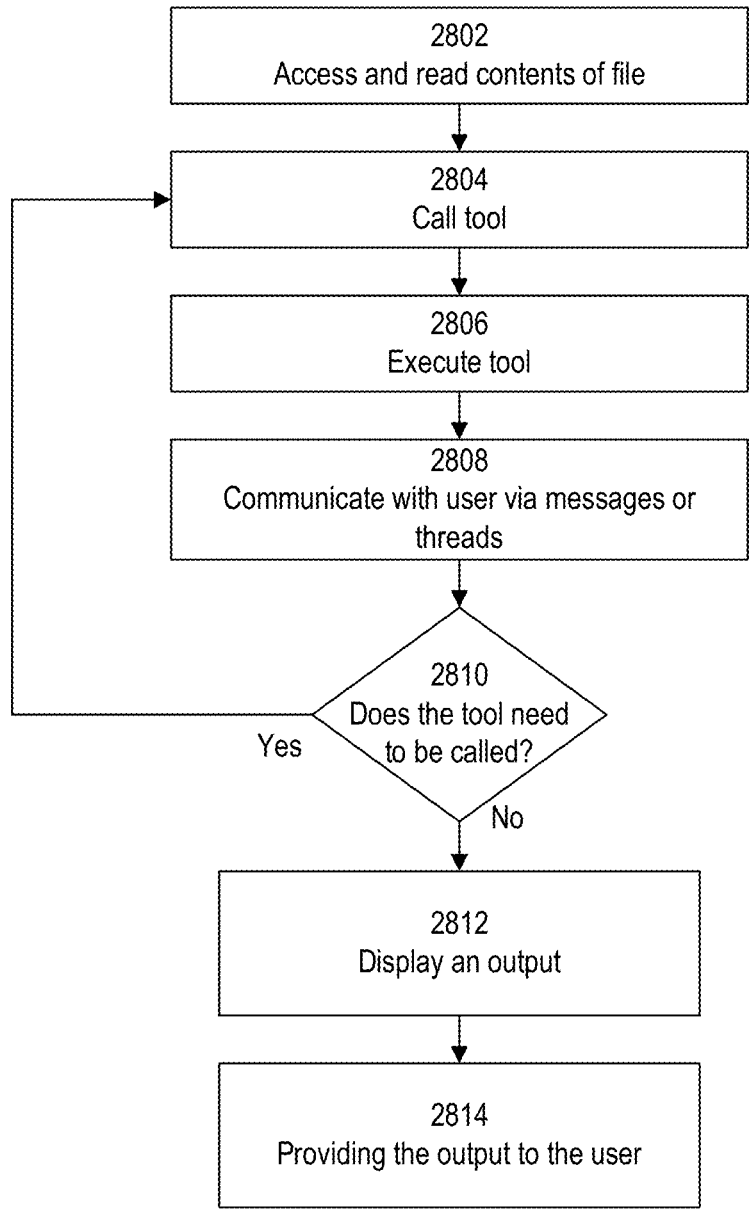
FIG. 28 is a flow chart illustrating an example process for utilizing an Assistant API, according to disclosed embodiments of the present disclosure.

FIG. 28 is a flow chart illustrating an example process 2800 for utilizing an Assistant Application Program Interface (API) or Assistant API, according to disclosed embodiments of the present disclosure.

As seen in FIG. 28, the Assistant API may perform example process 2800 that include retrieving documents or files and acting in accordance with user instructions. For example, in step 2802, the Assistant API may access and read contents of a file. In step 2804, the Assistant API may accordingly call a tool, wherein the tool may be any one of the code interpreter tool, the retrieval tool, and the function calling tool discussed above. In step 2806, the Assistant API may execute the respective and appropriate tool. In step 2808, the Assistant API may communicate with or to the user, via either the aforementioned messages or threads, the appropriate results of executing the tool. In step 2810, the Assistant API may see if the respective tool needs to be called again. If the tool needs to be called, the Assistant API may return to step 2804 to call the tool again. If, however, the tool does not need to be called, the Assistant API may move to step 2812. In step 2812, the Assistant API may display an output. Thereafter, the Assistant API may move to step 2814, wherein the Assistant API may provide the output to the user.

FIG. 29 is a block diagram illustrating an example operating environment for implementing various aspects of this disclosure, according to some of the disclosed methods and systems of the present disclosure. An example operating environment for implementing various aspects of this disclosure is illustrated in FIG. 29.

As illustrated in FIG. 29, an example operating environment 2900 may include a computing device 2902 (e.g., a general-purpose computing device) in the form of a computer. Components of the computing device 2902 may include, but are not limited to, various hardware components, such as one or more processors 2906, data storage 2908, a system memory 2904, other hardware 2910, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 29, an operating environment 2900 for an example method or system includes at least one computing device 2902. The computing device 2902 may be a uniprocessor or multiprocessor computing device. An operating environment 2900 may include one or more computing devices (e.g., multiple computing devices 2902) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 2902 may be configured for end-users, e.g., with applications, for administrators, as a server, as a distributed processing node, as a special-purpose processing device, or otherwise configured to train machine learning models and/or use machine learning models.

One or more users may interact with the computer system including one or more computing devices 2902 by using a display, keyboard, mouse, microphone, touchpad, camera, sensor (e.g., touch sensor) and other input/output devices 2918, via typed text, touch, voice, movement, computer vision, gestures, and/or other forms of input/output. An input/output 2918 may be removable (e.g., a connectable mouse or keyboard) or may be an integral part of the computing device 2902 (e.g., a touchscreen, a built-in microphone). A user interface 2912 may support interaction between a method and system and one or more users. A user interface 2912 may include one or more of a command line interface, a graphical user interface (GUI), natural user interface (NUI), voice command interface, and/or other user interface (UI) presentations, which may be presented as distinct options or may be integrated.

A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 2918 and computing device 2902, based on input received from at user interface 2912 and/or from network(s) 2916. As used throughout, "based on" may refer to being established or founded upon a use of, changed by, influenced by, caused by, or otherwise derived from. In some of the disclosed methods and systems, an API call may be configured for a particular API and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some of the disclosed methods and systems and part of a system including one or more computing devices 2902 in other systems or methods, depending on their detachability from the processor(s) 2906. Other computerized devices and/or systems not shown in FIG. 29 may interact in technological ways with computing device 2902 or with another system using one or more connections to a network 2916 via a network interface 2914, which may include network interface equipment, such as a physical network interface controller (NIC) or a virtual network interface (VIF).

Computing device 2902 includes at least one logical processor 2906. The at least one logical processor 2906 may include circuitry and transistors configured to execute instructions from memory (e.g., memory 2904). For example, at least one logical processor 2906 may include one or more central processing units (CPUs), arithmetic logic units (ALUs), Floating Point Units (FPUs), and/or Graphics Processing Units (GPUs). The computing device 2902, like other suitable devices, also includes one or more computer-readable storage media, which may include, but are not limited to, memory 2904 and data storage 2908. In some of the disclosed methods and systems, memory 2904 and data storage 2908 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 2920 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 2902, making its content accessible for interaction with and use by processor(s) 2906. The removable configured medium 2920 is an example of a computer-readable storage medium. Some other examples of computer-readable storage media include built-in random-access memory (RAM), read-only memory (ROM), hard disks, and other memory storage devices which are not readily removable by users (e.g., memory 2904).

The configured medium 2920 may be configured with instructions (e.g., binary instructions) that are executable by a processor 2906; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 2920 may also be configured with data which is created by, modified by, referenced by, and/or otherwise used for technical effect by execution of the instructions. The instructions and the data may be configured the memory or other storage medium in which they reside; such that when that memory or other computer-readable storage medium is a functional part of a given computing device, the instructions and data may also configure that computing device.

Although a system or method may be described as being implemented as software instructions executed by one or more processors in a computing device (e.g., general-purpose computer, server, or cluster), such description is not meant to exhaust all possible methods or systems. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, a method or system may include other hardware logic components 2910 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of a method or system may be grouped into interacting functional modules based on their inputs, outputs, and/or their technical effects, for example.

In addition to processor(s) 2906, memory 2904, data storage 2908, and screens/displays, an operating environment 2900 may also include other hardware 2910, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some method or system, other input/output devices 2918 such as human user input/output devices (screen, keyboard, mouse, tablet, microphone, speaker, motion sensor, etc.) will be present in operable communication with one or more processors 2906 and memory.

In some of the disclosed methods and systems, the system includes multiple computing devices 2902 connected by network(s) 2916. Networking interface equipment can provide access to network(s) 2916, using components (which may be part of a network interface 2914) such as a packet-switched network interface card, a wireless transceiver, or a telephone network interface, for example, which may be present in a given computer system. However, a system or method may also communicate technical data and/or technical instructions through direct memory access, removable non-volatile media, or other information storage-retrieval and/or transmission approaches.

The computing device 2902 may operate in a networked or cloud-computing environment using logical connections to one or more remote devices (e.g., using network(s) 2916), such as a remote computer (e.g., another computing device 2902). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 2902 may be connected to a public or private network through a network interface or adapter. In some of the disclosed methods and systems, a modem or other communication connection device may be used for establishing communications over the network. The modem, which may be internal or external, may be connected to the system bus via a network interface or other appropriate mechanism. A wireless networking component such as one including an interface and antenna may be coupled through a suitable device such as an access point or peer computer to a network. In a networked environment, program modules depicted relative to the computer, or portions thereof, may be stored in the remote memory storage device. It may be appreciated that the network connections shown are examples and other means of establishing a communications link between the computers may be used.

Computing device 2902 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 2908 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 2908 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like.

The foregoing drawings and figures are examples and different combinations and alterations are possible as it would be apparent to those of ordinary skill in the art. As explained above, systems and methods of the present disclosure present technological improvements as solutions to the technical problems in the field of AI model generation and deployment. For example, the disclosed systems and methods are directed to improving the methods of interaction with LMs. In particular, but without limitation, the disclosed systems and methods are directed to technical tools to create LLM-based customized models, AI agents, or custom models that can facilitate interaction between users and LMs. Agents may include special interfaces or customized software that allow users to more easily interact with LMs by permitting simpler customization, the centralization of tasks, and/or simpler interfaces that are more understandable to users.

Some of the disclosed systems and methods may also provide a system and/or infrastructure that allows users with different needs to create AI agents, custom models, or custom models that can solve different tasks. There are a host of problems for multiple audiences that may be best solved with architectures or systems that allow simpler customization through AI agents. For example, the disclosed systems and methods may facilitate LM interactions by novice and/or mainstream users who may find AI daunting and do not know how to use it. Frequently users are aware of LM tools but fail to try them or use them because interaction with LMs may seem challenging. The disclosed systems and methods seek to resolve those problems by providing an infrastructure, system, and/or method that facilitates interaction with LMs using agents that facilitate interactions. Additionally, or alternatively, the disclosed systems and methods may facilitate customization of LM responses using agents. For example, certain users may want to save prompts and tweak LMs for certain tasks. In some scenarios, users may want finetuned instances of LMs. The disclosed systems and methods may enable simpler customization or finetuning of LMs (and of LM interfaces) for specific user-designed tasks.

Additionally, the disclosed systems and methods may facilitate incorporating LMs into other functions, software, or products. For example, users may want to employ LMs in tools that may specialize in certain tasks. Users may want LMs to aid in the development of a product. The disclosed systems and methods may enable the creation of AI agents that specialize in user interests, software, functions, or products that can be shared with others.

The disclosed systems and methods may also facilitate working with LMs by making interactions with LMs faster. For example, the disclosed systems and methods may be used for automation of certain tasks using LMs. Some of the disclosed systems and methods may facilitate automating functions in software as a service (SaaS) applications. In SaaS applications, users may connect to and use cloud-based apps over the Internet. The disclosed systems and methods may permit development of AI agents that operate within a given context and/or for a given function. Normally, entities providing services (particularly SaaS) have a certain context they operate in and towards a set of goals. For example, an entity may need to have a specific context for a client's goals. Examples of these tasks may include: blog post writing, data science monitoring of product growth and generating weekly insights/spotting areas of concern, among others. The disclosed systems and methods may allow tailoring of LMs with AI agents for the specific tasks.

Additionally, or alternatively, the disclosed systems and methods may permit users to easily create and deploy an AI agent on top of an existing context. In such embodiments, the disclosed systems and methods may include automated or guided programming of AI agents using a contextual training dataset to update the AI agent behavior. For example, in some embodiments AI agents may be updated with new context regarding certain tasks to keep their context fresh. And in some embodiments, the disclosed systems and methods may include the ability to personalize AI agents for each user.

The disclosed systems and methods may also provide an infrastructure for users to engage with LMs. For example, the implementation of AI agents may permit the onboarding of users through the AI agents, which may provide a more seamless integration into workflows than conventional methods for interacting with AI models (like LMs). Further, the disclosed systems and methods may facilitate the deployment and development of LMs. For example, the AI agents may facilitate continuous interaction with users that facilitate collecting varied data for training and model tailoring. In some embodiments, multiple AI agents may be associated with a single user developing an exchange of AI models that can be used to enhance interactions allowing the LMs to continuously learn which use cases are most engaging and valuable, and making it possible to improve LMs or associated products over time.

Moreover, the disclosed systems and methods may enable the development and deployment of an AI agent ecosystem in which users may develop and share (or sell) their AI agents. Disclosed systems and methods may facilitate the development of an AI agent ecosystem in which users promote or advocate for the agents they have built.

Disclosed systems include an AI system. The AI system has at least one memory storing instructions and at least one processor configured to execute the instructions to perform operations. The operations include receiving a query to create a customized model, they can include (among other things) features for the customized model. The features can include knowledge base and a capability. The operations can also include configuring the customized model based on the features (from the query) by finetuning a base model with the knowledge base and by generating a set of instructions to configure the capability. For example, configuring the capability can involve establishing connectivity with an API or plugin, where the API or plugin associating establish a communication between the custom model and a networked service. Additionally, the operations can include generating a custom interface for interacting with the customized model, receiving a user query or prompt via the custom interface; and resolving the query or prompt using the customized model and generating a response via the custom interface.

In the AI system, the API or plugin can be associated with a social media account (e.g., allowing the customized model to receive information from a social network of forum). And the operations may also include fine-tuning the custom model based on information received through the API (e.g., based on information received from the social network).

The AI system may also have implementations where the features in the query include "personality" instructions. These personality instructions can tailor the tone in the response. Further, the knowledge base can include a training library including a user-uploaded file.

In the AI system the processors can also be configured to perform operations of receiving finetuning instructions and updating the custom model according to the instructions by generating a finetuning dataset that incorporates the finetuning instructions. Additionally, the features in the query can include specific instructions. And when the features include specific instructions, the operations may involve configuring the customized model based on the specific instructions and connecting the customized model with a large language model.

In the AI system, the base model may be a pre-trained model. And the operations may also include configuring a second customized model with second features, the second features including instructions for customized model evaluation. The second customized model may be configured to generate a feedback notification to a user when identifying the improper or non-compliant parameters. The operations may also include generating a review file based on the query and inputting the review file to the second customized model to identify non-complaint parameters.

In the AI system, the customized model can be configured to have an assigned memory space in the system (e.g., to minimize latency). And the operations may also include generating a dashboard displaying metrics associated with processing and memory use by the customized model.

The disclosed systems may also relate to a method for configuring custom AI models, the method may include operations like receiving instructions to create a custom model via at least one of a website, a mobile application, or a first API, the instructions including a training dataset. The operations may also include configuring the custom model by finetuning a base model according to the instructions, the base model including a large language model (LLM). The operations may also include configuring the custom model to communicate via a second API; generating a custom interface for interacting with the custom model; receiving a user query via the custom interface or the second API; and resolving the query using the custom model and communicating a response via the second API.

Additionally, in the method the instructions for the custom model may include a capability, where the capability includes one or more of a callback function, an upload/download function, a security function, or a model connector function. And in the method, the training dataset may have a plurality of user-uploaded files.

Further, in the method the custom model is a generative pre-trained transformer. And the method may include additional steps or operations like generating a review file based on data associated with the custom model; inputting the review file in a finetuned evaluator model; and determining, using the finetuned evaluator model, whether the custom model has parameters compliant with registration in a custom model store. Further, the method may include other operations like generating the custom model when determining the custom model has compliant parameters.

The method may also include operations of generating a feedback notification when determining the custom model does not have parameters compliant with registration; and in response to determining the custom model has parameters compliant with registration, registering the custom model in an agent exchange.

In the method, the instructions for the custom model may include a browsing capability and when finetuning the base model the method includes establishing an API connection for web browsing. Further, the method configuring the custom model may include performing at least one of: a consumer creator flow; an enterprise creator flow; or an API agent flow.

The disclosure also describes a system for generating custom models. The system may include processors configured to perform operations. And the operations can include receiving a query to generate the custom model, the query including a knowledge base, specific instructions, and a capability. The operations may also include determining whether the knowledge base, specific instructions, and the capability have compliant parameters. Further, the operations can include, in response to determining the query has compliant parameters, configuring the custom model based on the knowledge base, the specific instructions, and the capability by: finetuning a base model with the knowledge base and the specific instructions, and establishing connectivity with at least one API or plugin associated with the capability, the at least one API or plugin associating establishing communication between the custom model and a networked service. The system may also be configured to, after configuring the custom model, receiving a user prompt; and resolving the user prompt with the custom model and generating a response.

The disclosure also describes a system for interacting with a large language model. The system includes at least one memory storing instructions and at least one processor configured to execute the instructions to perform operations. Where the operations include receiving a query to create an AI agent, the query including agent features; configuring the AI agent based on the agent features, the configuring of the AI agent including establishing connectivity with at least one API or plugin, the at least one API or plugin associating the AI agent with a large language model; generating an interface for interacting with the AI agent; and deploying the AI agent via at least one of a website, a mobile application, or an application programing interface.

In the system, the API or plugin includes an API associated with social media accounts. And the agent features include an agent default personality and a training library. Further, the system may also be configured to generate a dashboard, the dashboard including metrics associated with the AI agent. The system may additionally be configured to receive finetuning instructions; and updating the AI agent according to the instructions.

The disclosure also describes a method for interacting with an LM though an AI agent. The method includes configuring an AI agent based on instructions; connecting the AI agent with the LM; and resolving queries sent through the AI agent using the LM as the base model.

The disclosure also describes a method for configuring AI agents based on an LM. The method includes receiving instructions to initialize an AI agent via a website, mobile application, or API, the instructions specifying a training data; configuring the AI agent based on the instructions; connecting the AI agent with the LM; and resolving queries sent through the AI agent using the LM as the base model.

In the method, AI agent includes multiple AI agents including: a primary agent; a work agent; an education agent; a finance agent; and a health agent. Further, in configuring the AI agent, the method includes performing at least one of: a consumer creator flow; an enterprise creator flow; or an API agent flow. And in the configuring the AI agent, the method involves setting up a callback function, an upload/download function, a security function, and a model connector function.

The disclosure is also related to a system for generating customized artificial intelligence models. The system may include at least one memory storing instructions and at least one processor configured to execute the instructions to perform operations. The operations may include receiving a request to generate a customized model; generating a review file based on data associated with the customized model; inputting the review file in a finetuned evaluator model; determining, using the finetuned evaluator model, whether the customized model has acceptable parameters; and generating the customized model.

The system may be additionally configured to perform operations of receiving a request to register the customized model; evaluating the customized model with a second finetuned model and registration parameters; and in response to determining the customized model complies with registration parameters, registering the customized model.

Further, in the system, the finetuned evaluator model may be formed with a modified pre-trained large language model, and the review file may include metadata of a selected dataset for training of the customized model.

Further, when the system is configured to generate the customized model, the system may perform operations of identifying a pre-trained model and generating a finetuning dataset; performing at least one of supervised finetuning or unsupervised finetuning; adjusting parameters associated with the customized model; and generating the customized model based on the adjusted parameters.

The disclosure is also related to a system for generating an AI agent based on a large language model (LLM). The system may include at least one memory storing instructions and at least one processor configured to execute the instructions to perform operations. The operations may include receiving instructions to initialize an AI agent via an interface; configuring the AI agent based on the instructions; and connecting the AI agent with the LLM.

In the disclosed system, the interface may include a chat tab and a configuration tab. The configuration tab may have an instruction section, an action section, and a knowledge section. And the interface may include an application programming interface (API). And the system may be further configured to receive finetuning instructions via the chat tab and updating the AI agent according to the instructions and communicating with the API via an action section.

One of the disclosed systems for interacting with a large language model also includes a memory storing instructions and processors configured to execute the instructions to perform operations. The operations can include receiving a query to create an AI agent, the query including agent features and configuring the AI agent based on the agent features (the configuring of the AI agent including establishing connectivity with at least one API or plugin, the at least one API or plugin associating the AI agent with a large language model). The operations can also include generating an interface for interacting with the AI agent and deploying the AI agent.

In the disclosed system, features can include model-specific instructions, and the configuration of the AI agent may include configuring the AI agent based on the model-specific instructions. The configuration of the AI agent can be based on the agent features by connecting the AI agent with the large language model through the at least one API or plugin. And the operations performed by the system, the system may also resolve user prompts sent through the AI agent using the large language model. And the system includes operations of deploying the AI agent via at least one of a website, a mobile application, or an application programming interface.

In the disclosed system, agent features may include an agent default personality and a training library. And the system may be configured to generate a dashboard, the dashboard including metrics associated with the AI agent use, resource consumption, and/or performance. The system may also be configured to perform operations of receiving finetuning instructions and updating the AI agent according to the instructions.

The disclosed system may be configured to generate an interface for interacting with the AI agent is a custom interface and the operations may also include receiving a user query or prompt via the custom interface and resolving the query or prompt using the custom model and generating a response via the custom interface. In the disclosed system the features for the AI agent may also include a knowledge base and a capability and the system may configure the AI agent based on the agent features includes finetuning a base model with the knowledge base and by generating a set of instructions to configure the capability; and the API or plugin establishes communication between the AI agent and a networked service.

The disclosed system may also be configured to perform operations of receiving finetuning instructions and updating the custom model according to the finetuning instructions by generating a finetuning dataset that incorporates the finetuning instructions. Further, the system may be configured to set up the AI agent with an assigned memory space in the system.

The disclosed computer-implemented methods may also configure AI agents based on a language model (LM). The method may include steps or operations of receiving instructions to initialize an AI agent, the instructions specifying a training data. The method may also include operations of configuring the AI agent based on the instructions; connecting the AI agent with the LM; and resolving queries sent through the AI agent using the LM as the base model.

In the disclosed method, configuring the AI agent may include finetuning a base model according to the instructions; connecting the AI agent with the LM includes configuring the AI agent to communicate with the LM via an API; and generating a custom interface for interacting with the AI agent. In the method, the query may be received through the custom interface. In the disclosed methods resolving the queries may be done using the AI agent and communicating a response via the custom interface. And configuring the AI agent includes performing at least one of: a consumer creator flow; an enterprise creator flow; or an API agent flow.

The disclosed method may include the configuring of the AI agent includes including a callback function, an upload/download function, a security function, and a model connector function. And in the disclosed methods instructions to initialize an AI agent are received via an interface and the instructions include a knowledge base. The method may also include operations of configuring the AI agent based on the instructions includes finetuning the AI agent using the knowledge base.

The disclosed systems may also be configured for generating an AI agent based on a language model (LM). The system may include at least one memory storing instructions and at least one processor configured to execute the instructions to perform operations. The operations may include receiving instructions to initialize an AI agent via an interface; configuring the AI agent based on the instructions; and connecting the AI agent with the LLM.

In the disclosed systems, the interface may include a chat tab and a configuration tab. And the configuration tab may include an instruction section, an action section, and a knowledge section. The interface can be implemented with an application programming interface (API); and the operations may also include receiving finetuning instructions via the chat tab and updating the AI agent according to the instructions. And the system may be configured to communicate with the API via an action section.

The system may include at least one memory storing instructions and at least one processor configured to execute the instructions to perform operations. The operations may include receiving a query from a user to create an AI agent, the query including agent features; configuring the AI agent based on the agent features, the configuring of the AI agent including establishing connectivity with at least one API or plugin, the at least one API or plugin associating the AI agent with a large language model; generating an interface for interacting with the AI agent; and deploying the AI agent via at least one of a website, a mobile application, or an application programing interface.

The disclosed embodiments may also involve a method for interacting with an LM though an AI agent. The method may include configuring an AI agent based on user instructions, connecting the AI agent with the LM (e.g., using one or more APIs or plugins); and resolving queries sent through the AI agent using the LM as the base model.

Some of the disclosed embodiments may also involve systems, apparatuses, or methods for generating customized artificial intelligence models. The systems may include memories and processors configured to perform operations. The operations may include receiving a request to generate a customized model, generating a review file based on data associated with the customized model, inputting the review file in a finetuned evaluator model, determining, using the finetuned evaluator model, whether the customized model has acceptable parameters; and generating the customized model.

Some of the disclosed embodiments may also involve systems, apparatuses, or methods for generating customized models or AI agents. The systems may include memories and processors configured to perform operations. The operations may include receiving instructions to initialize an AI agent via a user interface or API, configuring the AI agent based on instructions, and connecting the AI agent with an LLM. Moreover, the user interface may further include a chat tab and a configuration tab. Further, the operations may further include receiving finetuning instructions via the chat tab and updating the AI agent according to the instructions. Also, the configuration tab may further include an instruction section, an action section, and a knowledge section. Further, the operations may further include communicating with the API via the action section.

Other systems, methods, and computer-readable media are also discussed within. The foregoing general description and the following detailed description are example and explanatory only and are not restrictive of the disclosed embodiments.

This disclosure may be described in the general context of customized hardware capable of executing customized pre-loaded instructions such as, e.g., computer-executable instructions for performing program modules. Program modules may include one or more routines, programs, objects, variables, commands, scripts, functions, applications, components, data structures, and so forth, which may perform particular tasks or implement particular abstract data types. Some of the disclosed methods and systems may also be practiced in distributed computing environments where tasks are performed by remote processing devices that are linked through a communications network. In a distributed computing environment, program modules may be located in local and/or remote computer storage media including memory storage devices.

Some of the disclosed methods and systems discussed herein involve or relate to AI. AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Exemplary disclosed methods and systems include systems, methods, and computer readable media for the generation of text and/or code embeddings. For example, in some of the disclosed methods and systems, and as illustrated in FIG. 29, an operating environment 2900 may include at least one computing device 2902, the at least one computing device 2902 including at least one processor 2906, at least one memory 2904, at least one data storage 2908, and/or any other component discussed above with respect to FIG. 29.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example methods and systems are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, methods or systems may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various methods or systems. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described methods or systems are not mutually exclusive, and elements, components, materials, or steps described in connection with one example method or system may be combined with, or eliminated from, other methods or systems in suitable ways to accomplish desired design objectives. It is to be understood that described processes and methods can be executed by one or more processors (such as computing device 2902 in FIG. 29). Alternatively, or additionally, it is understood that process and methods disclosed here may be executed by other computing elements (e.g., elements in system 100). For example, some steps in disclosed process may be executed by elements like databases, engines, or devices, may perform one or more of the steps in process.

In the foregoing specification, some of the disclosed methods and systems have been described with reference to numerous specific details that can vary from implementation to implementation. Certain adaptations and modifications of the described methods or systems can be made. Other disclosed methods and systems can be apparent to those skilled in the art from consideration of the specification and practice of the invention disclosed herein. It is intended that the specification and examples be considered as example only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An artificial intelligence system comprising:
    at least one memory storing instructions; and
    at least one processor configured to execute the instructions to perform operations comprising:
        receiving a query to configure a custom model, the query comprising features, the features comprising a knowledge base and a capability;
        providing the features to a model builder, the model builder being a language model configured with a specific instruction sequence for the formation of custom models, the specific instruction sequence comprising instructions for the language model to behave as an expert at creating custom models;
        configuring the custom model with the model builder based on the features by finetuning a base model with the knowledge base and generating a set of instructions to configure the capability;
        generating a custom interface for interacting with the custom model;
        receiving a prompt via the custom interface; and
        generating a response using the custom model,
    wherein the specific instruction sequence comprises:
        a first step of establishing a behavior for the custom model based on the features;
        a second step of generating a profile for the custom model;
        a third step of generating refining prompts for the configuring of the custom model, the refining prompts seeking parameters for at least one of: an extraction of data from the knowledge base, a template, an expected output, or an interface configuration; and
        an instruction to go through steps in order and without skipping.

2. The system of claim 1, wherein:
    configuring the capability comprises establishing connectivity with at least one API, the at least one API establishing communication between the custom model and a networked service; and
    the operations further comprise finetuning the custom model based on information received through the API.

3. The system of claim 1, wherein:
    the features comprise personalization instructions, the personalization instructions tailoring a tone in the response; and
    the knowledge base comprises a training library including at least one user-uploaded file.

4. The system of claim 1, wherein the operations further comprise:
    receiving finetuning instructions; and
    updating the custom model according to the finetuning instructions by generating a finetuning dataset that incorporates the finetuning instructions.

5. The system of claim 4, wherein generating the finetuning dataset comprises:
    determining layers of the custom model to be frozen; and
    selecting the finetuning dataset based on the layers to be frozen.

6. The system of claim 1, wherein the custom model has an assigned memory space in the system, the memory space being associated with an account.

7. The system of claim 1, wherein:
    the operations further comprise generating a dashboard displaying metrics associated with processing and memory use by the custom model; and
    the dashboard displays computer expenditure of the custom model.

8. The system of claim 1, wherein:
    the custom model is configured with trigger/instruction pairs, and instructions to rely on the knowledge base before engaging the capability.

9. A computer-implemented method for configuring a custom artificial intelligence (AI) model, the method comprising:
    receiving instructions to create a custom model via a first interface, the instructions comprising a training dataset;
    providing the features to a model builder, the model builder being a language model configured with a specific instruction sequence for the formation of custom models, the specific instructions comprising instructions for the language model to behave as an expert at creating custom models;
    configuring the custom model with the model builder to finetune a base model according to the instructions, the base model comprising a language model;
    configuring the custom model to communicate via a second interface;
    generating a custom interface for interacting with the custom model;
    receiving a prompt; and
    generating a response to the prompt using the custom model
    wherein the specific instruction sequence comprises:
        a first step of establishing a behavior for the custom model based on the features;
        a second step of generating a profile for the custom model;
        a third step of generating refining prompts for the configuring of the custom model, the refining prompts seeking parameters for at least one of: an extraction of data from the knowledge base, a template, an expected output, or an interface configuration; and
        an instruction to go through steps in order and without skipping.

10. The method of claim 9, wherein the instructions comprise a capability, the capability comprising one or more of a callback function, an upload and download function, a security function, or a model connector function.

11. The method of claim 9, wherein the training dataset comprises at least one user-uploaded file.

12. The method of claim 9, wherein:
    the instructions comprise a browsing capability and finetuning the base model comprises establishing an API connection for web browsing; and
    configuring the custom model comprises performing at least one of: a consumer creator flow, an enterprise creator flow, or an API agent flow.

13. The method of claim 9, wherein:
the custom model is configured to tailor responses to prompts received via the custom interface based on the training dataset and by requesting data via the second interface.

14. A system for interacting with a language model, the system comprising:
at least one memory storing instructions;
at least one processor configured to execute the instructions to perform operations comprising:
receiving a query to create an AI agent, the query comprising agent features and a knowledge base;
providing the features to an agent builder, the agent builder being a language model configured with a specific instruction sequence for the formation of AI agents, the specific instructions comprising instructions for the language model to behave as an expert at creating AI agents;
configuring the AI agent with the agent builder based on the agent features and the knowledge base, the configuring of the AI agent comprising establishing connectivity with a first API, the first API associating the AI agent with a large language model;
generating an interface for interacting with the AI agent; and
deploying the AI agent via at least one of a website, an application, or a second API,
wherein the specific instruction sequence comprises:
a first step of establishing a behavior for the custom model based on the features;
a second step of generating a profile for the custom model;
a third step of generating refining prompts for the configuring of the custom model, the refining prompts seeking parameters for at least one of: an extraction of data from the knowledge base, a template, an expected output, or an interface configuration; and
an instruction to go through steps in order and without skipping.

15. The system of claim 14, wherein:
configuring the AI agent comprises finetuning a base model and connecting the AI agent with the large language model through the first API;
the AI agent is configured to rely on the knowledge base before communicating via the first API; and
the operations further comprise resolving prompts sent through the AI agent using the large language model.

16. The system of claim 15, wherein finetuning the base model comprises:
generating a finetuning dataset that comprises the knowledge base;
retrieving information from the first API; and
uploading the finetuning dataset to the agent builder.

17. The system of claim 14, wherein the agent features comprise a default agent personalization including instructions for a specific tone for query responses.

18. The system of claim 14, further comprising generating a dashboard, the dashboard including metrics associated with the AI agent.

19. The system of claim 14, wherein the query to create an AI agent is received via a user interface, the user interface comprising:
at least one of a create tab, a configure tab, or an AI agent preview;
at least one of a message builder input or a custom model instruction input;
a knowledge documents input including an upload button; and
a capabilities selection menu.

* * * * *